(12) United States Patent
Balta

(10) Patent No.: US 12,247,663 B2
(45) Date of Patent: Mar. 11, 2025

(54) LIP SEALS AND RELATED METHODS

(71) Applicant: Bal Seal Engineering, LLC, Foothill Ranch, CA (US)

(72) Inventor: Miquel Balta, Irvine, CA (US)

(73) Assignee: Bal Seal Engineering, LLC, Foothill Ranch (CA)

( * ) Notice: Subject to any disclaimer, the term of this patent is extended or adjusted under 35 U.S.C. 154(b) by 58 days.

(21) Appl. No.: 18/461,411

(22) Filed: Sep. 5, 2023

(65) Prior Publication Data

US 2024/0141996 A1     May 2, 2024

Related U.S. Application Data

(63) Continuation-in-part of application No. 18/202,215, filed on May 25, 2023, now Pat. No. 11,940,049, which is a continuation-in-part of application No. 18/088,040, filed on Dec. 23, 2022, now Pat. No. 11,746,906, which is a continuation-in-part of application No. 18/051,805, filed on Nov. 1, 2022.

(51) Int. Cl.
*F16J 15/3232*     (2016.01)

(52) U.S. Cl.
CPC ................. *F16J 15/3232* (2013.01)

(58) Field of Classification Search
CPC .... F16J 15/16; F16J 15/18; F16J 15/32; F16J 15/3232; F16J 15/3236; F16J 15/166
USPC ......................................................... 277/309
See application file for complete search history.

(56) References Cited

U.S. PATENT DOCUMENTS

| | | |
|---|---|---|
| 4,434,863 A | 3/1984 | Garrett |
| 4,578,856 A | 4/1986 | Butler |

(Continued)

FOREIGN PATENT DOCUMENTS

| | | |
|---|---|---|
| CN | 110307336 A | 10/2019 |
| JP | 2555588 B2 | 11/1996 |

(Continued)

OTHER PUBLICATIONS

Garlock Rotary Shaft Seal, PS-SEAL® Rotary Shaft Seal, 1.4571/316Ti Case, Dual Back-to-Back Lips with F Lip Clamp Ring Side and F Lip Case Side, GYLON Standard Support Ring, FKM Static Seal, 15.90 mm Shaft Size X 30.00 mm Bore Size X 8.00 mm Width, 3.00 mm Preload, 10 bar Max Pressure, PTFE Shaft Seals, Garlock Part: MEC04-14199, 2 pages, Retrieved on May 31, 2023 from: https://www.garlock.com/product/mec04-14199?setcontextlanguagecode=en.

(Continued)

*Primary Examiner* — Nathan Cumar
(74) *Attorney, Agent, or Firm* — Alumen IP Law PC

(57) ABSTRACT

Seal assemblies, gaskets, bearing assemblies, and their components can be used as pre-packaged seal systems and pre-packaged seal and bearing systems. The seal assemblies can be orientated in different configurations for different applications. Gaskets or washers to restrict flow and gaskets or washers with memory lips to operate as sealing lips can be included to increase the number of sealing points. In a pre-packaged configuration, the cylinder can be a straight cylinder, a stepped cylinder, or a split cylinder. Bearing assemblies can be pre-packaged with the sealing assemblies and service grease may optionally be used to provide lubrication and limit fluid incursion into the spring cavities.

55 Claims, 17 Drawing Sheets

(56) References Cited

U.S. PATENT DOCUMENTS

| | | | |
|---|---|---|---|
| 4,613,143 A | 9/1986 | Butler | |
| 4,655,945 A | 4/1987 | Balsells | |
| 4,804,290 A | 2/1989 | Balsells | |
| 4,805,943 A | 2/1989 | Balsells | |
| 4,848,776 A | 7/1989 | Winckler | |
| 5,072,070 A | 12/1991 | Balsells | |
| 5,079,388 A | 1/1992 | Balsells | |
| 5,091,606 A | 2/1992 | Balsells | |
| 5,117,066 A | 5/1992 | Balsells | |
| 5,134,244 A | 7/1992 | Balsells | |
| 5,161,806 A | 11/1992 | Balsells | |
| 5,265,890 A | 11/1993 | Balsells | |
| 5,358,224 A | 10/1994 | Balsells | |
| 5,474,309 A | 12/1995 | Balsells | |
| 5,575,487 A | 11/1996 | Balsells | |
| 5,599,027 A | 2/1997 | Balsells | |
| 5,979,904 A | 11/1999 | Balsells | |
| 5,984,316 A | 11/1999 | Balsells | |
| 5,992,856 A | 11/1999 | Basells et al. | |
| 6,050,572 A | 4/2000 | Balsells et al. | |
| 6,161,838 A * | 12/2000 | Balsells | F16J 15/3212 277/572 |
| 6,264,205 B1 * | 7/2001 | Balsells | F16J 15/3212 277/572 |
| 6,641,141 B2 * | 11/2003 | Schroeder | F16J 15/48 277/572 |
| 7,111,821 B2 | 9/2006 | Promper | |
| 7,210,398 B2 | 5/2007 | Balsells | |
| 7,464,750 B2 | 12/2008 | Schapel et al. | |
| 7,883,094 B2 | 2/2011 | Vila | |
| 8,096,559 B2 | 1/2012 | Cook | |
| 8,328,202 B2 | 12/2012 | Foster et al. | |
| 8,544,850 B2 * | 10/2013 | Balsells | F16J 15/3236 277/572 |
| 8,684,362 B2 | 4/2014 | Balsells et al. | |
| 9,033,345 B2 | 5/2015 | Hintenlang et al. | |
| 9,194,497 B2 * | 11/2015 | Rastegar | F16J 15/3208 |
| 9,234,591 B2 * | 1/2016 | Dilmaghanian | F16J 15/324 |
| 9,285,034 B2 | 3/2016 | Balsells et al. | |
| 9,357,684 B2 | 5/2016 | Foster | |
| 9,541,199 B2 * | 1/2017 | Rust | F16J 15/3236 |
| 9,829,028 B2 | 11/2017 | Changsrivong et al. | |
| 10,125,872 B2 * | 11/2018 | Binder | F16J 15/322 |
| 10,145,473 B2 | 12/2018 | Angiulli et al. | |
| 10,190,690 B2 * | 1/2019 | Colineau | F16J 15/3232 |
| 10,263,368 B2 | 4/2019 | Young et al. | |
| 10,520,091 B2 | 12/2019 | Niknezhad | |
| 2002/0153664 A1 * | 10/2002 | Schroeder | F16J 15/56 277/551 |
| 2004/0026868 A1 | 2/2004 | Dahlheimer | |
| 2006/0125189 A1 | 6/2006 | Peschke et al. | |
| 2007/0057472 A1 | 3/2007 | Hatch | |
| 2008/0122184 A1 | 5/2008 | Hocker | |
| 2009/0146379 A1 * | 6/2009 | Foster | F16J 15/3236 277/307 |
| 2010/0237565 A1 * | 9/2010 | Foster | F16J 15/3236 277/377 |
| 2010/0237566 A1 * | 9/2010 | Balsells | F16J 15/3236 277/637 |
| 2011/0006486 A1 * | 1/2011 | Niknezhad | F16J 15/3232 29/428 |
| 2011/0036433 A1 | 2/2011 | Spahr | |
| 2013/0043661 A1 * | 2/2013 | Binder | F16J 15/322 277/584 |
| 2014/0191451 A1 | 7/2014 | Moss | |
| 2014/0312570 A1 | 10/2014 | Foster | |
| 2015/0061227 A1 * | 3/2015 | Rastegar | F16J 15/3208 277/557 |
| 2016/0047473 A1 | 2/2016 | Foster et al. | |
| 2016/0223086 A1 | 8/2016 | Balsells et al. | |
| 2016/0273656 A1 | 9/2016 | Lopez | |
| 2016/0290507 A1 | 10/2016 | Chapagain et al. | |
| 2017/0172018 A1 | 6/2017 | Dilmaghanian et al. | |
| 2017/0261108 A1 * | 9/2017 | Soler | F16J 15/3212 |
| 2017/0328474 A1 | 11/2017 | Balsells | |
| 2018/0112778 A1 * | 4/2018 | Dilmaghanian | F16J 15/3284 |
| 2018/0119857 A1 | 5/2018 | Balsells | |
| 2018/0266562 A1 | 9/2018 | Balsells | |
| 2020/0208743 A1 | 7/2020 | Duong et al. | |
| 2020/0360919 A1 | 11/2020 | Guzman et al. | |
| 2022/0161018 A1 | 5/2022 | Mitze et al. | |
| 2022/0161019 A1 | 5/2022 | Mitze et al. | |
| 2022/0161021 A1 | 5/2022 | Mitze et al. | |

FOREIGN PATENT DOCUMENTS

| | | |
|---|---|---|
| WO | WO 2009019137 A1 | 2/2009 |
| WO | WO 2014140379 A1 | 9/2014 |
| WO | WO 2022/109589 | 5/2022 |
| WO | WO 2022/109590 A1 | 5/2022 |
| WO | WO 2022/109591 A2 | 5/2022 |
| WO | WO 2023014742 A1 | 2/2023 |

OTHER PUBLICATIONS

Hameder, Brian, Patent Search Report, Patentability Search, Double Seal Assembly, Cadinal Intellectual Property, Evanston, IL, May 31, 2023, 16 pages, Ref. No. 1129-172.801.

Rotary Oil Seal, Rotary Seal Design Guide, Parker, Parker Hannifin Corporation, 2006, 400 pages, Retrieved on May 31, 2023 from: https://www.parker.com/content/dam/Parker-com/Literature/Engineered-Polymer-Systems/5350.pdf.

SKF Radial shaft, PTFE seals, 2 pages, Retrieved on May 31, 2023 from: https://www.skf.com/id/products/industrial-seals/power-transmission-seals/radial-shaft-seals/general-industrial-applications/ptfe.

Non-Final Office Action on co-pending US application (U.S. Appl. No. 18/088,040) dated Apr. 6, 2023.

Non-Final Office Action on co-pending US application (U.S. Appl. No. 18/202,215) dated Aug. 4, 2023.

* cited by examiner

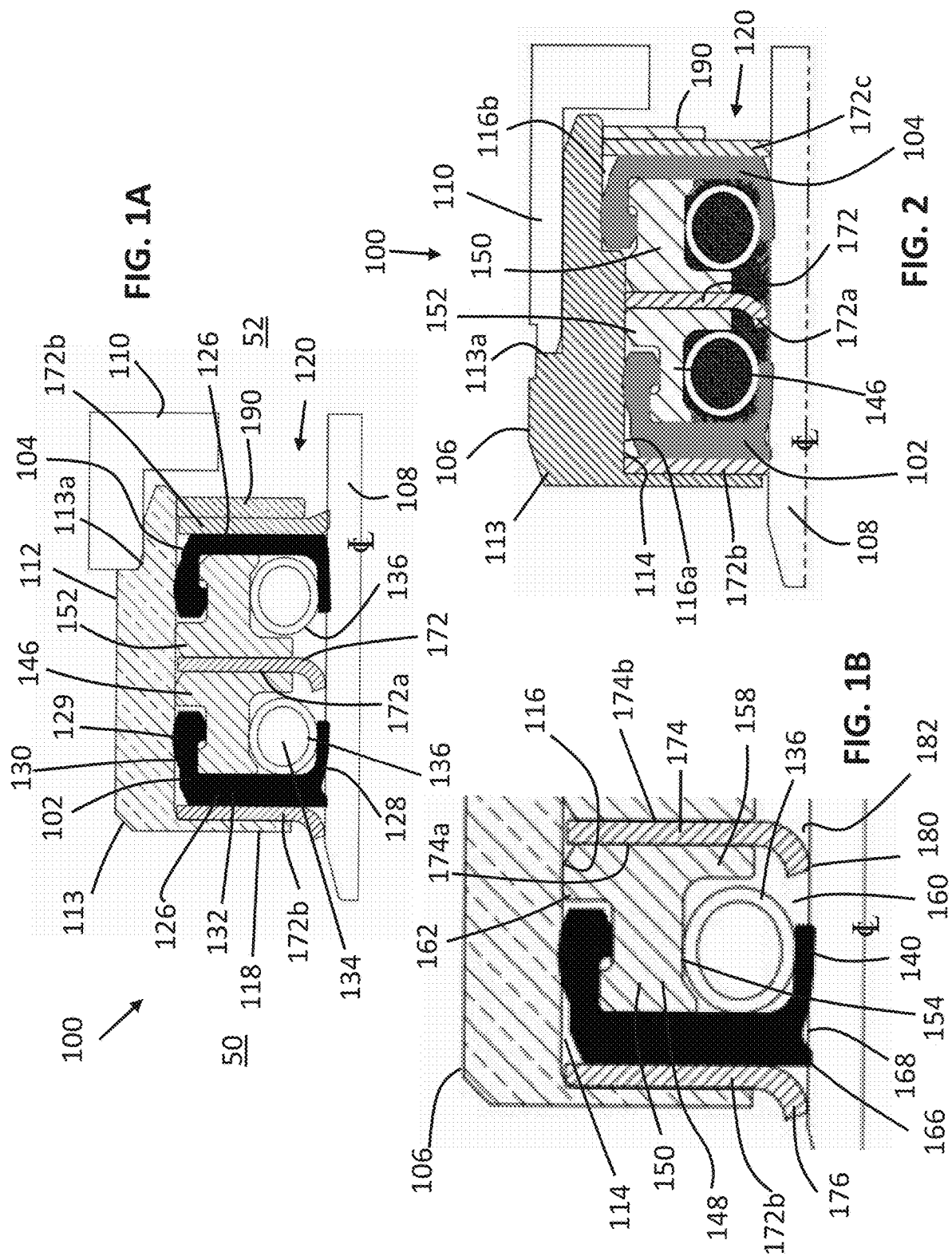

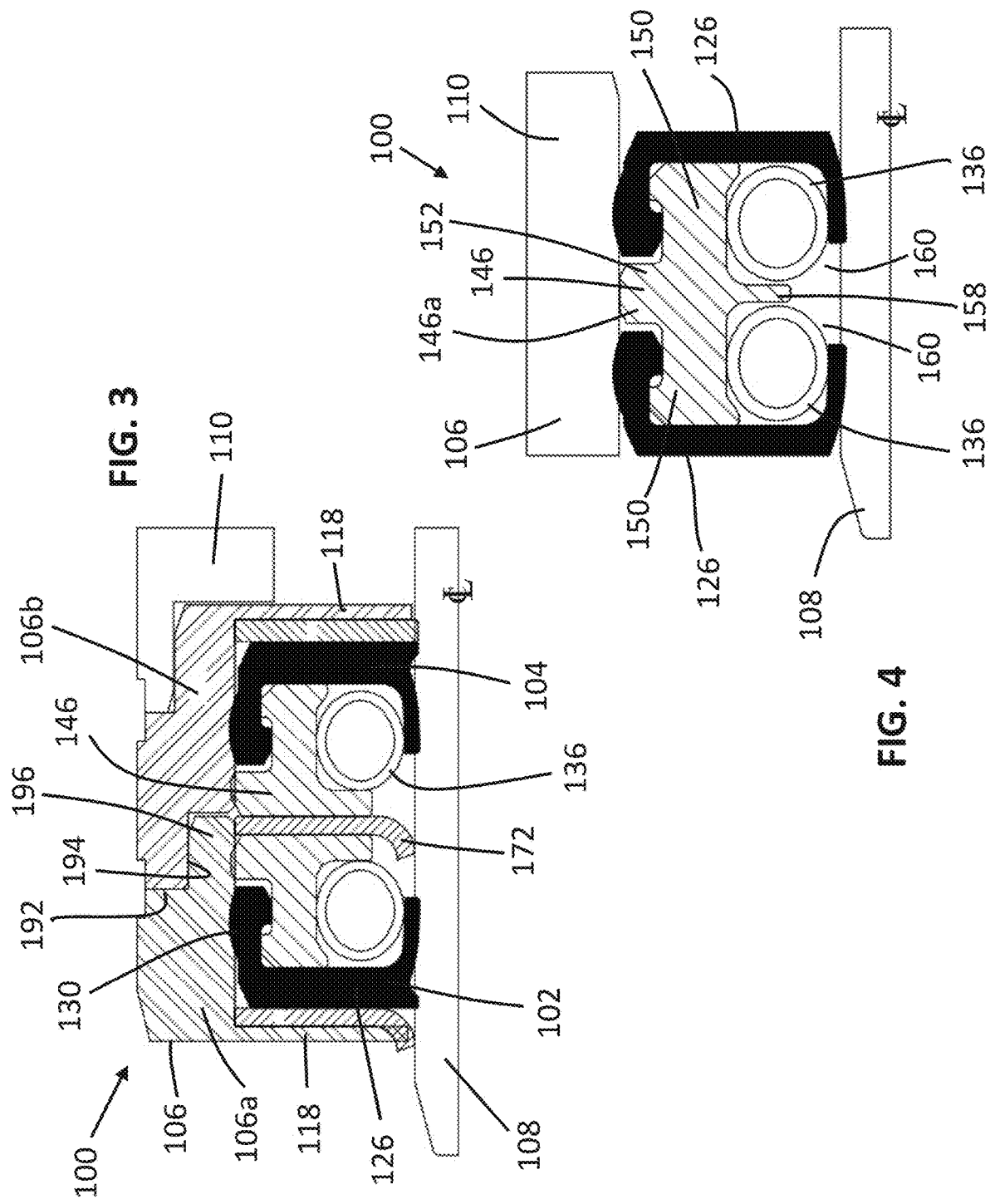

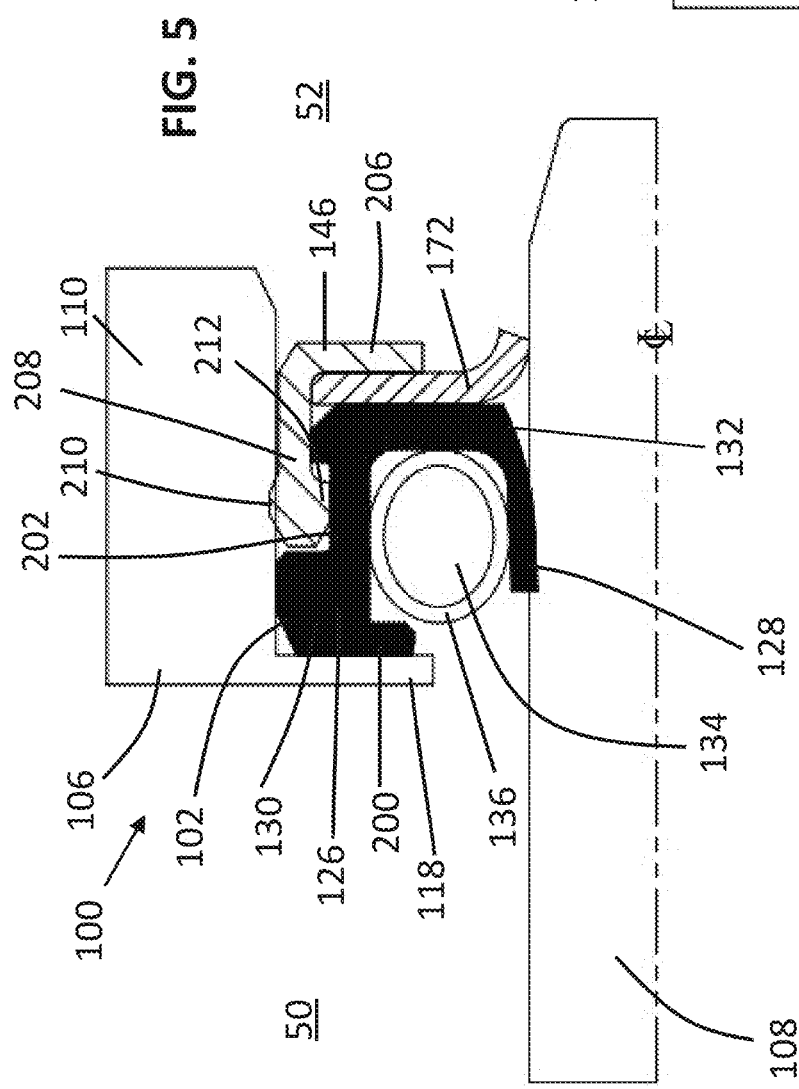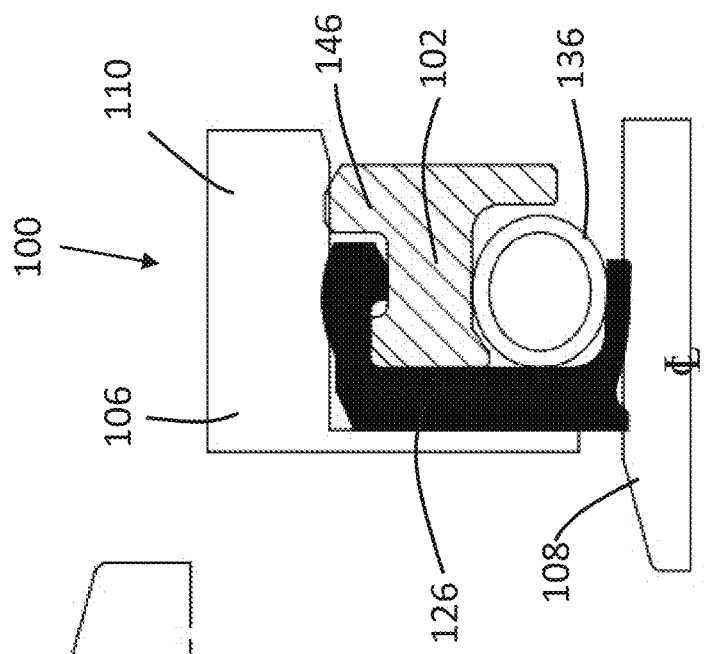

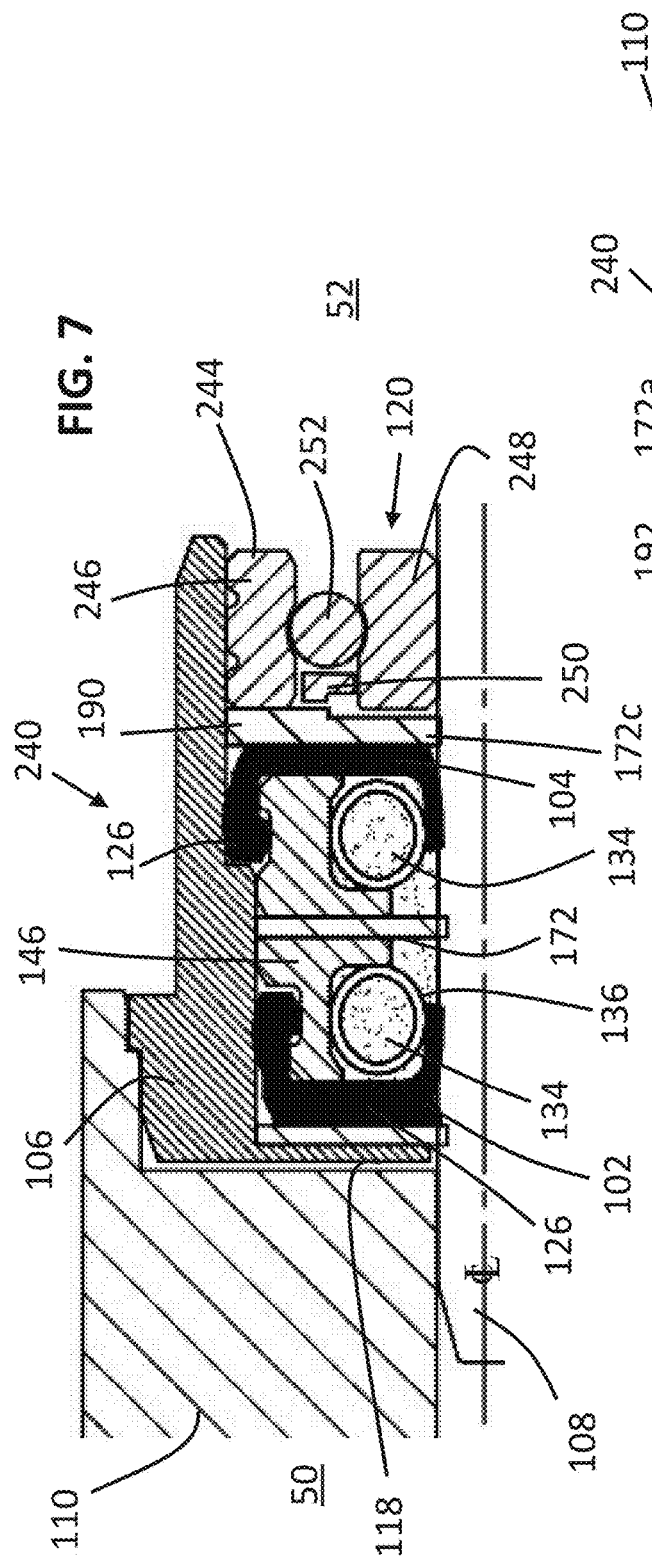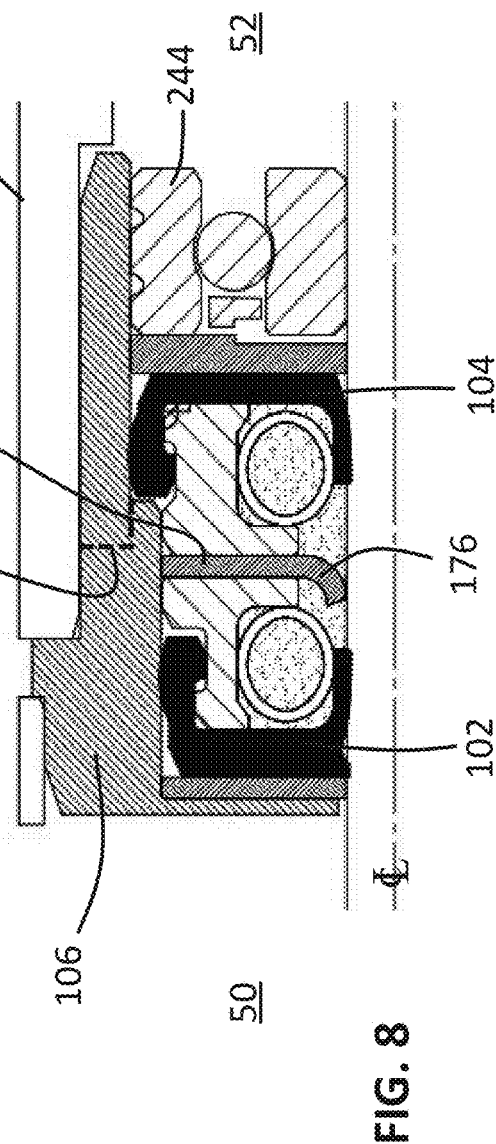

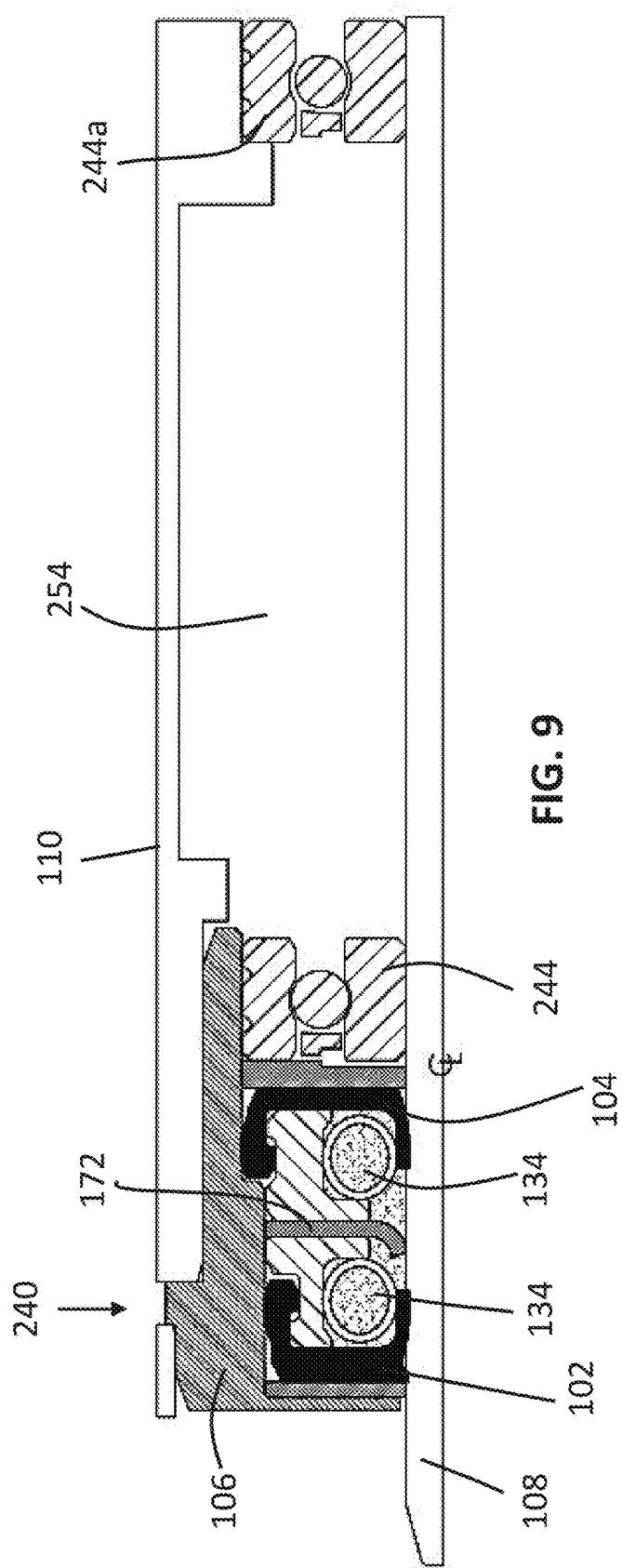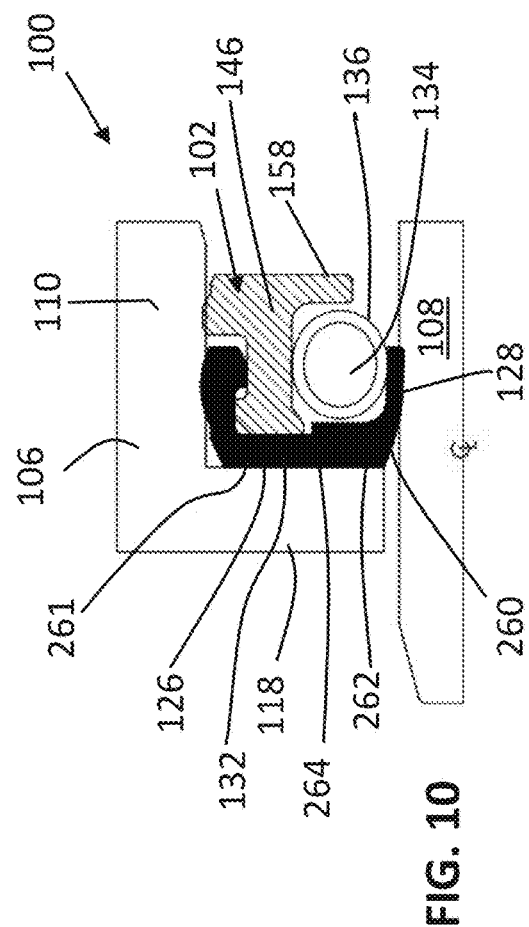
FIG. 9
FIG. 10

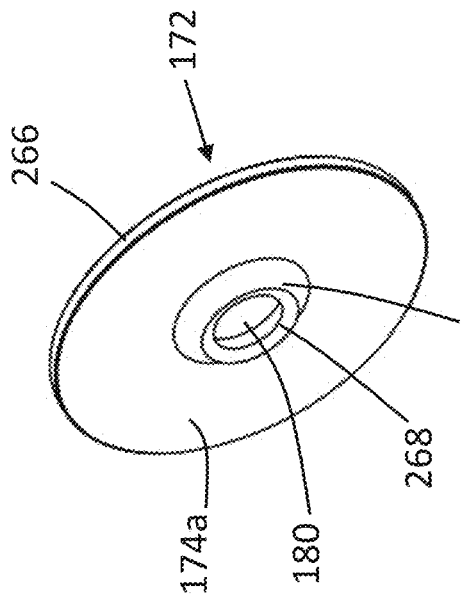
FIG. 11A
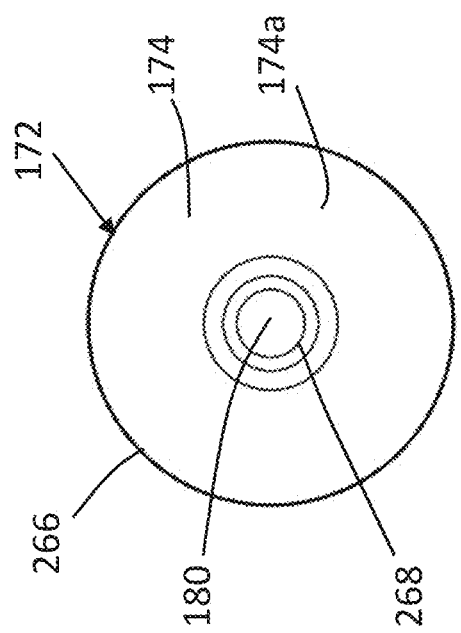
FIG. 11C
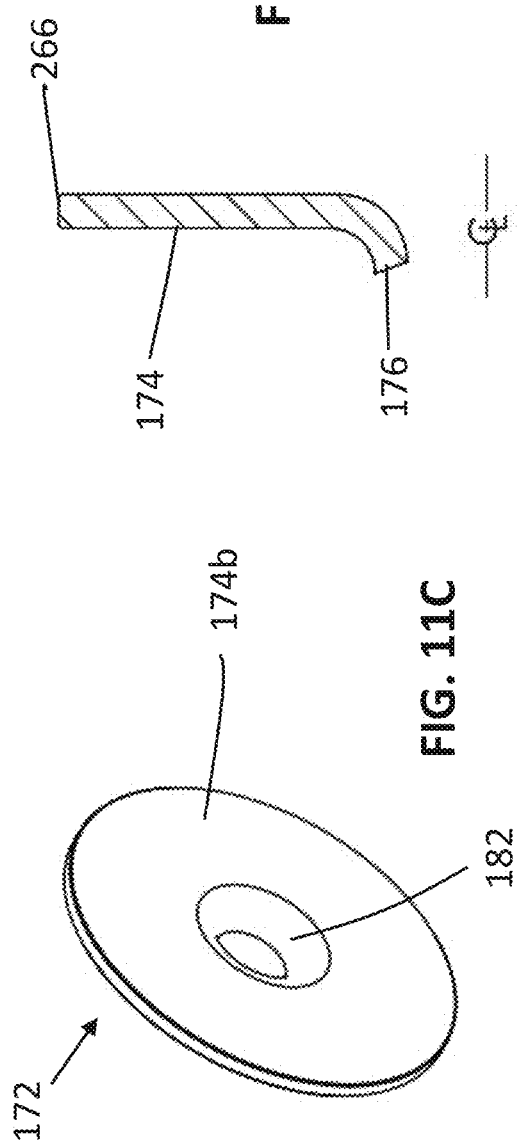
FIG. 11B
FIG. 11D

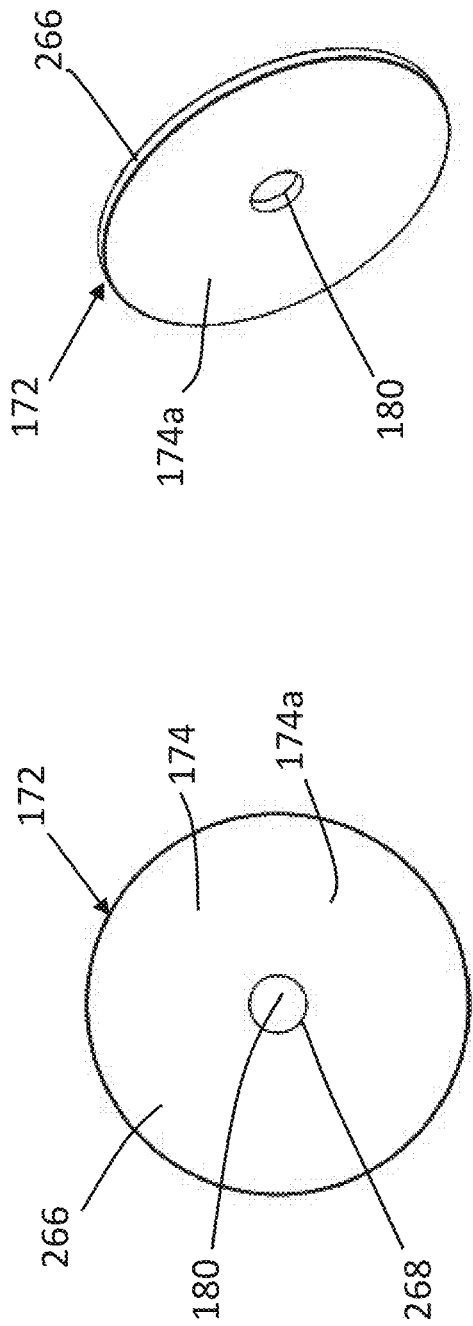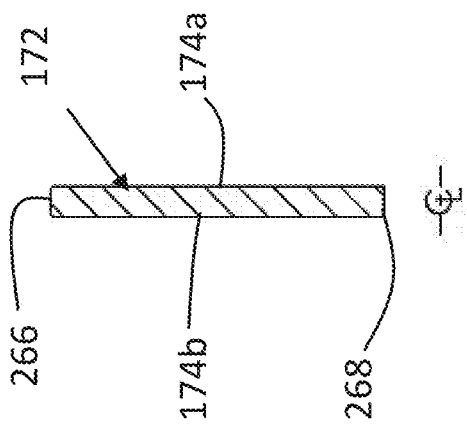
FIG. 13A
FIG. 13B
FIG. 13C

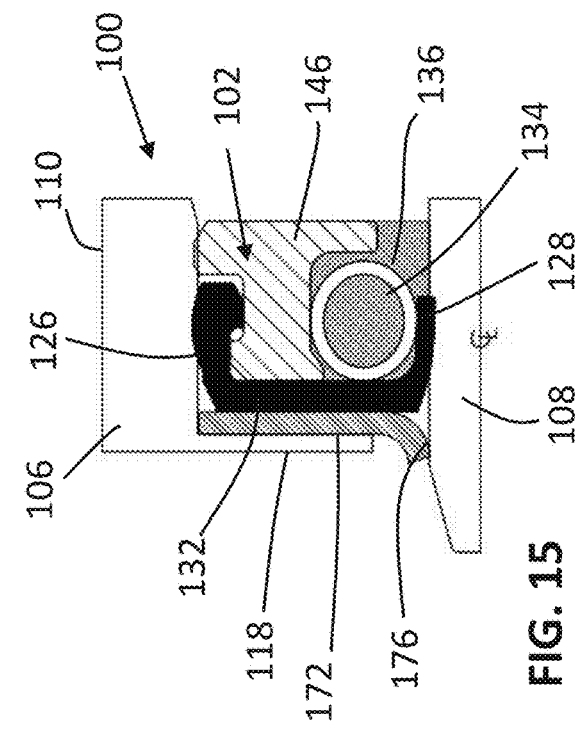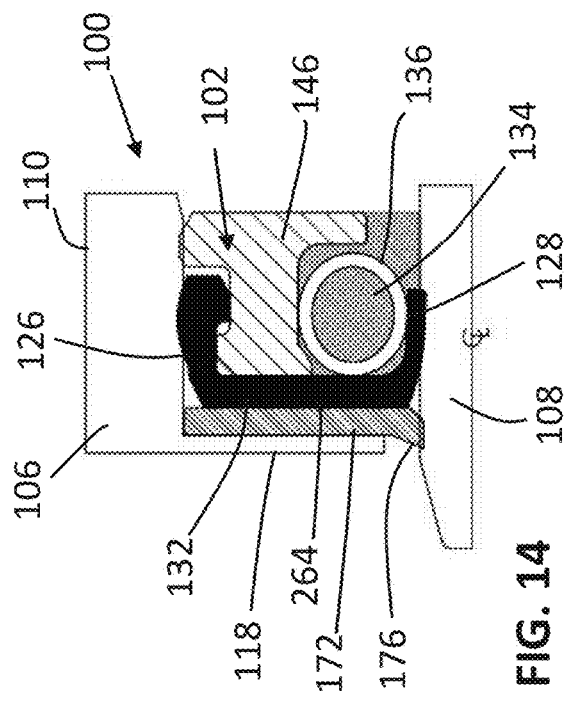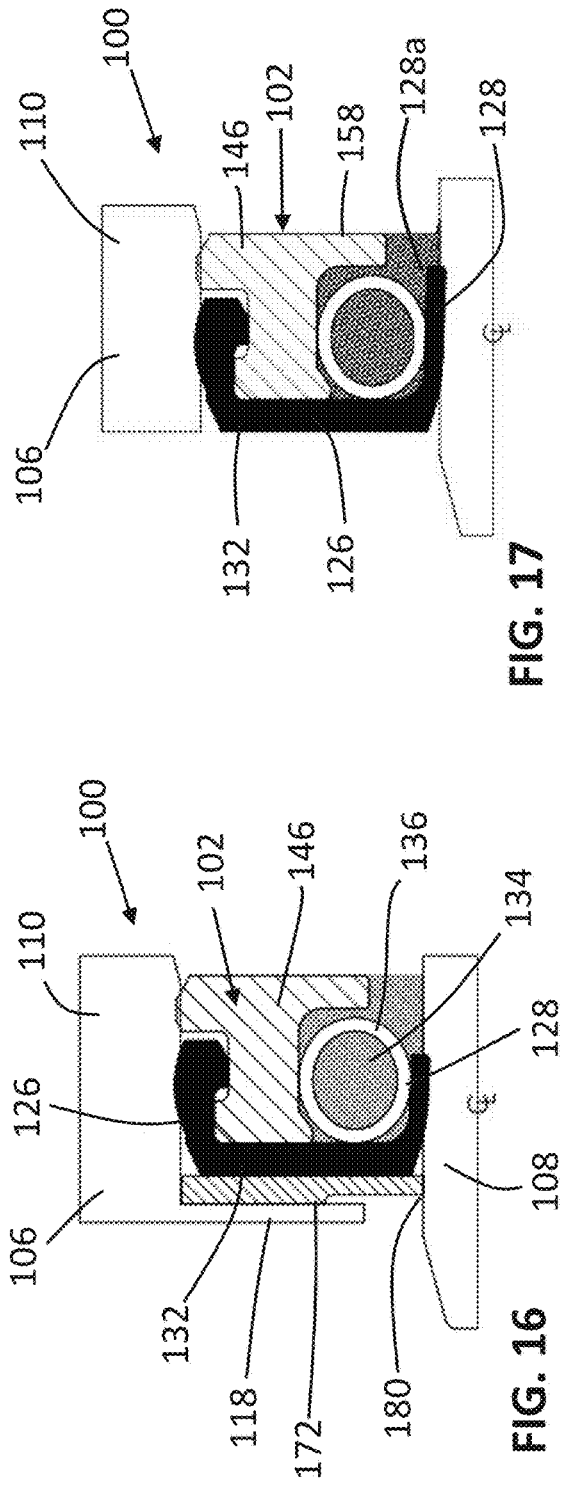

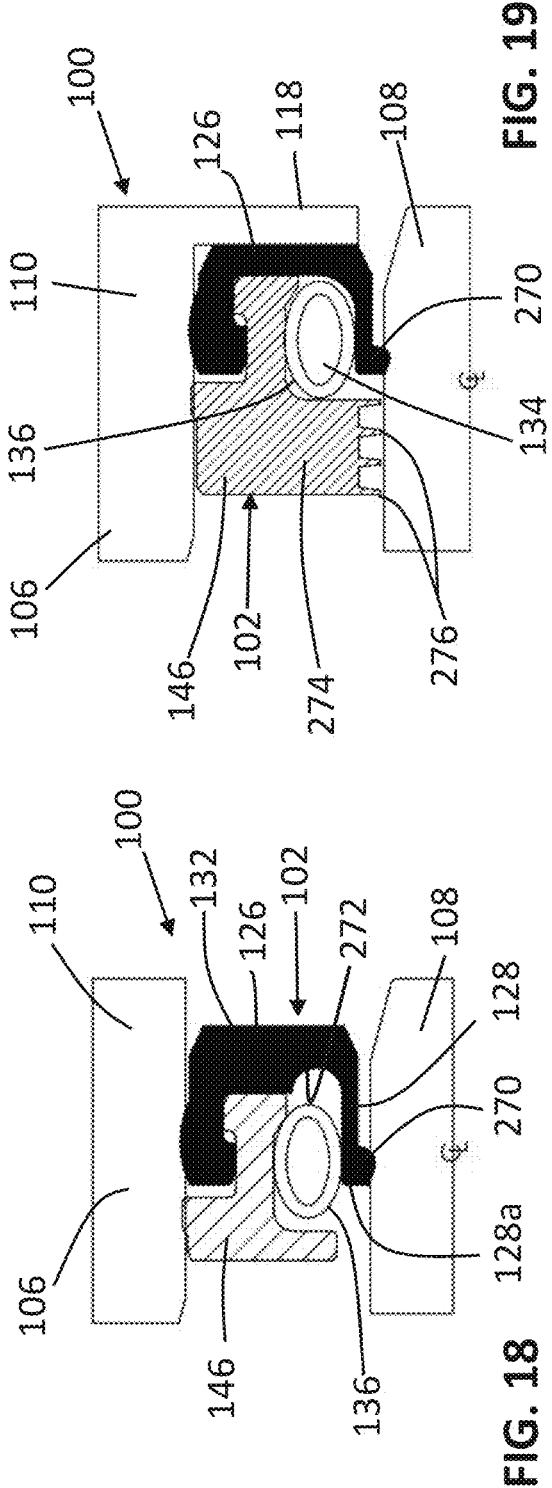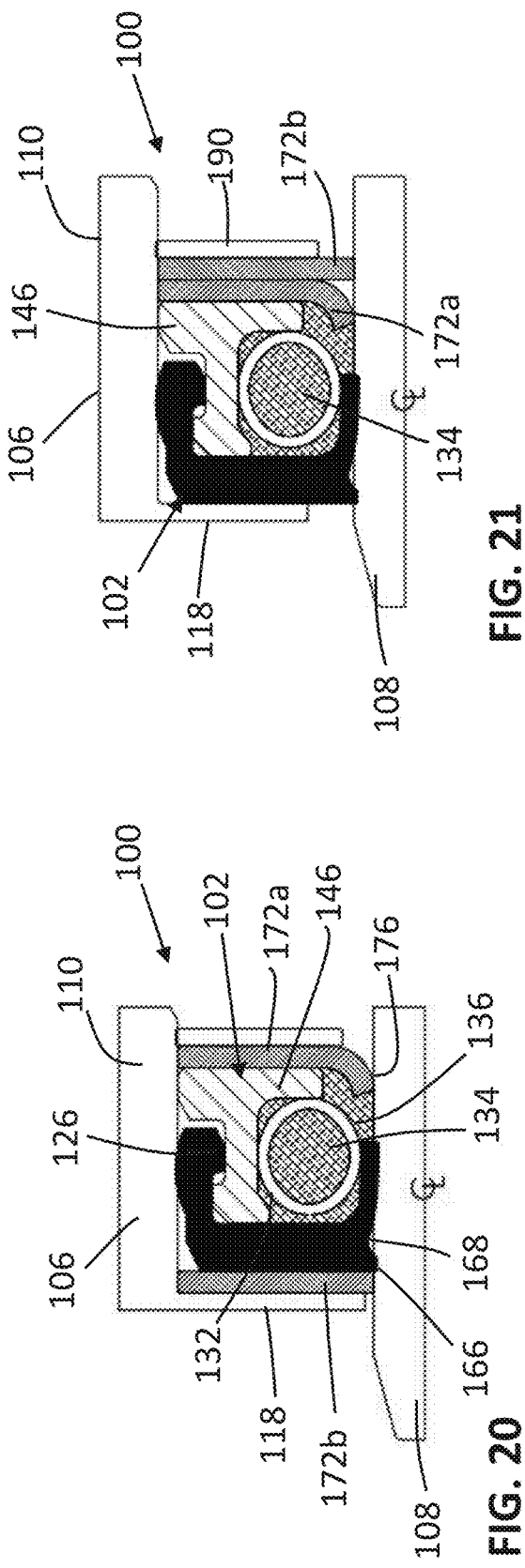

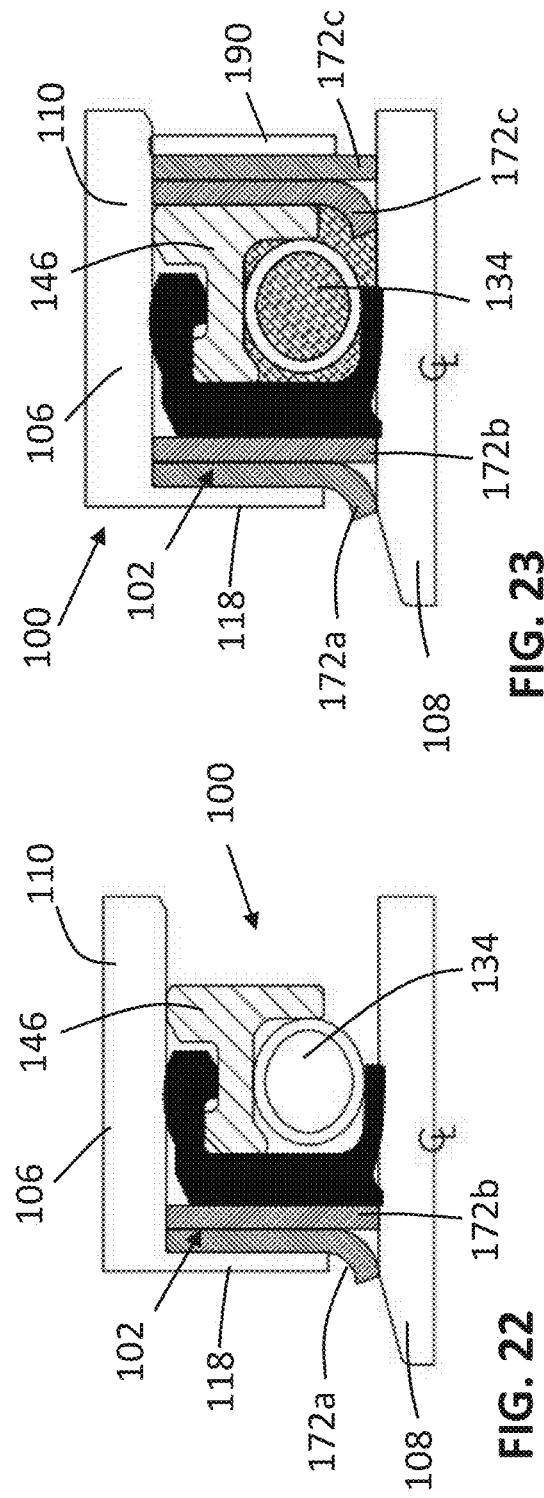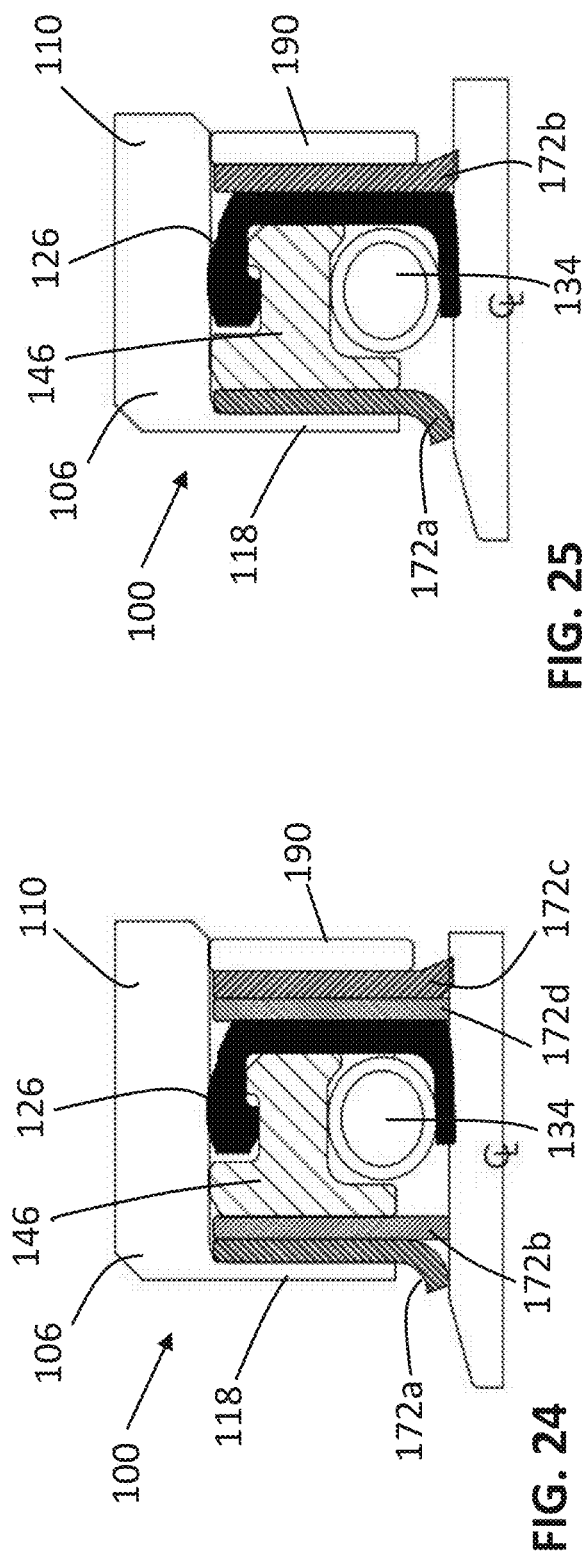
FIG. 22  FIG. 23  FIG. 24  FIG. 25

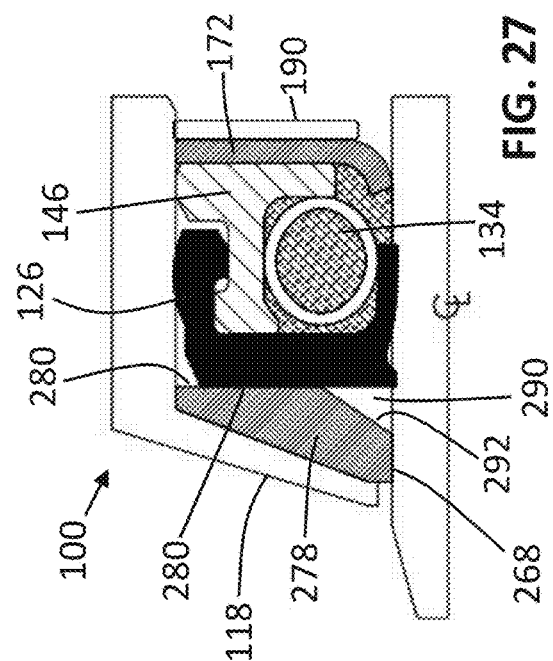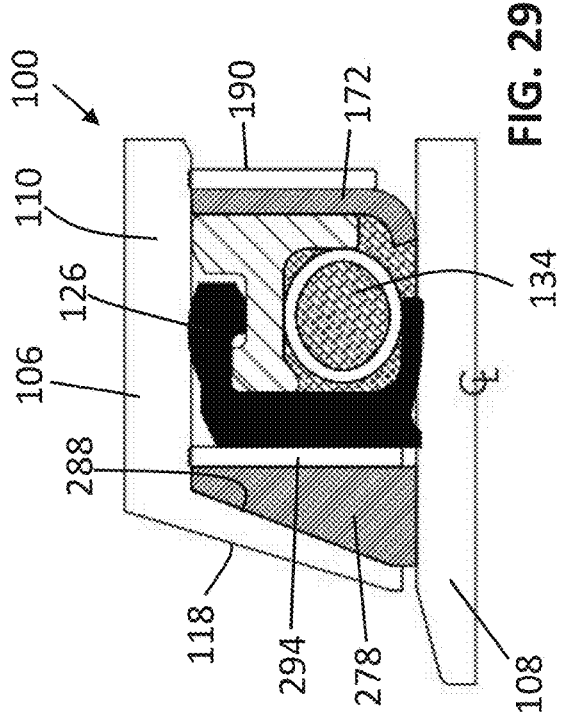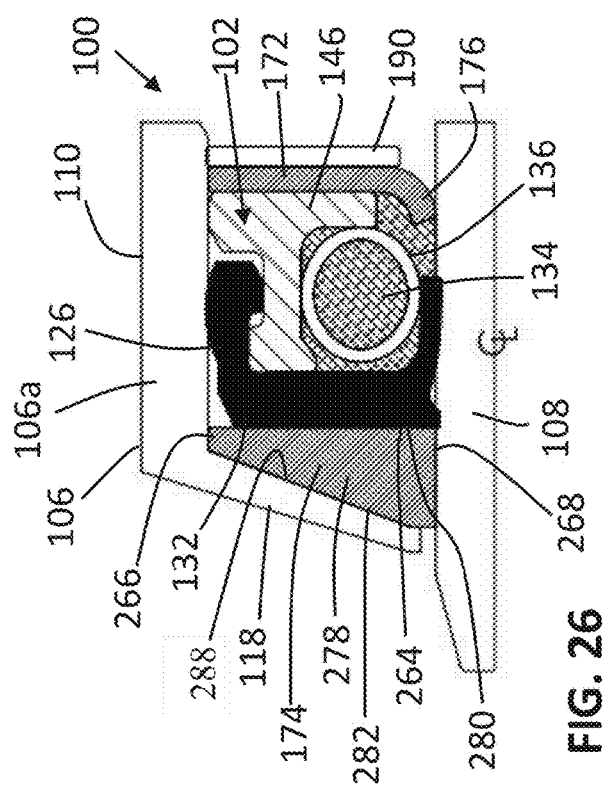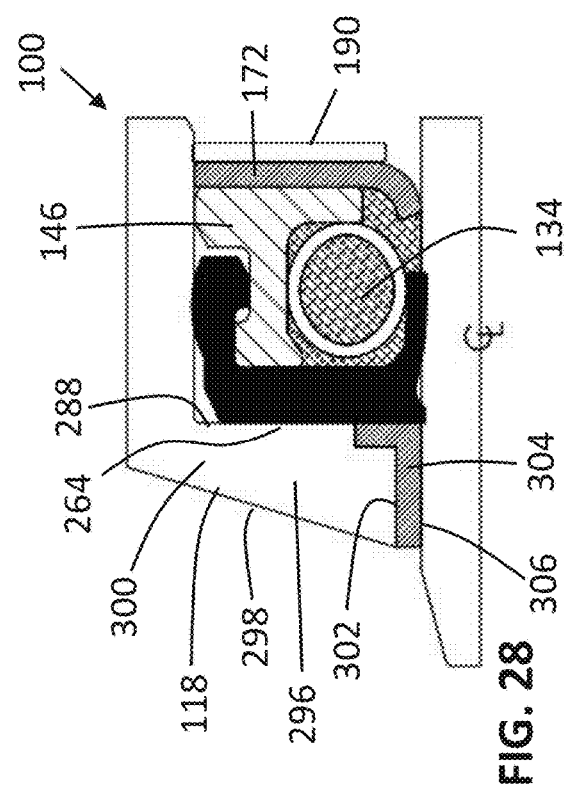

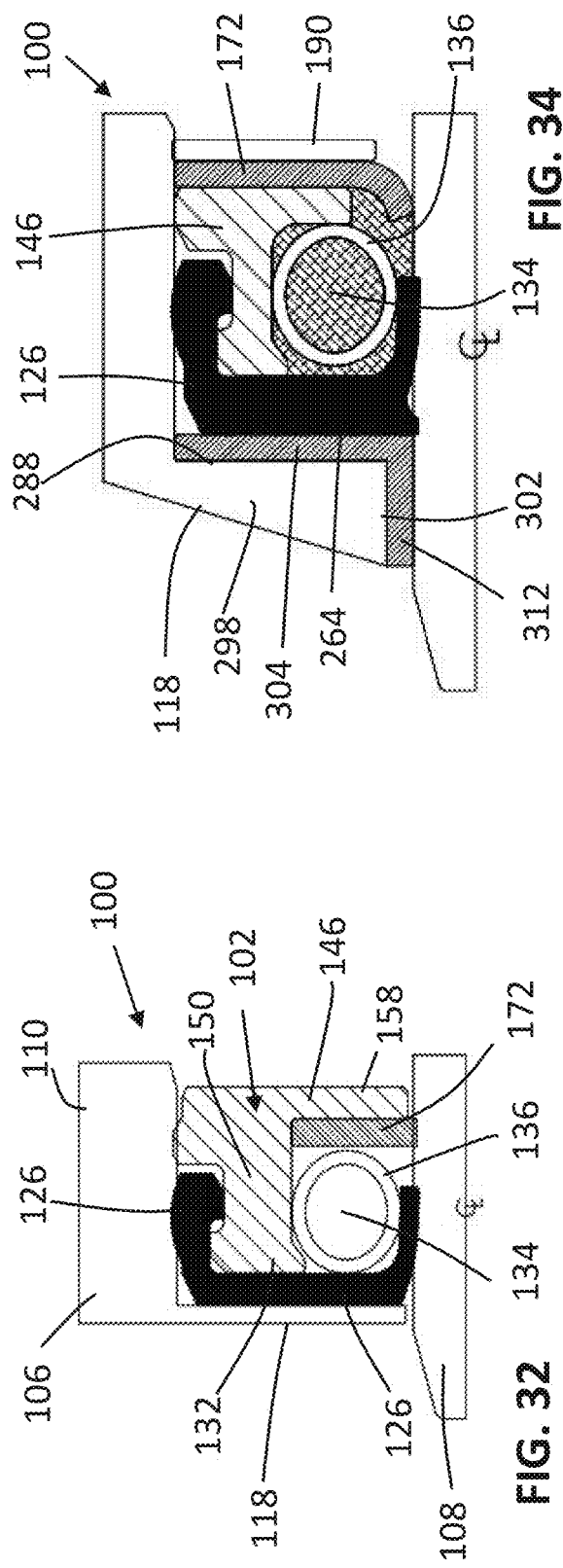

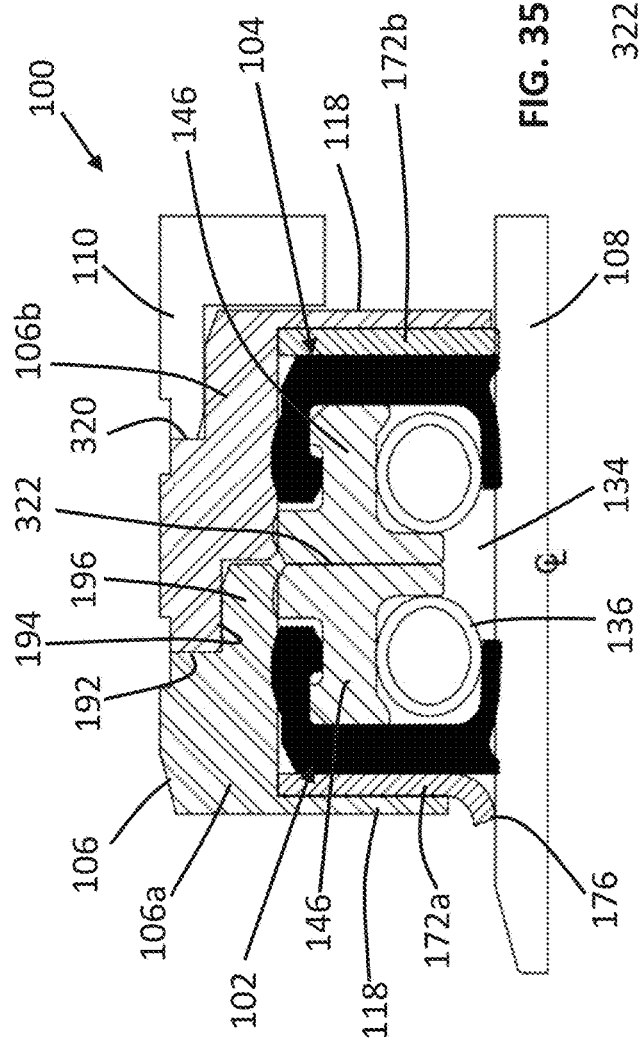
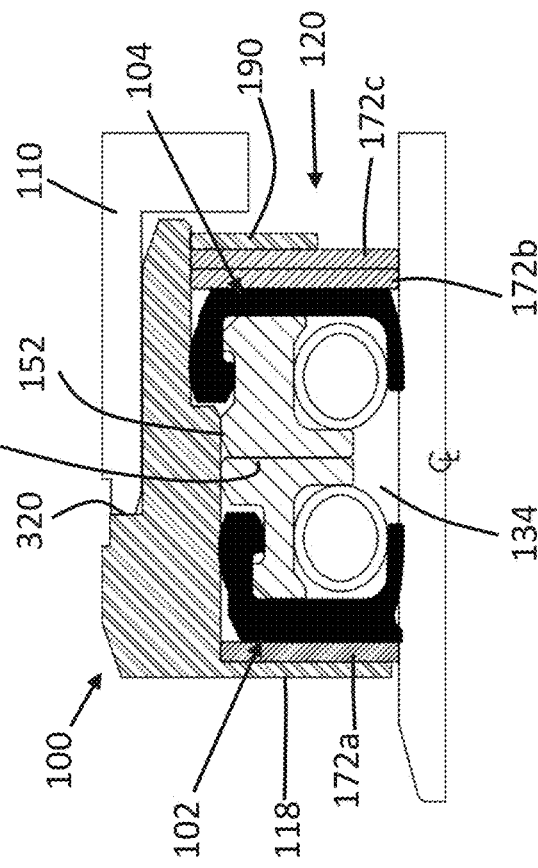
FIG. 35
FIG. 36

LIP SEALS AND RELATED METHODS

CROSS-REFERENCED TO RELATED APPLICATION

This is a continuation-in-part of application Ser. No. 18/202,215, filed May 25, 2023, which is a continuation-in-part of application Ser. No. 18/088,040, filed Dec. 23, 2022, which is a continuation-in-part of application Ser. No. 18/051,805, filed Nov. 1, 2022; the contents of each of which are expressly incorporated herein by reference.

FIELD OF ART

The present disclosure is generally related to lip seals with specific discussions on spring energized lip seals and lip seals with bearing assemblies and related methods.

BACKGROUND

Bearings, such as ball bearings and roller bearings, are known for supporting an element, such as a shaft, which rotates within an outer stationary element, such as a housing. Lip seals, which can have an energizer, are known for providing a seal to flow path located between a dynamic surface and a stationary surface, such as a shaft and a housing, to prevent liquid flow from a high-pressure region to a relatively lower pressure region.

When an application uses both a seal and a bearing, the two are typically spaced or not connected to one another. Further, the seal and the bearing are typically mounted sequentially, one after the other. When used together, the seal is configured to prevent fluid, such as oil, from leaking out from the bearing box that contains the bearing and/or process fluid from leaking into the bearing box.

SUMMARY

Aspects of the invention are directed to a pre-packaged seal system and a pre-packaged seal and bearing system.

In an example, the pre-packaged seal system can comprise a cylinder having a body, an interior surface defining a bore, a retaining end having a retaining wall at one end of the bore, and an insertion end at an opposite end of the bore; a first seal assembly comprising a seal element, a locking ring, and an energizer; wherein the seal element comprising a spring cavity formed by an inside flange, an outside flange, and a center channel section and wherein part of the spring cavity is shaped by the locking ring; a second seal assembly comprising a seal element, a locking ring, and an energizer; wherein the seal element comprising a spring cavity formed by an inside flange, an outside flange, and a center channel section and wherein part of the spring cavity is shaped by the locking ring; at least one washer comprising an outside perimeter, an inside perimeter defining an opening, and a memory lip having a curved portion at the opening; and wherein the first seal assembly, the second seal assembly, and the at least one washer are located in the bore of the cylinder prior to mounting on a shaft and wherein the at least one washer is located between the first seal assembly and the second seal assembly.

The cylinder can be a housing and can be called a cylinder housing, or housing cylinder.

The bore can have a first portion with a first inside diameter and a second portion with a second inside diameter, and wherein the second inside diameter can be larger than the first inside diameter.

The cylinder can have a first cylinder section attached to a second cylinder section along a split line.

A bearing assembly can be included with the seal system, the bearing assembly can comprise an outer ring, an inner ring, a cage retaining a plurality of rolling elements; and wherein the outer ring can be engaged are fitted to the bore of the cylinder in an interference fit.

The bore with the bearing assembly located therein can have a first portion with a first inside diameter and a second portion with a second inside diameter, and wherein the second inside diameter is larger than the first inside diameter.

The cylinder with the bearing assembly located therein can have a first cylinder section attached to a second cylinder section along a split line.

The bearing assembly can be a first bearing assembly and further comprising a second bearing assembly spaced from the first bearing assembly and the second bearing assembly can be secured to a housing and the housing can be in contact with the cylinder.

Aspects of the invention further includes a seal assembly, the seal assembly can comprise a locking ring comprising a locking flange and an inner flange extension aligned with one another along an axial position, a first deck having a notch on a first side of the inner flange and a second deck having a notch on a second side of the infer flange; a first seal element having an inside flange and an outside flange mechanically engaged to the notch of the first deck and having a first energizer biasing against the inside flange of the first seal element and an inner surface of the first deck; and a second seal element having an inside flange and an outside flange mechanically engaged to the notch of the second deck and having a second energizer biasing against the inside flange second seal element and an inner surface of the second deck.

A still further aspect of the invention includes a seal assembly comprising a seal element comprising an outside flange, an inside flange, and a center channel section connected to the inside flange and the outside flange; a washer comprising an outside perimeter, an inside perimeter defining an opening, and a memory lip having a curved portion at the opening; a locking ring comprising a first ring portion connected to a second ring portion at an intersection; wherein the second ring portion has a planar surface, a first projection on a first side of the planar surface; and a second projection on a second side of the planar surface; wherein the second projection of the second ring portion mechanically engages a notch on an outer surface of the outside flange and the center channel section and the washer are both located between the first ring portion and the second projection.

A still further aspect of the invention is a method of using pre-packaged seal systems and pre-packaged seal and bearing systems and components thereof as shown and described.

A still further aspect of the invention is a method of manufacturing or making pre-packaged seal systems and a pre-packaged seal and bearing systems and components thereof as shown and described.

The terms first and second and related generic terms, as used herein, are meant to identify components by nomenclature only and are not structurally limiting unless the context indicates otherwise.

A seal system in accordance with aspects of the invention comprises a first seal assembly 102 and a second seal assembly 104 located inside a can or cylinder. The seal system can be located inside a pump, a blower, a turbine, an actuator, or other equipment having a shaft or pin movable within a housing, such as in electronic applications, avionics, space, oil and gas, and medical applications, to name a few non-limiting examples. The seal system is understood to be generally circular and has a bore for receiving the shaft or pin, which is partially shown in the various figures of the application with a centerline t.

The exterior of the cylinder can be adjusted, such as crafted or machined, to mate with and housed within the housing of the device for the particular application. Thus, specific exterior configuration of the cylinder can be adjusted or configured, such as being sized and shaped, for installing in an equipment housing without deviating from the spirit of the present invention. The cylinder ca be a housing and can be called a cylinder housing or housing cylinder.

The can for retaining the two seal assemblies can have a body comprising a wall with an exterior wall surface and an interior wall surface defining a bore. The exterior wall surface can have a shoulder for mating with the equipment housing. The body can have two open ends for assembling the two seal assemblies from either end of the body. In an embodiment, a retaining wall is provided at one of the two ends of the body to define a retaining end, which prevents components of the seal system from escaping from the bore out through the retaining end. By default, the opposite end of the body is the insertion end or the assembly end for placement of seal components into the bore to form the seal system, as further discussed below.

The cylinder can be used to house seal components to form the seal system prior to assembly onto a shaft and then into a device or equipment housing. When pre-installed inside the can, the seal system may be referred to as a pre-packaged seal system. The pre-packaged seal system is thereafter ready for mounting, as a unit, onto the shaft and then the pre-packaged seal system and shaft can be installed in the requirement housing. The cylinder size, dimensions, and material can be selected for the particular application. Metal, such as stainless steel and alloys, may be used for most applications and stainless steel, cobalt chrome steels, titanium alloys, and platinum metals may be used for medical implant applications.

In an embodiment, the interior wall surface of the cylinder has a straight bore, which can be understood as having generally the same inside diameter throughout the cylinder without a purposeful step or shoulder incorporated within the bore. The entrance of the insertion end of the cylinder can be chamfered to eliminate sharp edges and facilitate insertion of seal components. Externally, the exterior wall surface of the cylinder may include chamfered surfaces, annular grooves, and/or one or more stepped surfaces to cooperate or mate with the equipment housing that the seal system is be installed into. For example, an annular groove may be on the exterior for use with an O-ring for sealing against the housing or used with a biasing spring, such as a canted coil spring, to bias against the housing. The cylinder can be a housing and can be called a housing cylinder.

The first seal assembly of the pre-packaged seal system can comprise a seal element comprising an inside or inner flange, an outside or outer flange, and a center channel section connecting the inner and outer flanges and defining a cavity therebetween, which can accommodate an energizer. The cavity may be referred to as a spring cavity for accommodating a biasing spring or an energizer, as further discussed below. The seal element can be non-metallic element and may be made from an elastomeric material, thermoplastic material, such as PTFE, PE or PEEK, or any other special polymers. The particular elastomer, thermoplastic or polymer, can vary depending on the application.

In an embodiment, the energizer is a canted coil spring comprising a plurality of interconnected coils all canted generally in the same direction and the coils operate to bias the inner flange away from the outer flange to press and seal against the shaft. Each of the coil of the canted coil spring can have an elliptical shape or a non-elliptical shape, such as square, rectangular, or a combination of straight edges and curved edges. In other examples, the energizer can be an O-ring or a different metallic spring type, such as a ribbon spring, a V-spring, or a helical compression or extension spring. In some examples, such as in relatively low pressure applications, the energizer can be omitted, and the seal is a lip seal type but not a spring energized lip seal.

Where the energizer is located in a cavity defined in part by a locking ring and the inside flange, the energizer, such as a canted coil spring comprising a plurality of interconnected coils, biases against both the inside flange and the locking ring, such as the deck of the locking ring. If the cavity is defined by the seal element only, then the energizer biases against both the inside flange and the outside flange of the seal element to bias the two away from one another.

In an example, the inside flange of the sealing element has an inside diameter for placing around the shaft and a sealing lip that is pressed against the shaft surface to provide a dynamic seal, when the shaft moves or rotates. The inside diameter is preferably smaller than the shaft OD so as to create an interference fit. The sealing lip can have a long dynamic surface that is about 20% to about 75% of the length of the inside flange or a short dynamic surface that is about 5% to about 20% of the length of the inside flange. The sealing lip can be biased by the energizer against the surface of the shaft. The energizer can be a canted coil spring and can have an operating working deflection range with a generally constant biasing force over a deflection range so that forces remain exerted by the canted coil spring can be generally constant at the sealing interfaces of the seal element should the shaft move up and down.

A locking ring can be mechanically engaged to the seal element of the first seal assembly. The locking ring can have a body comprising a deck and a locking flange. The deck can comprise a notch for receiving the enlarged end section of the outer flange in a mechanical engagement, which is understood to be more than a surface to surface contact. In addition to engaging the notch, the enlarged end section of the outside flange also serves as a sealing lip to seal against the interior surface of the cylinder, which is pressed against the cylinder by the geometry of the deck and the notch.

When mechanically engaged, the seal element and the locking ring are prevented or restricted from axially separating from one another, axially along the length of the shaft. The deck can have a projection rising from the low point of the notch for supporting the inner part or the base part of the outer flange.

The deck of the locking ring has an inside surface that defines part of the spring cavity. That is, the inside surface of the deck, part of the center channel section, and the inside flange define the shape of the cavity for accommodating the energizer. The thickness of the deck can vary to change the dimension of the spring cavity, and therefore the size and/or type of energizer used to bias against the inside surface of the deck and the inside surface of the inner sealing flange.

In an example, the inside surface of the deck can be a contoured surface comprising a flat section and a tapered section, both relative to the lengthwise axis of the shaft. One or both of the flat section and the tapered section can vary in dimension and angle to vary the shape of the spring cavity for positioning the energizer therein. For example, the tapered section can be expanded or enlarged, provided with increased or decreased angle relative to the shaft axis, or can be omitted altogether to have a single flat section. The tapered section can be incorporated to preload or to turn the position of the energizer when the energizer is positioned in the spring cavity. For example, if the energizer is a canted coil spring, the tapered section can be selected to occupy portions of the spring cavity so that when the canted coil spring is situated in the spring cavity, the contour of the inside surface causes the minor axis of the canted coil spring to turn from generally horizontal relative to the shaft axis. When the minor axis is turned, the force versus deflection curve of the canted coil spring changes compared to when the minor axis is orthogonal to the shaft axis.

The locking ring can include an inner flange extension. The contoured surface of the inside surface in combination with the inner flange extension of the locking ring can cooperate to retain the energizer within the spring cavity. The inner flange extension can have a radial end tip that extends radially inwardly towards the shaft. The radial end tip projects inwardly relative to the flat section of the inner surface. The thickness of the inner flange extension can restrict or limit the energizer from translating axially within the spring cavity.

The inner flange extension can reduce the spring cavity entrance or opening to make it more difficult for the energizer to pop out of the cavity through the spring cavity entrance during use. Without the inner flange extension extending below a plane defined by the flat portion of the inside surface, the spring cavity entrance between the end tip of the inside flange and the locking ring would increase and would more readily allow the energizer to escape.

In the example shown, the radial end of the outer flange extension of the locking flange is sized to press against the interior surface of the cylinder to secure the locking ring from axial translation during service. For example, the outer flange extension of the locking ring can have an interference fit with the bore of the cylinder so that the locking ring is fixed to the cylinder via the interference fit. As the seal element is mechanically engaged to the locking ring, the seal element is also secured from axial translation during service. Further, the bump or enlarged section on the outside flange can be pressed between the notch on the deck and the interior surface of the cylinder, the enlarged section functions as a sealing lip to form a static seal at the outside flange that prevents fluid from flowing thereacross.

In an example, an excluder is provided at an end of the center channel section, on the inside flange side. As another way to view it, an excluder can be provided at an end of the inside flange, opposite the free end of the inside flange. The excluder can be singularly formed with the body the seal element and can be provided with an inside diameter (ID) that is smaller than the inside diameter of the inside flange at the inside sealing lip.

The excluder can have a fin-like cross-section with a flat or blunt tip that seals against the shaft located adjacent an annular recess. The annular recess presents a discontinuity along the inside of the sealing flange. In other words, the inside flange can be separated from the excluder by the annular recess. The tight fitting excluder around the outside diameter (OD) of the shaft can help to prevent fluid located external of the spring cavity from entering past the excluder and into the interface between the shaft and the inside flange and possibly interferes with the dynamic seal or presents a difficult media for the seal to maintain.

The second seal assembly of the pre-packaged seal system can be the same or similar to the first seal assembly. For example, the second seal assembly can have a seal element, a locking ring, and an energizer that are the same or similar to analogous components of the first seal assembly. However, in the present embodiment, the tips or free ends of the inner and outer sealing flanges of the seal element of the second seal assembly can face the seal element of the first seal assembly, i.e., the two seal assemblies face one another. In other examples, the seal system can be arranged so that the first and second seal assemblies face away from the pressure side (e.g., high pressure is from the left side and both seal assemblies face the right side) or both seal assemblies face the pressure side. Less preferably, both seal assemblies face away from one another.

In yet another example, rather than being housing mounted wherein the outer sealing flanges of the two sealing assemblies are static against the interior surface of the cylinder, the sealing assemblies can instead be piston mounted. In a piston mounted configuration, the sealing flange that seals against the outside diameter (OD) of the shaft is static with the shaft and the sealing flange that seals against the interior surface of the cylinder is in dynamic sealing arrangement with the cylinder. The piston mounted seal system may also have the first and second seal assemblies arranged to face one another, both facing the pressure region, both facing away from the pressure region, or both facing one another. The cylinder can be a housing and can be called a cylinder housing.

In an example, the two locking rings of the two seal assemblies of the pre-packaged seal system contact one another at the parting line between them. Preferably, a washer is provided between the two seal assemblies to space the two locking rings. The washer located between the two seal assemblies can be referred to as a first washer as additional washers may be incorporated with the seal system. The washer can be made from an elastomeric material, thermoplastic material, such as PTFE, PE or PEEK, or any other special polymers; and can be incorporated in a primary seal and secondary seal configuration.

The first washer may have the same non-metallic material as the sealing elements or be different. In an example, the seal system seals against two exterior or external environments, external to the spring cavities of the first and second seal assemblies. Assuming region is a high pressure region and the first seal assembly has failed thereby allowing fluid to enter the spring cavity of the first seal assembly from the high pressure region, the first washer helps to prevent fluid intruding or seeping into the spring cavity of the first seal assembly to then migrate or seep into the spring cavity of the second seal assembly. Thus, the second seal assembly can continue to provide a seal despite failure of the first seal assembly due to the presence of the first washer, which can have a memory lip that functions as a lip seal, as further discussed below.

In an example, the first washer has a planar body having a first surface and an opposing second surface. The first washer is wedged or positioned between the two seal assemblies, such as between the two locking rings. A memory lip extends from the planar body and has a curved portion. The memory lip may be molded along with the planar body to have the curved portion. The curved portion of the memory lip is curved or arcuate such that the second surface functions as a lip seal and contracts the OD of the shaft to seal against the shaft while the first surface is spaced away or does not contact the shaft. When the washer is provided with the memory lip that functions as a lip seal to seal against the shaft, the washer may be referred to as a lip seal. The lip seal of the first washer provides another dynamic seal for the seal system, which in combination with the first and second seal assemblies provide three dynamic sealing points or three dynamic seals with the shaft.

The memory lip defines an inside opening of the washer, inwardly of the washer's outer perimeter. The inside opening, or just opening for short, has a diameter that is smaller than the OD of the shaft so as to be in interference with the shaft. Preferably, the inside diameter of the opening is the same as or smaller than the inside diameter of the inside flange so as to have a higher inference than the inside flange. The washer can be configured to orient so that the opening, such as the end edge between the two surfaces, faces the high pressure region. Thus, the pocket immediately behind the opening of the memory lip is oriented away from the media that the washer is to seal against, thereby avoiding the possibility of a material buildup at the pocket.

In an example, another washer can be provided adjacent the seal element of the first seal assembly. This washer can be referred to as a second washer and can be the same or similar to the first washer. The second washer can have a memory lip that functions as a lip seal and an opening that faces away from the first seal assembly, facing the external region. Thus, if the external region is the high pressure region, incorporating the second washer in addition to the excluder will help to reduce or eliminate fluid seepage into the sealing interface between the shaft and the inside flange of the first seal assembly. The lip seal of the second washer provides another dynamic seal for the seal system, which in combination with the first washer and the first and second seal assemblies can provide four dynamic sealing points or four dynamic seals with the shaft.

Further, by arranging the second washer to orientate the same way as the first washer, the memory lip of the second washer can be orientated to seal against external fluid that may leak into the spring cavity of the first seal assembly and the memory lip of the first washer is orientated to seal against external fluid that may leak into the spring cavity of the second seal assembly should the first seal assembly fails.

The seal system may further include a washer located adjacent the seal element of the second seal assembly. This washer may be referred to as a third washer incorporated with the seal system. The third washer can be the same or similar to the first washer. The third washer can have a memory lip that functions as a lip seal and an opening that faces away from the second seal assembly, facing the opposite external region. Thus, if the opposite external region is a high pressure region relative to the spring cavity of the second seal assembly, incorporating the third washer with the lip seal can help to reduce or eliminate fluid seepage into the sealing interface between the shaft and the inside flange of the second seal assembly from the external region. The lip seal of the third washer can provide another dynamic seal for the seal system, which in combination with the first washer, the second washer, and the first and second seal assemblies can provide five dynamic sealing points or five dynamic seals with the shaft.

In yet another example, the seal element of the second seal assembly may incorporate an excluder, similar to that of the first seal assembly. In still another example, the three washers may be omitted, and the seal system may be practiced simply with each of the two seal elements of the two seal assemblies having an excluder.

A retaining disc can be provided at the insertion end of the cylinder to retain the various components therein following assembly. The retaining disc can comprise an outer diameter and an inner diameter. The outer diameter of the retaining disc can be selected to form an interference fit with the inside diameter of the cylinder, such as about 0.1 thousandths to about 5 thousandths total clearance and can be welded at the interference point with the cylinder.

The inside diameter of the retaining disc can have a dimension that is visually larger than the shaft OD to not interfere or rub against the shaft OD during assembly and use. The space of the body of the retaining disc between the ID and the OD should be sufficiently large to retain the various sealing components inside the cylinder without interfering with the movement of the shaft. The retaining disc may be made from a metal material or a polymeric material with the specific material to select from depending on the application of the seal system.

Service grease may be packed inside the spring cavity of the first seal assembly and/or the spring cavity of the second seal assembly. The type of service grease can be selected for the particular seal application. For example, if the application is for an implantable medical device, then the service grease can be a biocompatible grease, such as perfluoropolyether (PFPE) based oils and thickeners. For other non-medical applications, the grease can be a lubricant grease, such as calcium grease, lithium grease, sodium grease, etc. When incorporating service grease into one of both spring cavities, the grease not only provides lubrication for the dynamic interfaces between the movable shaft and the inside flanges, but the presence of the grease displaces voids and pockets inside the spring cavities, which helps to prevent external fluid from entering the same space that is already occupied by the grease.

An alternative seal system provided in accordance with further aspects of the invention can be similar to the pre-packaged seal system of the first embodiment with a few exceptions. In an exemplary alternative embodiment, the exterior of the cylinder can be modified with an extended recess to form a shoulder for assembly with the equipment housing. The shoulder can be located further away from the insertion end of the cylinder than the shoulder of the first embodiment. In the present embodiment, the interior surface of the cylinder can be modified to have two different interior surface sections defining two different bore sections. The first bore section can be sized with a first inside diameter (ID) and the second bore section can be sized with a second ID, which is larger than the first ID.

In the present embodiment, the first and second seal assemblies can be similar to the seal assemblies of the first embodiment, except for their relative sizes. Whereas the OD of the first and second seal elements of the first embodiment are generally the same for fitting into the cylinder with a single ID bore, the seal element of the second seal assembly of the present embodiment has a larger OD than the seal element of the first seal assembly. The different sized ODs can be used to seal against two different bore sections of the cylinder of different sizes.

The cylinder with different bore sections and the seal elements with different ODs of the present embodiment can facilitate assembly of the seal system. For example, when installing the first seal assembly into the bore of the cylinder, the locking ring must be forced or pressed into the bore due to the interference fit between the locking flange and the first bore section. By sizing the cylinder to have two different bore sections, the locking ring of the second seal assembly is pressed or forced to only slide a minimal distance into the first bore section for installation and not rub or contact the second bore section during assembly. Thus, installation or assembly of the second seal assembly can be simplified by the stepped bore of the present embodiment compared to the straight cylinder bore of other embodiments.

To accommodate the seal element of the second seal assembly to seal against the second bore section of the cylinder, the deck of the locking ring of the alternative embodiment is increased in thickness and diameter. In an example, the notch for mechanically engaging the outside flange and the support surface adjacent the notch has been displaced radially outwardly relative to the central axis to press the outside sealing lip of the outside flange against the larger bore section. In the present embodiment, the inside surface of the locking ring of the second seal assembly can be the same or similar to that of the first seal assembly so that similar energizers may be used for both seal assemblies. However, the inside surface of the second seal assembly may be adjusted so that two different energizers can be used with two different sized spring cavities, such as to provide two different sealing forces.

In an example, three washers can be incorporated with the alternative seal system. While all three washers may each include a memory lip that functions as a sealing lip as previously discussed, in the present embodiment, the second washer and the third washer can be standard washers, which is understood as being generally planar and having an outer perimeter and an inner perimeter defining an inside opening, without a memory lip.

In an example, the inside openings of the second and third washers are sized to have approximately a size-on-size fit with the shaft OD. The size-on-size fit can sufficiently deter viscous fluid from entering into the interface between the shaft and the inside flange and possibly interferes with the dynamic seal or presents a difficult media for the seal to maintain. In other embodiments, the standard washers can be sized with an inside opening with a size-on size fit or slight interference fit with the shaft OD, in the order of about 0.1 to 2 thousandths.

In the present embodiment, the retainer disc can be sized to engage the larger second bore section. For example, the outside diameter of the retainer disc can be sized to have an interference fit with the second bore section to retain the various components within the bore.

Another alternative seal system is similar to the first two seal systems with a few exceptions. In the present embodiment, the cylinder has generally the same inside diameter but is a split cylinder and comprises a first cylinder section and a second cylinder section. The split cylinder has a stepped split line wherein one of the two cylinder sections has an opening with an inside diameter for receiving a projection of the other cylinder to assemble the two cylinder sections together. In an example, the opening with the inside diameter and the projection with an outside diameter are sized with an interference fit, to prevent unwanted separation. Although the second cylinder section is shown with the opening and the first cylinder section is shown with a projection, the two can reverse.

Each cylinder section can have an open end or insertion end and a closed end with a retaining wall. The first seal assembly can be inserted into the first cylinder section through the insertion end and retained at the opposite end by the retaining wall. Similarly, the second seal assembly can be inserted into the second cylinder section through the insertion end of the second cylinder section and retained at the opposite end by the retaining wall. Both retaining walls can have inside diameters that are sufficiently large so as to not rub or contact the shaft OD during installation and use.

Three gaskets or washers may be incorporated with the present alternative seal system. In the present embodiment, the three gaskets can each comprise a memory lip. Alternatively, the gaskets can be mixed with both a standard gasket and one with a memory lip. In an example, the first and the second gaskets can both be provided with memory lips to function as sealing lips and the third gasket can be a standard gasket or washer. The first gasket may be positioned within the first cylinder section or the second cylinder section of the split cylinder. In an example, the first gasket is positioned inside the bore of the first cylinder section with the outside diameter of the gasket pressed against the inside diameter of the first bore section. Further, the first gasket can be sized with a thickness that gets compressed between the two locking rings of the two seal assemblies when the seal system is fully assembled as shown.

In yet another embodiment, the seal system can omit the cylinder and be assembled directly into the housing without the cylinder. Optionally, the alternative assembly can also be pre-packaged inside a cylinder.

The present alternative seal system can comprise a first seal assembly and a second seal assembly each with a seal element having generally the same ID and OD and arranged to face one another. However, in the present embodiment, the locking ring is a combination locking ring. That is, the combination locking ring has a single locking flange for locking against the interior of the cylinder or housing but has two different decks with each comprising a notch for mechanically engaging the respective outside flange of the respective seal element.

The two decks of the combination locking ring can be located to either side of the locking flange. The combination locking ring can also have a single inner flange extension. The locking flange and the inner flange extension can align generally along the same axial position relative to the shaft and the two decks can be located on either side of this aligned structure. The length of the single inner flange extension can be selected to adjust the spring cavity opening of both the first and second seal assemblies as desired, to restrict the two energizers from escaping out through the respective spring cavity opening during use.

In yet another alternative seal system, a seal assembly has a seal element, a locking ring, a washer, and an energizer located in the spring cavity. The seal assembly may be mounted directly in a gland of a housing to seal against the housing and the dynamic shaft without a cylinder or a can. In an example, the seal assembly of the present alternative embodiment may be pre-mounted in a cylinder. The seal system can further be provided with a washer having a memory lip that functions as a sealing lip, as previously discussed. Thus, the present seal system is understood as a double seal assembly with two dynamic seals or two dynamic sealing points. One of the two sealing lips can seal against the shaft without being biased by a spring.

The seal element has an inside flange, an outside flange, and a center channel section that together define a spring cavity. An energizer, which can be a canted coil spring, can be located in the spring cavity and biases the inside and outside flanges away from one another. The spring cavity can be formed without a locking ring and the shape of the spring cavity can be defined by the inside flange, the outside flange, and the center channel section only, without the locking ring. The enlarged end section of the outer flange can be sized with an OD that presses against the interior of the housing or cylinder to seal thereagainst.

A retaining lip can extend radially inwardly from an end of the outside flange towards the shaft axis or central axis of the seal assembly to reduce the spring cavity opening. The retaining lip can be singularly formed with the seal element and the length of the retaining lip can be selected to minimize the spring cavity opening.

A notch can be provided on the exterior of the outside flange to mechanically engage the projection on the locking ring, which can be sized with an OD to form an interference fit with the housing or cylinder. In the assembled configuration, both the enlarged end section of the outside flange and the locking ring can contact the interior of the housing or cylinder.

The locking ring of the present embodiment can comprise the first flange section attached to a second flange section at an intersection. In the example shown, the first flange section can be generally planar and extends transversely to the shaft. The first flange section can function as a retaining disc to secure the various seal components within the cavity of the housing or cylinder, similar to the retaining disc discussed elsewhere.

The second flange section can extend in the axial direction relative to the shaft. In the example shown, the flange section can have an end projection on an outside surface to define an OD that is larger than the remaining OD part of the second flange. The outside projection can provide an interference with the inside surface of the cylinder or housing. In some examples, the projection can be located closer to the intersection of the two flange sections than at the opposite end of the second flange section.

Interiorly, the second flange section of the locking ring has a projection on the inside surface for mechanically engaging the notch of the outside flange of the sealing element. A space or gap is provided between the vertical lip of the inside projection and the wall of the first flange section. The gap can be sized and shaped to accommodate the width of the center channel section and the washer to retain the two therebetween during assembly and service.

The washer can have a memory lip that functions as a sealing lip, as previously discussed. In the present embodiment, the memory lip can be orientated to face the outside region while the free end of the inside flange of the seal element is oriented to face the outside region. In an example, a second washer may be incorporated between the retaining wall and the seal element. The second washer can be a standard washer or one with a memory lip. Adding the second washer can allow the use of service grease in the spring cavity.

A seal system in accordance with further aspects of the invention can comprise a seal assembly mounted directly in the gland of a housing. Alternatively, the housing can be a cylinder and the seal assembly can be mounted to the cylinder as a pre-packaged seal system before being mounted inside the gland of the housing. The present seal assembly can comprise a seal element, a locking ring, a washer, and an energizer located in a spring cavity.

The present seal assembly can be similar to the first seal assembly. The present seal assembly may be used as a single seal to prevent higher interior fluid pressure from leaking outside, or to seal higher environmental pressure from leaking inside into the lower pressure spring cavity. In some examples, a washer may be placed in abutting contact with the locking ring. A retainer disc may be placed adjacent the washer to retain the washer against the locking ring. The washer can be a standard washer or one with a memory lip. Adding a washer can allow the use of service grease in the spring cavity of the seal assembly.

A further aspect of the invention includes a seal bearing system. The seal bearing system shares many aspects as the seal system discussed elsewhere herein. In an example, the seal bearing system comprises a cylinder with a retaining wall defining a bore with an open end or insertion end for mounting the various seal bearing components. Exteriorly, the cylinder may be shaped with shoulders, flanges, etc. for mating with equipment housing, which can be any number of devices, such as a pump, a mixer, a valve, a blower, etc. having a shaft movable within the housing.

A bearing assembly can be located within the bore, adjacent a seal assembly. In an A retaining disc is located between the seal assembly and the bearing assembly. Alternatively, a sealing washer having an inside opening that seals against the shaft is located between the seal assembly and the bearing assembly. In yet another alternative embodiment, a sealing washer and a retaining disc are located between the seal assembly and the bearing assembly.

Internally, the cylinder can have a stepped bore with a first bore section and a second bore section, similar to other split cylinders discussed elsewhere herein. A first seal assembly, a second seal assembly, and two washers can be located inside the bore, also similar to the seal system discussed elsewhere herein. The first and second washers can be of a standard type with a straight inside opening without a memory lip. The inside opening of the standard washers can be smaller than the shaft OD to generate an interference fit. In other examples, the two washers can each have a memory lip, or only one of the two can have a memory lip, the one between the two locking rings or the one adjacent the retaining wall. Further, while the two seal elements face one another, they can be oriented to both face the exterior region, be oriented to both face the exterior region, or oriented to face away from one another.

A retaining disc can be placed in abutting contact with the seal element of the second seal assembly. The retaining disc can have an interference fit with the cylinder and incorporated to retain the various seal components inside the bore. In an alternative embodiment, a washer is placed in abutting contact with the seal element of the second seal assembly instead of or in addition to the retaining disc. The washer can be a standard washer having an inside opening with a size-on-size fit with the shaft OD. The washer can be thicker than the first and second washers to separate the second seal assembly from the bearing assembly.

In an example, the bearing assembly of the seal bearing system can comprise an outer ring, an inner ring, and a cage for retaining a plurality of rolling elements in retaining sockets. The various components of the bearing assembly are typically made from a metal material, which can all be the same material or more likely from a variety of different metal materials. The inner ring can be configured to tightly fit around the exterior of the shaft and rotate with the shaft along with the rolling elements, which can be held by the cage as they rotate with the shaft in spaced apart relationship. The inner ring can have an inside diameter configured to fit around the shaft in an interference fit and an outer diameter, relative to the inside diameter, defining a thickness therebetween. The inner ring can have a width and be sized and shaped to accommodate selected rolling elements.

The outer ring can be tightly fitted against the interior surface of the cylinder and held stationary to the cylinder when the inner ring, the cage, and the rolling elements rotate with the shaft. The outer ring can have an inside diameter configured to contact the rolling elements and an outer diameter configured to fit against the interior of the cylinder in an interference fit. The inside diameter and the outside diameter of the outer ring define a thickness therebetween. The outer ring has a width and is sized and shaped to accommodate selected rolling element types.

In an example, the bearing assembly is a ball bearing assembly, and the rolling elements are metal balls or spherical balls. When the bearing assembly is a ball bearing assembly, the outer and inner rings can comprise inner and outer bearing races for the plurality of balls to contact and rotate against. In other examples, the bearing assembly can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

As shown, the outer ring comprises two exterior grooves defining three raised projections. In other examples, one or more than two exterior grooves and two or more than three raised projections can be incorporated. Further, for each projection, relatively smaller grooves, such as microgrooves, can be provided on the exterior thereof to facilitate assembly of the outer ring into the bore of the cylinder. The grooves, when incorporated, reduce interference and friction and facilitate assembly.

The bearing assembly, the seal assemblies, and the washers can be assembled to the cylinder in a pre-packaged configuration to form a seal bearing system in accordance with aspects of the invention. The pre-packaged seal and bearing assembly is thereafter ready for mounting, as a unit, onto the shaft. The assembly can then be installed into the housing.

Service grease, as discussed above, may be incorporated in the spring cavities of one or both seal assemblies of the seal bearing system. The same or different service grease may be used with the bearing assembly to provide lubrication for the rolling elements.

An alternative seal bearing system can be similar to the seal bearing system discussed elsewhere herein. The pre-packaged seal and bearing system of the alternative embodiment can have a split cylinder to facilitate installation of the seal assemblies, washers, and bearing assembly, similar to the split cylinder discussed elsewhere herein. A first washer with a memory lip can also be incorporated with the present seal and bearing system instead of a standard washer between the two seal assemblies.

The pre-packaged seal and bearing system can be mounted to a housing having an additional bearing assembly. The seal and bearing system can be engaged to or installed within a housing, which can have more than one housing section. For example, the pre-packaged seal and bearing system can first be mounted onto a shaft and then the combination mounted to the housing.

In an example, a second bearing assembly can be mounted to the housing and shaft and spaced from the first bearing assembly of the pre-packaged seal and bearing system. This configuration shows how the pre-packaged seal and bearing system may be used in a device in which a gap between the first and second bearing assemblies, called a device chamber, can be used to house any number of device components, such as a rotor of a motor, a stator of a motor, an oil sump, valve packing materials, fan blades, etc. Having the bearing assemblies located on either end of the device chamber provides support and stability when the shaft rotates. The pre-packaged seal and bearing system provides a single sealing solution with multiple components that can be adapted for multiple applications. For example, the seal assemblies can be orientated with different configurations, either facing one another, both facing the high pressure region, etc., for different applications. The pre-packaged seal and bearing system can also be modified to have different gaskets or washers for added sealing points, such as by utilizing one or more gaskets with memory lips that serve as sealing lips. The cylinder can also have a straight bore, a stepped bore, and can include a split cylinder to facilitate assembly.

Still further, service grease may be included in the spring cavities to occupy the spring cavities so that external fluid is less prone to enter into the same space. The service grease can be selected to be compatible with the particular application. For example, if the housing is part of a medical implantable device, the service grease must be biocompatible.

In yet another example, the pre-packaged assembly is a pre-packaged seal system without a bearing assembly. The bearing assembly can instead be mounted outside of or external to the cylinder of the pre-packaged seal system.

A still further aspect of the invention is a method of using seal assemblies, seal systems, pre-packaged seal systems, and pre-packaged seal and bearing assemblies as shown and described.

A still further aspect of the invention is a method of manufacturing or making seal assemblies, seal systems, pre-packaged seal systems, and pre-packaged seal and bearing assemblies as shown and described.

The various seal assemblies, gaskets, pre-packaged seal systems, and pre-packaged seal and bearing systems can be interchangeable unless the components are mechanically or operationally conflicting. For example, the cylinder of FIG. 7 may be replaced with the split cylinder of FIG. 8, and the washers of FIG. 7 may be replaced with the washers with memory lips of FIG. 1A. Thus, the various embodiments described herein are intended to be interchangeable where they are compatible to do so.

BRIEF DESCRIPTION OF THE DRAWINGS

These and other features and advantages of the present devices, systems, and methods will become appreciated as the same becomes better understood with reference to the specification, claims and appended drawings wherein:

FIG. 1A is a cross-sectional side view of a seal system in a pre-packaged assembly in accordance with aspects of the invention and FIG. 1B is an enlarged view of the first seal assembly of the seal system.

FIG. 2 is a cross-sectional side view of a seal system in a pre-packaged assembly and in which the cylinder has a stepped bore.

FIG. 3 is a cross-sectional side view of a seal system in a pre-packaged assembly and in which the cylinder has a split bore.

FIG. 4 is a cross-sectional side view of a seal assembly having a dual locking ring engaging two spaced apart sealing elements.

FIG. 5 is a cross-sectional side view of a seal assembly having a ring engaging two lip seals in a back-to-back configuration.

FIG. 6 is a cross-sectional side view of a seal assembly having a seal element, a locking ring, and an energizer.

FIG. 7 is a cross-sectional side view of a seal and bearing system in a pre-packaged assembly in accordance with aspects of the invention.

FIG. 8 is a cross-sectional side view of a seal and bearing system in a pre-packaged assembly in accordance with aspects of the invention in which the cylinder is a split cylinder.

FIG. 9 is a cross-sectional side view of the seal and bearing system of FIG. 8 assembled to a housing and spaced from a second bearing assembly.

FIG. 10 is a cross-sectional side view of another seal assembly having a seal element, a locking ring, and an energizer.

FIGS. 11A-11D are different views of a sealing washer in accordance with aspects of the invention.

FIG. 13A-13C are different views of another sealing washer in accordance with aspects of the invention.

FIG. 14 is a cross-sectional side view of another seal assembly having a seal element, a locking ring, and an energizer.

FIG. 15 is a cross-sectional side view of another seal assembly having a seal element, a locking ring, and an energizer.

FIG. 16 is a cross-sectional side view of another seal assembly having a seal element, a locking ring, and an energizer.

FIG. 17 is a cross-sectional side view of another seal assembly having a seal element, a locking ring, and an energizer.

FIG. 18 is a cross-sectional side view of another seal assembly having a seal element, a locking ring, and an energizer.

FIG. 19 is a cross-sectional side view of another seal assembly having a seal element, a locking ring, and an energizer.

FIG. 20 is a cross-sectional side view of another seal assembly having a seal element, a locking ring, and an energizer.

FIG. 21 is a cross-sectional side view of another seal assembly having a seal element, a locking ring, and an energizer.

FIG. 22 is a cross-sectional side view of another seal assembly having a seal element, a locking ring, and an energizer.

FIG. 23 is a cross-sectional side view of another seal assembly having a seal element, a locking ring, and an energizer.

FIG. 24 is a cross-sectional side view of another seal assembly having a seal element, a locking ring, and an energizer.

FIG. 25 is a cross-sectional side view of another seal assembly having a seal element, a locking ring, and an energizer.

FIG. 26 is a cross-sectional side view of another seal assembly having a seal element, a locking ring, and an energizer.

FIG. 27 is a cross-sectional side view of another seal assembly having a seal element, a locking ring, and an energizer.

FIG. 28 is a cross-sectional side view of another seal assembly having a seal element, a locking ring, and an energizer.

FIG. 29 is a cross-sectional side view of another seal assembly having a seal element, a locking ring, and an energizer.

FIG. 32 is a cross-sectional side view of another seal assembly having a seal element, a locking ring, and an energizer.

FIG. 33 is a cross-sectional side view of another seal assembly having a seal element, a locking ring, and an energizer.

FIG. 34 is a cross-sectional side view of another seal assembly having a seal element, a locking ring, and an energizer.

FIG. 35 is a cross-sectional side view of another seal assembly having two seal assemblies each with a seal element, a locking ring, and an energizer.

FIG. 36 is a cross-sectional side view of another seal assembly having two seal assemblies each with a seal element, a locking ring, and an energizer.

DETAILED DESCRIPTION

Figure 12B:
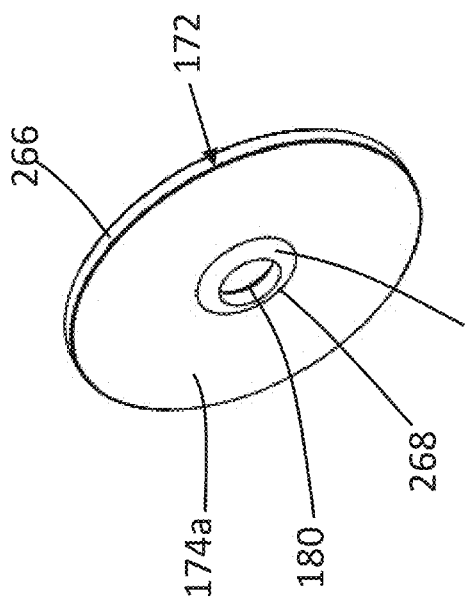
FIG. 12A-12D are different views of another sealing washer in accordance with aspects of the invention.

The detailed description set forth below in connection with the appended drawings is intended as a description of the presently preferred embodiments of lips seals and bearing assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

With reference now to FIG. 1A, a seal system 100 comprising a first seal assembly 102 and a second seal assembly 104 is shown located inside a can or cylinder 106, which has an interior surface defining a bore. The terms first and second and related generic terms, as used herein, are meant to identify components by nomenclature only and are not structurally limiting unless the context indicates otherwise. The seal system 100 can be located inside a pump, a blower, a turbine, an actuator, or other equipment having a shaft or pin 108 movable within a housing 110, such as in electronic applications, avionics, space, oil and gas, and medical applications, to name a few non-limiting examples. The seal system 100 is understood to be generally circular and has a bore for receiving the shaft or pin 108, which is partially shown about a centerline t. The exterior of the cylinder 106 can be adjusted, such as crafted or machined, to mate with and housed within the housing 110 of the particular application. Thus, specific exterior configuration can be adjusted or configured, such as being sized and shaped, without deviating from the spirit of the present invention.

The can 106 for retaining the two seal assemblies 102, 104 can have a body 112 comprising a wall with an exterior wall surface 113 and an interior wall surface 114 defining a bore 116. The exterior wall surface 113 is shown with a shoulder 113a for mating with the housing 110. The body 112 can have two open ends for assembling the two seal assemblies 102, 104 from either end of the body. In the present embodiment, a retaining wall 118 is provided at one of the two ends of the body 112 to define a retaining end, which prevents components of the seal system 100 from escaping from the bore 116 out through the retaining end. By default, the opposite end of the body 112 is the insertion end or the assembly end 120, for placement of seal components into the bore 116 to form the seal system 100, as further discussed below. In alternative embodiments, where a retaining wall 118 is shown or used, an open cylinder and a retaining disc may instead be used. In other words, the cylinder may have two open ends with two retaining discs.

The cylinder 106 can be used to house seal components to form the seal system 100 prior to assembly onto a shaft 108 and then into a device or equipment housing. When pre-installed inside the can 106, the seal system 100 may be referred to as a pre-packaged seal system. The pre-packaged seal system is thereafter ready for mounting, as a unit, onto the shaft. The cylinder size, dimensions, and material can be selected for the particular application. Metal, such as stainless steel and alloys, may be used for most applications and stainless steel, cobalt chrome steels, titanium alloys, and platinum metals may be used for medical implant applications.

In the present embodiment, the interior wall surface 114 of the cylinder has a straight bore 116, which can be understood as having generally the same inside diameter throughout the cylinder without a purposeful step, unlike the cylinder of FIG. 2 with a stepped wall. However, the entrance of the insertion end 120 can be chamfered to eliminate sharp edges and facilitate insertion of seal components. Externally, the exterior wall surface 113 may include chamfered surfaces, annular grooves, and/or one or more stepped surfaces to cooperate or mate with the equipment housing that the seal system 100 is be installed into. For example, an annular groove may be on the exterior for use with an O-ring for sealing against the housing or used with a biasing spring, such as a canted coil spring, to bias against the housing.

The first seal assembly 102 comprises a seal element 126 comprising an inside or inner flange 128, an outside or outer flange 130, and a center channel section 132 connecting the inner and outer flanges and defining a cavity 134 therebetween, which can accommodate an energizer 136. The cavity 134 may be referred to as a spring cavity for accommodating a biasing spring, as further discussed below. With further reference to FIG. 1B, which is an enlarged view of the first seal assembly 102, the seal element 126 is non-metallic and may be made from an elastomeric material, thermoplastic material, such as PTFE, PE or PEEK, or any other special polymers. The particular elastomer, thermoplastic or polymer, can vary depending on the application. In the embodiment shown, the energizer 136 is a canted coil spring comprising a plurality of interconnected coils all canted generally in the same direction and the coils operate to bias the inner flange 128 away from the outer flange 130 to press and seal against the shaft 108. In other examples, the energizer 136 can be an O-ring or a different metallic spring type, such as a ribbon spring, a V-spring, or a helical compression or extension spring. In some examples, such as in relatively low pressure applications, the energizer can be omitted, and the seal is a lip seal type but not a spring energized lip seal.

As shown, the inside flange 128 of the sealing element 126 has an inside diameter for placing around the shaft 108 and a sealing lip 140 that is pressed against the shaft surface to provide a dynamic seal, when the shaft moves or rotates. The inside diameter is preferably smaller than the shaft OD so as to create an interference fit. The sealing lip 140 can have a long dynamic surface that is about 20% to about 75% of the length of the inside flange 128 or a short dynamic surface that is about 5% to about 20% of the length of the inside flange. The sealing lip 140 can be biased by the energizer 136 against the surface of the shaft 108. As shown, the energizer 136 is a canted coil spring, which has an operating working deflection range and provides a generally constant biasing force over a deflection range so that forces remain generally constant at the sealing interfaces should the shaft moves up and down.

A locking ring 146 is mechanically engaged to the seal element 126 of the first seal assembly 102. The locking ring 146 has a body 148 comprising a deck 150 and a locking flange 152. The deck 150 comprises a notch for receiving the enlarged end section 129 of the outer flange 130 in a mechanical engagement, which is understood to be more than a surface to surface contact. In addition to engaging the notch, the enlarged end section 129 of the outside flange 130 also serves as a sealing lip to seal against the interior surface of the cylinder 106, which is pressed against the cylinder by the geometry of the deck and the notch. When mechanically engaged, the seal element 126 and the locking ring 146 are prevented or restricted from axially separating from one another, axially along the length of the shaft. The deck has a projection rising from the low point of the notch for supporting the inner part or the base part of the outer flange 130. The deck 150 further has an inside surface 154 that defines part of the spring cavity 134. The thickness of the deck 150 can vary to change the dimension of the spring cavity 134, and therefore the size and/or type of energizer 136 is used to bias against the inside surface of the deck 150 and the inside surface of the inner sealing flange 128.

In the example shown, the inside surface 154 of the deck 150 is a contoured surface comprising a flat section and a tapered section, both relative to the lengthwise axis of the shaft. One or both of the flat section and the tapered section can vary in dimension and angle to vary the shape of the spring cavity 134 for positioning the energizer 136 therein. For example, the tapered section can be expanded or enlarged, provided with increased or decreased angle relative to the shaft axis, or can be omitted altogether to have a single flat section. The tapered section can be incorporated to preload or to turn the position of the energizer 136. For example, if the energizer 136 is a canted coil spring, the tapered section can be selected to occupy portions of the spring cavity so that when the canted coil spring 136 is situated in the spring cavity, the contour of the inside surface 154 causes the minor axis of the canted coil spring to turn from generally horizontal relative to the shaft axis. When the minor axis is turned, the force versus deflection curve of the canted coil spring changes compared to when the minor axis is orthogonal to the shaft axis.

The contoured surface of the inside surface 154 in combination with the inner flange extension 158 of the locking ring cooperates to retain the energizer 136 within the spring cavity 134. The inner flange extension 158 has a radial end tip that extends radially inwardly towards the shaft. The radial end tip projects inwardly relative to the flat section of the inner surface 154. The thickness of the inner flange extension 158 can restrict or limit the energizer 136 from translating axially within the spring cavity 134. The inner flange extension 158 also reduces the spring cavity entrance or opening 160 to make it more difficult for the energizer 136 to pop out of the cavity through the spring cavity entrance 160 during use. Without the inner flange extension 158 extending below a plane defined by the flat portion of the inside surface 154, the spring cavity entrance 160 between the end tip of the inside flange 128 and the locking ring 146 would increase and would more readily allow the energizer 136 to escape.

In the example shown, the radial end of the outer flange extension 162 of the locking flange 152 is sized to press against the interior surface 114 of the cylinder 106 to secure the locking ring 146 from axial translation during service. For example, the outer flange extension 162 of the locking ring can have an interference fit with the bore of the cylinder 106 so that the locking ring is fixed to the cylinder via the interference fit. As the seal element 126 is mechanically engaged to the locking ring 146, the seal element 126 is also secured from axial translation during service. Further, the bump or enlarged section 129 on the outside flange 130 is pressed between the notch on the deck 150 and the interior surface 114 of the cylinder 106, the enlarged section 129 functions as a sealing lip to form a static seal at the outside flange 130 that prevents fluid from flowing thereacross.

In an example, an excluder 166 is provided at an end of the center channel section 132, on the inside flange 128 side. As another way to view it, an excluder 166 is provided at an end of the inside flange 128, opposite the free end of the inside flange. The excluder 166 can be singularly formed with the body the seal element 126 and can be provided with an inside diameter (ID) that is smaller than the inside diameter of the inside flange 128 at the inside sealing lip 140 and/or the outside diameter of the shaft 108. The excluder 166 can have a fin-like cross-section with a flat or blunt tip that seals against the shaft located adjacent an annular recess 168. The annular recess presents a discontinuity along the inside of the sealing flange. In other words, the inside flange 128 is separated from the excluder 166 by the annular recess 168. The tight fitting excluder 166 around the outside diameter (OD) of the shaft 108 helps to prevent fluid located external of the spring cavity 134 from entering past the excluder 166 and into the interface between the shaft and the inside flange and possibly interferes with the dynamic seal or presents a difficult media for the seal to maintain.

With reference again to FIG. 1A, the second seal assembly 104 of the seal system 100 can be the same or similar to the first seal assembly 102. For example, the second seal assembly 104 can have a seal element 126, a locking ring 146, and an energizer 136 that are the same or similar to analogous components of the first seal assembly 102. However, in the present embodiment, the tips or free ends of the inner and outer sealing flanges 128, 130 of the seal element 126 of the second seal assembly faces the seal element of the first seal assembly, i.e., the two seal assemblies face one another. In other examples, the seal system 100 can be arranged so that the first and second seal assemblies 102, 104 face away from the pressure side 50 (e.g., high pressure is from the left side and both seal assemblies face the right side) or both seal assemblies face the pressure side 50. Less preferably, both seal assemblies face away from one another.

In yet another example, rather than being housing mounted as shown in which the outer sealing flanges 130 of the two sealing assemblies 102, 104 are static against the interior surface of the cylinder 106, the sealing assemblies can instead be piston mounted. In a piston mounted configuration, the sealing flange that seals against the outside diameter (OD) of the shaft is static with the shaft and the sealing flange that seals against the interior surface 114 of the cylinder 106 is in dynamic sealing arrangement with the cylinder. The piston mounted seal system may also have the first and second seal assemblies 102, 104 arranged to face one another, both facing the pressure region, both facing away from the pressure region, or both facing one another.

In an example, the two locking rings 146 of the two seal assemblies contact one another at the parting line between them. Preferably, a washer 172 is provided between the two seal assemblies 102, 104 to space the two locking rings. The washer 172 located between the two seal assemblies can be referred to as a first washer 172a as additional washers may be incorporated with the seal system 100. The washer 172 can be made from an elastomeric material, thermoplastic material, such as PTFE, PE or PEEK, or any other special polymers; and can be incorporated in a primary seal and secondary seal configuration.

The first washer 172a may have the same non-metallic material as the sealing elements or different. In the configuration shown in FIG. 1A, the seal system 100 seals against two exterior or external environments 50, 52, external to the spring cavities 134 of the first and second seal assemblies 102, 104. Assuming region 50 is the high pressure region and the first seal assembly 102 has failed thereby allowing fluid to enter the spring cavity 134 of the first seal assembly, the washer 172 helps to prevent fluid intruding or seeping into the spring cavity 134 of the first seal assembly 102 to then migrate or seep into the spring cavity 134 of the second seal assembly 104. Thus, the second seal assembly 104 can continue to provide a seal despite failure of the first seal assembly 102 due to the presence of the first washer 172a, which has a memory lip that functions as a lip seal, as further discussed below.

In an example, the first washer 172a has a body 174 having a first surface 174a and an opposing second surface 174b. The first washer 172a is wedged or positioned between the two seal assemblies, such as between the two locking rings 146, 146. A memory lip 176 extends from the planar body 174 and has a curved portion. The memory lip 176 may be molded along with the planar body 174 to have the curved portion. The curved portion of the memory lip 176 is curved or arcuate such that the second surface 174b functions as a lip seal and contracts the OD of the shaft to seal against the shaft while the first surface 174a is spaced away or does not contact the shaft. When the washer is provided with the memory lip 176 that functions as a lip seal to seal against the shaft, the washer may be referred to as a lip seal. The lip seal of the first washer 172a provides another dynamic seal for the seal system 100, which in combination with the first and second seal assemblies 102, 104 provide three dynamic sealing points or three dynamic seals with the shaft.

The memory lip 176 defines an inside opening 180 of the washer 172, inwardly of the washer's outer perimeter. The inside opening 180, or just opening for short, has a diameter that is smaller than the OD of the shaft so as to be in interference with the shaft. Preferably, the inside diameter of the opening 180 is the same as or smaller than the inside diameter of the inside flange 128 so as to have a higher inference than the inside flange. The washer 172 is configured to be oriented so that the opening 180, such as the end edge between the two surfaces 174a, 174b, faces the high pressure region 50. Thus, the pocket 182 (FIG. 1B) immediately behind the opening 180 is oriented away from the media that the washer 172a is to seal against, thereby avoiding the possibility of a material buildup at the pocket 182.

With reference again to FIG. 1A, another washer 172 is provided adjacent the seal element 126 of the first seal assembly 102. This washer 172 can be referred to as a second washer 172b and can be the same or similar to the first washer 172a. The second washer 172a has a memory lip 176 that functions as a lip seal and an opening 180 that faces away from the first seal assembly 102, facing the external region 50. Thus, if the external region 50 is the high pressure region, incorporating the second washer 172a in addition to the excluder 166 will help to reduce or eliminate fluid seepage into the sealing interface between the shaft and the inside flange 128 of the first seal assembly 102. The lip seal of the second washer 172b provides another dynamic seal for the seal system 100, which in combination with the first washer 172a and the first and second seal assemblies 102, 104 provide four dynamic sealing points or four dynamic seals with the shaft.

Further, by arranging the second washer 172b to orientate the same way as the first washer 172a, the memory lip 176 of the second washer is orientated to seal against external fluid that may leak into the spring cavity 134 of the first seal assembly 102 and the memory lip 176 of the first washer is orientated to seal against external fluid that may leak into the spring cavity 134 of the second seal assembly 104 should the first seal assembly 102 fails.

The seal system may further include a washer 172 located adjacent the seal element 126 of the second seal assembly 104. This washer 172 may be referred to as a third washer 172c incorporated with the seal system 100. The third washer 172c can be the same or similar to the first washer 172a. The third washer 172c has a memory lip 176 that functions as a lip seal and an opening 180 that faces away from the second seal assembly 104, facing the external region 52. Thus, if the external region 52 is a high pressure region relative to the spring cavity 134 of the second seal assembly 104, incorporating the third washer 172a with the lip seal can help to reduce or eliminate fluid seepage into the sealing interface between the shaft and the inside flange 128 of the second seal assembly 104 from the external region 52. The lip seal of the third washer 172c provides another dynamic seal for the seal system 100, which in combination with the first washer 172a, the second washer 172b, and the first and second seal assemblies 102, 104 provide five dynamic sealing points or five dynamic seals with the shaft.

In yet another example, the seal element 126 of the second seal assembly 104 may incorporate an excluder 166, similar to that of the first seal assembly 102. In still another example, the three washers 172a, 172b, 172c may be omitted and the seal system 100 may be practiced simply with each seal element having an excluder. In yet another example, any combination of one and up to all three washers 172a, 172b, 172c may be used. For example, the two end washers 172b, 172c may be used while the first middle washer 172a is omitted, or the middle washer 172a may be used while one or both end washers 172b, 172c are omitted. In another example, only one of the end washers 172b or 172c is used. In yet other alternative embodiments, where a particular washer is used, two or more consecutively stacked washers may be used. For example, where the first middle washer 172a is used, two or more such washers can be used at the same location as opposed to just one middle washer, as currently shown. For example, two back-to-back washers may be used where the single middle washer 172a is currently shown, or three back-to-back-to-back washers may be used where the single middle washer 172a is currently shown. The two or more back-to-back arranged washers increase stiffness over a single washer. In other examples, the thickness of the single washer can increase so that the single washer can operate with higher stiffness compared to a single thinner washer. Other double seal embodiments discussed elsewhere herein can have similar alternative optional washer configurations. Further, the one or more washers in the various configurations described can have a memory lip, can be a standard sealing washer, as further discussed below, or a combination of both.

A retaining disc 190 is provided at the insertion end 120 of the cylinder 106 to retain the various components therein following assembly. The retaining disc 190 can comprise an outer diameter and an inner diameter. The outer diameter of the retaining disc 190 is selected to form an interference fit with inside diameter of the cylinder 106, such as about 0.1 thousandths to about 5 thousandths total clearance and can be also welded at the interference point with the cylinder 106. The inside diameter of the retaining disc 190 has a dimension that is visually larger than the shaft OD to not interfere or rub against the shaft OD during assembly and use. The space of the body of the retaining disc 190 between the ID and the OD should be sufficiently large to retain the various sealing components inside the cylinder without interfering with the movement of the shaft 108. The retaining disc 190 may be made from a metal material or a polymeric material with the specific material to select from depending on the application of the seal system.

Service grease may be packed inside the spring cavity 134 of the first seal assembly 102 and/or the spring cavity 134 of the second seal assembly 104. The type of service grease can be selected for the particular seal application. For example, if the application is for an implantable medical device, then the service grease can be a biocompatible grease, such as perfluoropolyether (PFPE) based oils and thickeners. For other non-medical applications, the grease can be a lubricant grease, such as calcium grease, lithium grease, sodium grease, etc. When incorporating service grease into one or both spring cavities 134, the grease not only provides lubrication for the dynamic interfaces between the movable shaft and the inside flanges, but the presence of the grease displaces voids and pockets inside the spring cavities, which helps to prevent external fluid from entering the same space that is already occupied by the grease.

With reference now to FIG. 2, an alternative seal system 100 provided in accordance with further aspects of the invention is shown. The present seal system 100 is similar to the seal system of FIG. 1A with a few exceptions. In the present embodiment, the exterior 113 of the cylinder 106 has been modified with an extended recess to form a shoulder 113*a* for assembly with the housing 110. The shoulder 113*a* is located further away from the insertion end 120 of the cylinder than the shoulder of the embodiment of FIG. 1A. In the present embodiment, the interior surface 114 of the cylinder 106 has been modified to have two different interior surface sections defining two different bore sections 116*a*, 116*b*. The first bore section 116*a* is sized with a first inside diameter (ID) and the second bore section 116*b* is sized with a second ID, which is larger than the first ID.

In the present embodiment, the first and second seal assemblies 102, 104 can be similar to the seal assemblies of FIG. 1A, except for their relative sizes. Whereas the OD of the first and second seal elements 126 of FIG. 1A are generally the same for fitting into the cylinder 106 with a single ID bore, the seal element 126 of the second seal assembly 104 of the present embodiment has a larger OD than the seal element 126 of the first seal assembly 102. The different sized ODs can be used to seal against two different bore sections 116*a*, 116*b* of the cylinder 106 of different sizes.

The cylinder 106 with different bore sections and the seal elements with different ODs of the present embodiment facilitate assembly of the seal system 100. For example, when installing the first seal assembly 102 into the bore of the cylinder 106, the locking ring 146 must be forced or pressed into the bore due to the interference fit between the locking flange 152 and the first bore section 116*a*. By sizing the cylinder to have two different bore sections 116*a*, 116*b*, the locking ring 146 of the first seal assembly 102 is pressed or forced to only slide a minimal distance into the first bore section 116*a* for installation and not rub or contact the second bore section 116*b* during assembly. Thus, installation or assembly of the first seal assembly 102 is simplified by the stepped bore of the present embodiment compared to the straight cylinder bore of other embodiments.

To accommodate the seal element 126 of the second seal assembly 104 to seal against the second bore section 116*b* of the cylinder, the deck 150 of the locking ring 146 is increased in thickness and diameter. In the embodiment shown, the notch for mechanically engaging the outside flange 130 and the support surface adjacent the notch has been displaced radially outwardly relative to the central axis to press the outside sealing lip of the outside flange against the larger bore section. In the present embodiment, the inside surface 154 of the locking ring of the second seal assembly 104 is the same or similar to that of the first seal assembly 102 so that similar energizers 136 may be used for both seal assemblies. However, the inside surface 154 of the second seal assembly may be adjusted so that two different energizers can be used with two different sized spring cavities, such as to provide two different sealing forces.

In the present embodiment, three washers 172 are incorporated, similar to that of FIG. 1A. While all three washers 172 may include memory lips that function as sealing lips as previously discussed, in the present embodiment, the second washer 172*b* and the third washer 172*c* can be standard washers, which is understood as being generally planar and having an outer perimeter and an inner perimeter defining an inside opening, without a memory lip. In an example, the inside openings of the second and third washers 172*b*, 172*c* are sized to have approximately a size-on-size fit with the shaft OD. The size-on-size fit can sufficiently deter viscous fluid from entering into the interface between the shaft and the inside flange and possibly interferes with the dynamic seal or presents a difficult media for the seal to maintain. In other embodiments, the standard washers can be sized with an inside opening with a size-on size fit or slight interference fit with the shaft OD, in the order of about 0.1 to 2 thousandths.

In the present embodiment, the retainer disc 190 is sized to engage the larger second bore section 116*b*. For example, the outside diameter of the retainer disc 190 is sized to have an interference fit with the second bore section 116 to retain the various components within the bore.

With reference now to FIG. 3, an alternative seal system 100 provided in accordance with further aspects of the invention is shown. The present seal system 100 is similar to the seal system of FIG. 1A with a few exceptions. In the present embodiment, the cylinder 106 has generally the same inside diameter but is a split cylinder and comprises a first cylinder section 106*a* and a second cylinder section 106*b*. The split cylinder has a stepped split line 192 wherein one of the two cylinder sections has an opening 194 with an inside diameter for receiving a projection 196 of the other cylinder to assemble the two cylinder sections together. In an example, the opening with the inside diameter and the projection with an outside diameter are sized with an interference fit, to prevent unwanted separation. Although the second cylinder section 106*b* is shown with the opening and the first cylinder section 106*a* is shown with a projection, the two can reverse.

Each cylinder section has an open end or insertion end and a closed end with a retaining wall 118. The first seal assembly 102 can be inserted into the first cylinder section 106*a* through the insertion end and retained at the opposite end by the retaining wall 118. Similarly, the second seal assembly 104 can be inserted into the second cylinder section 106*b* through the insertion end of the second cylinder section and retained at the opposite end by the retaining wall 118. Both retaining walls 118 can have inside diameters that are sufficiently large so as to not rub or contact the shaft OD during installation and use.

Three gaskets or washers 172 may be incorporated with the present seal system. In the present embodiment, the three gaskets can each comprise a memory lip. Alternatively, the gaskets can be mixed with both a standard gasket and one with a memory lip. As shown, the first and the second gaskets 172*a*, 172*b* are both provided with memory lips to function as sealing lips and the third gasket 172*c* can be a standard gasket. The first gasket 172*a* may be positioned within the first cylinder section 106*a* or the second cylinder section 106*b*. As shown, the first gasket 172*a* is positioned inside the bore of the first cylinder section with the outside diameter of the gasket pressed against the inside diameter of the first bore section. Further, the first gasket 172*a* can be sized with a thickness that gets compressed between the two locking rings of the two seal assemblies 102, 104 when the seal system is fully assembled as shown.

FIG. 4 shows an alternative seal system 100 provided in accordance with further aspects of the invention. The present seal system 100 is similar to the seal system of FIG. 1A with a few exceptions. In the present embodiment, the cylinder 106 has generally the same inside diameter. Alternatively, the seal system 100 can omit the cylinder and be assembled directly into the housing 110 without the cylinder. Similar washers may also be used with the present seal assembly, except for the middle washer.

The present seal system 100 comprises a first seal assembly 102 and a second seal assembly 104 each with a seal element 126 having generally the same ID and OD and arranged to face one another. However, in the present embodiment, the locking ring 146 is a combination locking ring 146*a*. That is, the combination locking ring 146*a* has a single locking flange 152 for locking against the interior of the cylinder or housing but has two different decks 150 with each comprising a notch for mechanically engaging the respective outside flange 130 of the respective seal element. The two decks 150 are located to either side of the locking flange 152. The combination locking ring 146a also has a single inner flange extension 158. The locking flange 152 and the inner flange extension 158 align generally along the same axial position and the two decks are located on either side of this aligned structure. The length of the single inner flange extension 158 can be selected to adjust the spring cavity opening 160 of both the first and second seal assemblies as desired, to restrict the two energizers 136 from escaping out through the respective spring cavity opening during use.

With reference now to FIG. 5, a seal system 100 is shown in accordance with still further aspects of the invention. The seal system 100 of the present embodiment comprises a seal assembly 102 having a seal element 126, a locking ring 146, a washer 172, and an energizer 136 located in the spring cavity 134. The seal assembly 102 may be mounted directly in a gland of a housing 110 to seal against the housing and the dynamic shaft 108 without a cylinder or a can. However, the seal assembly 102 of the present embodiment may be pre-mounted in a cylinder 106. The seal system 100 is further provided with a washer 172 having a memory lip 176 that functions as a sealing lip, as previously discussed. Thus, the present seal system 100 is understood as a double seal assembly with two dynamic seals or two dynamic sealing points.

The seal element 126 has an inside flange 128, an outside flange 130, and a center channel section 132 that together define a spring cavity 134. An energizer 136, which can be a canted coil spring, is located in the spring cavity and biases the inside and outside flanges away from one another. The spring cavity 134 is formed without a locking ring and the shape of the spring cavity is defined by the inside flange, the outside flange, and the center channel section only. The enlarged end section 129 of the outer flange 130 can be sized with an OD that presses against the interior of the housing or cylinder to seal thereagainst.

A retaining lip 200 can extend radially inwardly from an end of the outside flange towards the shaft axis or central axis of the seal assembly to reduce the spring cavity opening 160. The retaining lip 200 can be singularly formed with the seal element 126 and the length of the retaining lip 200 can be selected to minimize the spring cavity opening 160.

A notch 202 is provided on the exterior of the outside flange 130 to mechanically engage the projection on the locking ring 146, which is sized with an OD to form an interference fit with the housing or cylinder. In the assembled configuration, both the enlarged end section 129 of the outside flange 130 and the locking ring 146 contact the interior of the housing or cylinder.

The locking ring 146 of the present embodiment comprises first flange section 206 attached to a second flange section 208 at an intersection. In the example shown, the first flange section 206 is generally planar and extends transversely to the shaft. The first flange section 206 functions as a retaining disc to secure the various seal components within the cavity of the housing or cylinder, similar to the retaining disc of FIG. 1A.

The second flange section 208 extends in the axial direction relative to the shaft. In the example shown, the flange section 208 has an end projection 210 on an outside surface to define an OD that is larger than the remaining OD part of the second flange section. The outside projection 210 provides an interference with the inside surface of the cylinder or housing. In some examples, the projection 210 can be located closer to the intersection of the two flange sections 206, 208 than at the opposite end of the second flange section.

Interiorly, the second flange section 208 of the locking ring 146 has a projection 212 on the inside surface for mechanically engaging the notch 202 of the outside flange 130 of the sealing element 126. A space or gap is provided between the vertical lip of the inside projection 212 and the wall of the first flange section 206. The gap is sized and shaped to accommodate the width of the center channel section 132 and the washer 172 to retain the two therebetween during assembly and service.

The washer 172 has a memory lip 176 that functions as a sealing lip, as previously discussed. In the present embodiment, the memory lip 176 is orientated to face the outside region 52 while the free end of the inside flange 128 of the seal element 126 is oriented to face the outside region 50. In an example, a second washer may be incorporated between the retaining wall 118 and the seal element 126. The second washer can be a standard washer or one with a memory lip. Adding the second washer can allow the use of service grease in the spring cavity.

With reference now to FIG. 6, a seal system 100 is shown in accordance with still further aspects of the invention. The seal system 100 of the present embodiment comprises a seal assembly 102 mounted directly in the gland of a housing 110. Alternatively, the housing can be a cylinder 106 and the seal assembly 102 is mounted to the cylinder as a pre-packaged seal system before being mounted inside the gland of the housing. The present seal assembly 102 comprises a seal element 126, a locking ring 146, a washer 172 (not shown), and an energizer 136 located in a spring cavity 134. The present seal assembly 102 is similar to the first seal assembly 102 of FIG. 1A. The present seal assembly 102 may be used as a single seal to prevent higher interior fluid pressure from leaking outside, or to seal higher environmental pressure from leaking inside into the lower pressure spring cavity. In some examples, a washer, or second washer, may be placed in abutting contact with the locking ring 146. A retainer disc may be placed adjacent the washer to retain the washer against the locking ring. The washer can be a standard washer or one with a memory lip. Adding a washer can allow the use of service grease in the spring cavity 134 of the seal assembly 102.

With reference now to FIG. 7, a seal bearing system 240 in accordance with aspects of the invention is shown. The seal bearing system 240 shares many aspects as the seal system 100 discussed elsewhere herein. As shown, the seal bearing system 240 comprises a cylinder 106 with a retaining wall 118 and an open end or insertion end 120 for mounting the various seal bearing components, similar to the cylinder of FIG. 1A. Exteriorly, the cylinder may be shaped with shoulders, flanges, etc. for mating with equipment housing 110, which can be any number of devices, such as a pump, a mixer, a valve, a blower, etc. having a shaft 108 movable within the housing 110.

Internally, the cylinder 106 has a stepped bore with a first bore section 116a and a second bore section 116b, similar to the cylinder of FIG. 2. A first seal assembly 102, a second seal assembly, and two washers 172a, 172b are located inside the bore 116, also similar to the seal system of FIG. 2. The first and second washers 172a, 172b can be of a standard type with a straight inside opening without a memory lip. The inside opening of the standard washers can be smaller than the shaft OD to generate an interference fit.

In other examples, the two washers 172a, 172b can each have a memory lip, or only one of the two can have a memory lip, the one between the two locking rings or the one adjacent the retaining wall 118. Further, while the two seal elements 126 face one another, they can be oriented to both face the exterior region 50, be oriented to both face the exterior region 52, or oriented to face away from one another.

A retaining disc 190 is placed in abutting contact with the seal element 126 of the second seal assembly 104. The retaining disc can have an interference fit with the cylinder 106 and incorporated to retain the various seal components inside the bore 116. In an alternative embodiment, a washer 172c is placed in abutting contact with the seal element 126 of the second seal assembly 104. The washer 172c can be a standard washer having an inside opening with a size-on-size fit with the shaft OD. The washer 172c can be thicker than the first and second washers 172a, 172b to separate the second seal assembly 104 from the bearing assembly 244.

In an example, the bearing assembly 244 comprises an outer ring 246, an inner ring 248, and a cage 250 for retaining a plurality of rolling elements 252 (only one shown) in retaining sockets. The various components of the bearing assembly 244 are typically made from a metal material, which can all be the same material or more likely from a variety of different metal materials. The inner ring 248 is configured to tightly fit around the exterior of the shaft 108 and rotate with the shaft along with the rolling elements 252, which are held by the cage 250 as they rotate with the shaft in spaced apart relationship. The inner ring 248 can have an inside diameter configured to fit around the shaft in an interference fit and an outer diameter, relative to the inside diameter, defining a thickness therebetween. The inner ring 122 also has a width and is sized and shaped to accommodate selected rolling elements.

The outer ring 246 is tightly fitted against the interior surface of the cylinder 106 and is held stationary to the cylinder when the inner ring 248, the cage 250, and the rolling elements 252 rotate with the shaft 108. The outer ring 246 can have an inside diameter configured to contact the rolling elements 126 and an outer diameter configured to fit against the interior of the cylinder 106 in an interference fit. The inside diameter and the outside diameter of the outer ring 246 define a thickness therebetween. The outer ring 246 has a width and is sized and shaped to accommodate selected rolling element types.

In an example, the bearing assembly 244 is a ball bearing assembly and the rolling elements 252 are metal balls or spherical balls. When the bearing assembly 244 is a ball bearing assembly, the outer and inner rings 246, 248 can comprise inner and outer bearing races for the plurality of balls 252 to contact and rotate against. In other examples, the bearing assembly 244 can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

As shown, the outer ring 246 comprises two exterior grooves defining three raised projections. In other examples, one or more than two exterior grooves and two or more than three raised projections can be incorporated. Further, for each projection, relatively smaller grooves, such as micro-grooves, can be provided on the exterior thereof to facilitate assembly of the outer ring 246 into the bore of the cylinder 106. The grooves, when incorporated, reduce interference and friction and facilitate assembly.

The bearing assembly 244, the seal assemblies 102, 104, and the washers 172a, 172b, 172c can be assembled to the cylinder in a pre-packaged configuration to form a seal bearing system 240 in accordance with aspects of the invention. The pre-packaged seal and bearing assembly is thereafter ready for mounting, as a unit, onto the shaft 108. The assembly can then be installed into the housing 110.

Service grease, as discussed above, may be incorporated in the spring cavities 134 of one or both seal assemblies 102, 104. The same or different service grease may be used with the bearing assembly 244 to provide lubrication for the rolling elements 252.

With reference now to FIG. 8, a pre-packaged seal and bearing system 240 is shown, similar to the pre-packaged system of FIG. 7 with a few exceptions. The pre-packaged seal and bearing system 240 of the present embodiment has a split cylinder 106 to facilitate installation of the seal assemblies, washers, and bearing assembly, similar to the discussions of the split cylinder of FIG. 3. A first washer 172a with a memory lip 176 can also be incorporated with the present seal and bearing system 240 instead of a standard washer between the two seal assemblies.

FIG. 9 is a cross-sectional side view of the pre-packaged seal and bearing system 240 of FIG. 8 mounted to a housing having an additional bearing assembly 244a. The seal and bearing system 240 is engaged to or installed within a housing 110, which can have more than one housing section 110a. For example, the pre-packaged seal and bearing system 240 can first be mounted onto the shaft 108 and then the combination mounted to the housing 100.

In the example shown, a second bearing assembly 244a is mounted to the housing and shaft and spaced from the first bearing assembly 244 of the pre-packaged seal and bearing system 240. This configuration shows how the pre-packaged seal and bearing system 240 may be used in a device in which a gap between the first and second bearing assemblies 244, 244a, called a device chamber 254, can be used to house any number of device components, such as a rotor of a motor, a stator of a motor, an oil sump, valve packing materials, fan blades, etc. Having the bearing assemblies 244, 244a located on either end of the device chamber 254 provides support and stability when the shaft rotates. The pre-packaged seal and bearing system 240 provides a single sealing solution with multiple components that can be adapted for multiple applications. For example, the seal assemblies 102, 104 can be orientated with different configurations, either facing one another, both facing the high pressure region, etc., for different applications. The pre-packaged seal and bearing system 240 can also be modified to have different gaskets for added sealing points, such as by utilizing one or more gaskets with memory lips that serve as sealing lips. The cylinder 106 can also have a straight bore, a stepped bore, and can include a split to facilitate assembly.

Still further, service grease may be included in the spring cavities 134 to occupy the spring cavities so that external fluid is less prone to enter into the same space. The service grease can be selected to be compatible with the particular application. For example, if the housing 110 is part of a medical implantable device, the service grease must be biocompatible.

In yet another example, the pre-packaged assembly is a pre-packaged seal system 100, such as the seal system of FIG. 1A, 2, or 3, without a bearing assembly. The bearing assembly can instead be mounted outside of or external to the cylinder 106.

With reference now to FIG. 10, a seal system 100 is shown in accordance with still further aspects of the invention. The seal system 100 of the present embodiment comprises a seal assembly 102 mounted directly in a gland of a housing 110. Alternatively, the housing can be a cylinder, can, or cartridge 106 and the seal assembly 102 is mounted to the cylinder or cartridge as a pre-packaged seal system before being mounted inside the gland of the housing. The present seal assembly 102 comprises a seal element 126, a locking ring 146, and an energizer 136, which can be a canted coil spring, located in a spring cavity 134. The present seal assembly 102 is similar to the second seal assembly 104 of FIG. 1A with a few exceptions.

In the present embodiment, the seal element 126 does not incorporate an excluder. Instead, the intersection 260 of the center channel section 132 and the inside flange 128 is spaced from the OD of the shaft 108 to reduce the length of the inside flange that would otherwise touch the shaft. Further, while the center channel section 132 has a nominal thickness section 261, a lower portion 262 of the center channel section that forms part of the cavity 134 has been thickened, such as having an increased thickness over the nominal thickness section 261, to push or space the coils of the canted coil spring away from the outer surface 264 of the center channel section. The lower portion 262 with the increased thickness pushes the contact points at the minor axis of each coil of the caned coil spring 136, or the shorter of the two axes of the elliptical coil shape, towards the inner flange 158 of the locking ring 146 to position the minor axis to align at a particular point of the inside flange 128 of the seal element 126, which changes where the minor axis has the largest operating range along the force versus deflection characteristic of the canted coil spring.

The present seal assembly 102 may be used as a single seal. The free ends of the inner and outer sealing flanges can face away from the retaining wall 118. In an example, a sealing washer (not shown) may be located between the retaining wall 118 and the outer surface 264 of the center channel section 132 to provide two dynamic sealing points or two dynamic seals with the shaft 108. As previously discussed, the first sealing point can be between the sealing lip of the inside flange and the shaft, and the second sealing point can be the memory lip of the sealing washer and the shaft. The sealing washer may be a standard washer as shown in FIG. 2 or one with a memory lip 176, as shown in FIG. 1A.

In some examples, a sealing washer (not shown) can instead be placed in abutting contact with the locking ring 146 and a retainer disc 190 (FIG. 1A) may be placed adjacent the washer to retain the washer against the locking ring 146. The washer can be a standard washer or one with a memory lip. In yet another example, a first washer (not shown) can be placed between the retaining wall 118 and the outer surface 264 of the seal element and a second washer (not shown) can be placed in abutting contact with the locking ring 146 and a retainer disc 190 (FIG. 1A) may be included to retain the second washer against the locking ring and inside the cylinder or cartridge 106. Adding the second washer in abutting contact with the locking ring 146 can allow the use of service grease in the spring cavity 134 of the seal assembly 102.

With reference now to FIGS. 11A-11C, a front view, a front perspective view, and a rear perspective view of a sealing washer 172 in accordance with aspects of the invention is shown, respectively. FIG. 11D is a partial cross-sectional side view of an upper half of the sealing washer 172, shown above the centerline C passing through the central opening 180 of the washer. The sealing washer 172 has a planar body 174 with an outside perimeter 266 defining an outside diameter and an inside perimeter 268 defining the central opening 180. The central opening can be sized with an appropriate interference with a shaft to be inserted therewith, which can be in the order of 0.5 to 5 thousandths interference.

The central opening 180 is provided at the memory lip 176, which is an arcuate section of the body 174 formed during sealing washer molding. The arcuate projection is formed by deflecting the inside part of the body towards the first side or surface 174a and away from the second side or surface 174b of the body 174 to create a pocket 182 (FIG. 11C) behind the projection, as previously discussed. The projection can vary in shape, such as in size, length, and central opening size 180 to create different pocket sizes and shapes. Further, the thickness of the body 174, which is the dimension between the first surface 174a and the opposing second surface 174b, can vary to control the stiffness and/or hardness of the sealing washer. In an example, the projection is formed without or with a minimal inside opening perimeter and then a final central opening 180 is formed by cutting or punching the opening 180 with an appropriately sized puncher or tap to control the opening size.

In an alternative example, the projection forming the memory lip is formed after molding the washer itself, such as by heating the washer against a mold with a central projection and then cooling the washer while holding the washer pressed against the mold. The central opening 180 is then formed by cutting or punching the opening with an appropriately sized puncher or tap. The present sealing washer 172 may be used with any of the seal assemblies and seal systems discussed elsewhere herein.

Figure 12D:
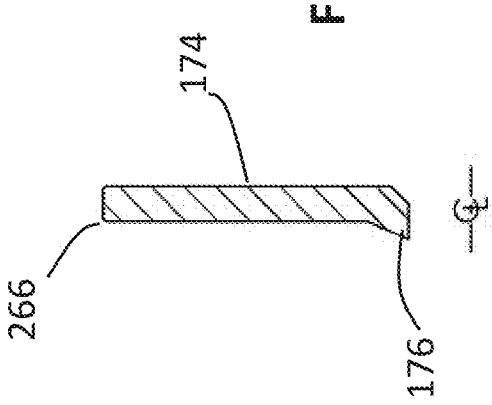
Figure 12A:
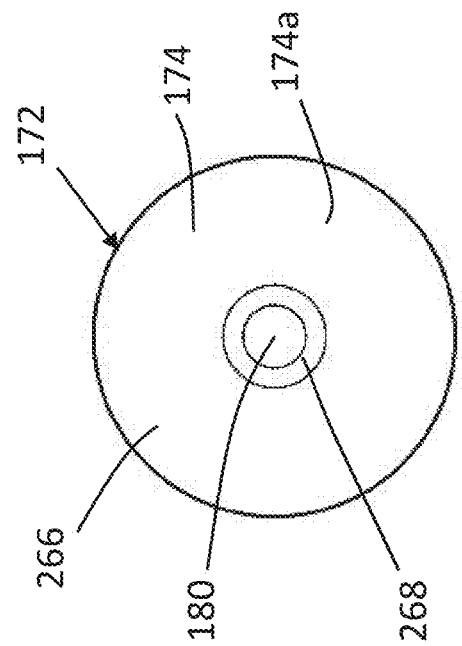
Figure 12C:
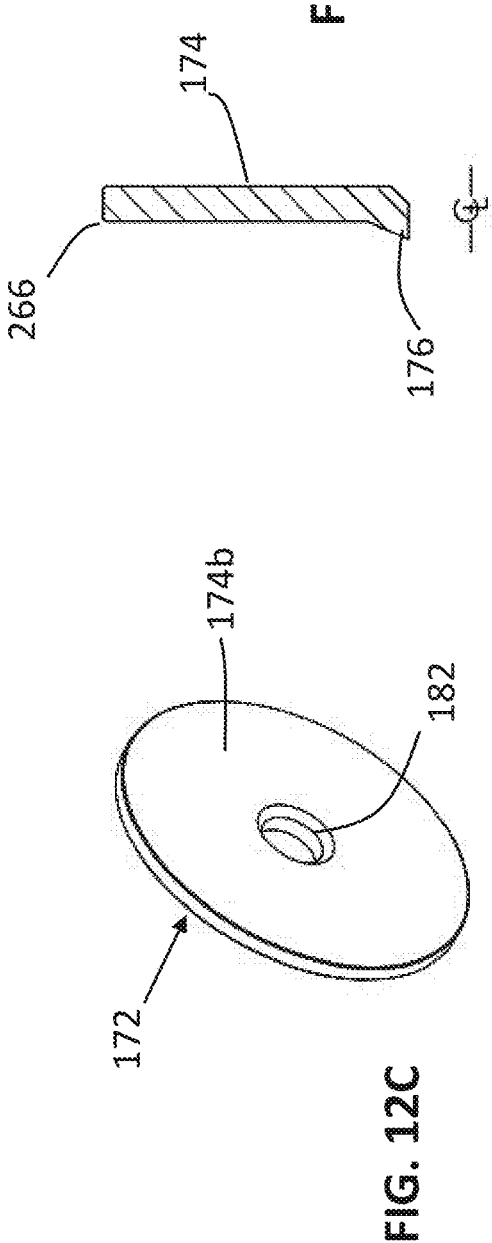

With reference now to FIGS. 12A-12C, a front view, a front perspective view, and a rear perspective view of a sealing washer 172 in accordance with further aspects of the invention is shown, respectively. FIG. 12D is a partial cross-sectional side view of an upper half of the sealing washer 172, shown above the centerline C passing through the central opening 180 of the washer. The sealing washer 172 has a planar body 174 with an outside perimeter 266 defining an outside diameter and an inside perimeter 268 defining the central opening 180. The central opening can be sized with an appropriate interference with a shaft to be inserted therewith, which can be in the order of 0.5 to 5 thousandths interference. The present sealing washer is similar to the sealing washer of FIGS. 11A-11D, but with a less pronounced memory lip 176 compared to the memory lip of FIGS. 11A-11D. The present sealing washer 172 may be used with any of the seal assemblies and seal systems discussed elsewhere herein.

With reference now to FIGS. 13A and 13B, a front view and a front perspective view of a sealing washer 172 in accordance with further aspects of the invention is shown, respectively. FIG. 13C is a partial cross-sectional side view of an upper half of the sealing washer 172, shown above the centerline C passing through the central opening 180 of the washer. The sealing washer 172 has a planar body 174 with an outside perimeter 266 defining an outside diameter and an inside perimeter 268 defining the central opening 180. The central opening can be sized with an appropriate interference with a shaft to be inserted therewith, which can be in the order of 0.5 to 5 thousandths interference. The present sealing washer is similar to the sealing washer of FIGS. 11A-11D but formed without any memory lip. The present sealing washer 172 may be used with any of the seal assemblies and seal systems discussed elsewhere herein.

With reference now to FIG. 14, a seal system 100 is shown in accordance with still further aspects of the invention. The seal system 100 of the present embodiment comprises a seal assembly 102 mounted directly in a gland of a housing 110. Alternatively, the housing can be a cylinder, can or cartridge 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assembly 102 of FIG. 10 and elsewhere.

However, unlike the seal element 126 of FIG. 10, in the present embodiment, the center channel section 132 has a generally constant thickness along its entire length or height. Thus, there is no appreciable lower thickened portion of center channel section to push the coils of the canted coil spring 136 away from the outer surface 264.

A sealing washer 172 is shown located between the retaining wall 118 and the seal element 126. In particular, the body of the sealing washer contacts both the retaining wall and the center channel section of the seal element. The sealing washer 172 can incorporate a memory lip 176. The memory lip can point in the direction of the retaining wall 118. The memory lip 176 can be an extended memory lip as shown in FIGS. 11A-11D or a shortened or short memory lip as shown in FIGS. 12A-12D. In some examples, a second sealing washer (not shown) may be placed in contact with the locking ring 146 and a retaining disc 190 (FIG. 1A) may be placed at the insertion end to retain the second sealing washer against the locking ring and to retain the various components within the housing or cylinder 106. The retaining disc 190 (FIG. 1A) is understood as being spaced from or located away from the retaining wall 118.

With reference now to FIG. 15, a seal system 100 is shown in accordance with still further aspects of the invention. The seal system 100 of the present embodiment comprises a seal assembly 102 mounted directly in a gland of a housing 110. Alternatively, the housing can be a cylinder or can 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assembly 102 of FIG. 14 and described elsewhere. However, in the present embodiment, the sealing washer 172 has a memory lip 176 that is extended or longer, similar to the memory lip shown in FIGS. 1A and 11A-11D, than the memory lip of FIG. 14. In some examples, a second sealing washer may be placed in contact with the locking ring 146 and a retaining disc 190 (FIG. 1A) may be placed at the insertion end to retain the sealing assembly and the two washers within the cylinder or cartridge 106. The retaining disc 190 is understood as being spaced from or located away from the retaining wall 118.

With reference now to FIG. 16, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assembly 102 of FIG. 14. However, in the present embodiment, the sealing washer 172 is a standard sealing washer without any memory lip. The sealing washer has a central opening 180 that seals against the shaft OD. In the example shown, the body 174 of the sealing washer 172 has a first thickness at the outside diameter or outside perimeter and a second thickness at the inside diameter or opening, and wherein the first thickness is larger than the second thickness. The thinner washer section is preferably located at the inside diameter or opening to vary the stiffness at the inside diameter. In some examples, a second sealing washer may be placed in contact with the locking ring 146 and a retaining disc 190 (FIG. 1A) may be placed at the insertion end to retain the sealing assembly and the two washers within the housing or cylinder. The retaining disc 190 is understood as being spaced from or located away from the retaining wall 118.

With reference now to FIG. 17, a seal system 100 is shown in accordance with still further aspects of the invention. The seal system 100 of the present embodiment comprises a seal assembly 102 mounted directly in a gland of a housing 110. Alternatively, the housing can be a cylinder 106 having a retaining wall and an open end for assembly, as previously discussed with reference to FIG. 1A and elsewhere, to form a pre-packaged seal system before being mounted inside the gland of an equipment housing, such as a bearing box. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assembly 102 of FIG. 14 and discussed elsewhere herein.

However, in the present embodiment, inside flange 128 is extended or lengthened such that the free end 128a of the inside flange is located to one side of the coils of the canted coil spring and the center channel section 132 is located on the opposite side of the coils. As shown, the free end 128a is located at approximately the inside edge of the inner flange extension 158 of the locking ring 146. The extended inside flange 128 provides increased surface contact between the seal element and the shaft.

Although one or more sealing washers are not shown with the seal assembly 102 of FIG. 17, one or more sealing washers may be used along with one or more retaining discs, similar to the seal assemblies of FIGS. 14-16.

With reference now to FIG. 18, a seal system 100 is shown in accordance with still further aspects of the invention. The seal system 100 of the present embodiment comprises a seal assembly 102 mounted directly in a gland of a housing 110. The present seal assembly 102 comprises a seal element 126, a locking ring 146, and an energizer 136, which can be a canted coil spring, located in a spring cavity 134, similar to the seal assembly 102 of FIGS. 14-17 and elsewhere. In the present embodiment, a sealing lip projection 270 is provided on the inside flange 128 of the seal element 126 for sealing contact with the outside diameter of the shaft 108. The sealing lip projection projects away from the surface of the inside sealing flange. The sealing lip projection 270 spaces the remainder of the inside flange from the shaft. The sealing lip projection 270 has a width and the width of the sealing lip projection is about 10% to 30% of the width or length of the inside flange, measured from the free end to where the inside flange intersects with the center channel section 132. Preferably the width is about 15% to 25% of the length of the inside flange. The selected width of the sealing lip projection 270 provides increased sealing force at the sealing interface with the shaft due to the smaller surface area contact, compared to where the sealing lip is larger than 30% of the length of the inside flange.

In an example, an optional recess 272 is formed on the inside surface of the center channel section 132. If incorporated, the recess effectively reduces the width or thickness of the center channel section to form a section of a relatively smaller thickness. The smaller thickness gives the lower section of the center channel more flexibility, and therefore provides flexibility to the inside flange 128.

While an equipment housing 110 is shown with the seal assembly 102 of FIG. 18, the seal assembly 102 may first be packaged in a cylinder or cartridge 106 (FIG. 1A) to form a pre-packaged seal assembly, as discussed elsewhere herein. In some examples, one or more sealing washers may also be incorporated with the pre-packaged seal assembly. If used, a sealing washer can be placed in contact with the seal element and another in contact with the locking ring 146. A retaining disc can also be used to secure the various components within the interior of the cylinder. In some examples, an open cylinder is used with two retaining discs. The retaining disc is understood as being spaced from or located away from a retaining wall, if only one is used.

With reference now to FIG. 19, a seal system 100 is shown in accordance with still further aspects of the invention. The seal system 100 of the present embodiment comprises a seal assembly 102 mounted directly in a gland of a housing 110 or can be pre-packaged in a cylinder or can 106 and then installed inside the housing 110, such as a bearing box. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assembly 102 of FIGS. 14-17 and 18 and discussed elsewhere herein. In the present embodiment, a sealing lip projection 270 is provided on the inside flange 128 of the seal element 126 for sealing contact with the outside diameter of the shaft 108, similar to the seal element of FIG. 18.

In the present embodiment, the locking ring 146 has an extended back section 274 with an inside diameter having a plurality of spaced apart rings 276. The spaced apart rings 276 can be separately formed and then attached to the extended back section of the locking ring. Alternatively, the spaced apart rings 276 are unitarily formed with the locking ring. The spaced apart rings 276 have a close tolerance fit around the shaft 108, such as a size-on-size fit or a small clearance, such as 0.5 to 2 thousandths total clearance. The spaced apart rings 276 provide a tortuous path to help prevent leakage or seepage of fluid into the seal cavity 134. The space apart rings are sometimes referred to as a labyrinth seal, which can be utilized in any of the seal rings discussed elsewhere herein.

With reference now to FIG. 20, a seal system 100 is shown in accordance with still further aspects of the invention. The seal system 100 of the present embodiment comprises a seal assembly 102 mounted directly in a gland of a housing 110. Alternatively, the housing can be a cylinder or cartridge 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein. The seal element 126 has an excluder 166 and an annular recess 168, similar to the seal element of the first seal assembly 102 of FIG. 1A and FIG. 6. The free ends of the inner and outer sealing flanges point away from the retaining wall 118.

A first sealing washer 172a is shown located between the locking ring 146 and the retaining disc 190. The retaining disc 190 is understood as being spaced from or located away from the retaining wall 118. The first sealing washer 172a has a memory lip 176 that points in the direction of the seal element 126. In other examples, the memory lip 176 of the first sealing washer can point in the opposite direction.

A second sealing washer 172b is shown located between retaining wall 118 and the seal element 126. In an example, the body of the second sealing washer 172b contacts both the retaining wall and the center channel section of the seal element. The sealing washer 172 is shown as a standard sealing washer, similar to that of FIGS. 13A-13C. However, the second sealing washer 172b can optionally incorporate a memory lip 176. The memory lip can point in the direction of the retaining wall 118 or in the direction of the canted coil spring 136. The memory lip 176 of one or both sealing washers can be an extended memory lip as shown in FIGS. 11A-11D or a short memory lip as shown in FIGS. 12A-12D. Service grease may be added to the cavity 134 when utilizing the first sealing washer 172a, and optionally service grease may be added to the cavity when both sealing washers 172a, 172b are utilized.

With reference now to FIG. 21, a seal system 100 is shown in accordance with still further aspects of the invention. The seal system 100 of the present embodiment comprises a seal assembly 102 mounted directly in a gland of a housing 110. Alternatively, the housing can be a cylinder or cartridge 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assembly of FIG. 20 and discussed elsewhere. The seal element 126 has an excluder 166 and an annular recess 168, similar to the seal element of the first seal assembly 102 of FIGS. 1A, 6, and 20. The free ends of the inner and outer sealing flanges point away from the retaining wall 118.

In the present embodiment, two sealing washers 172a, 172b are used in a stacked arrangement, or back-to-back arrangement, which can include two or more sealing washers. The two sealing washers shown can be placed in between the locking ring 146 and the retaining disc 190 and spaced from the retaining wall 118. The two sealing washers can be both standard sealing washers without any memory lip, both with a memory lip of the same type or different type, or the two can be a mixed combination with one having a memory lip and one being a standard sealing washer. As shown, the first sealing washer 172a has a memory lip that points in the direction of the cavity 134, and the second sealing washer 172b is a standard sealing washer.

Optionally a third sealing washer may be placed between the retaining wall 118 and the seal element 126. The third sealing washer may be a standard sealing washer or one with a memory lip, which can be an extended memory lip as shown in FIGS. 11A-11D or a shortened memory lip as shown in FIGS. 12A-12D. In another example, a stacked sealing washer arrangement may be incorporated between the retaining wall and the seal element. Service grease may be included in the cavity.

With reference now to FIG. 22, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assembly of FIGS. 1A, 6, 20, and 21. The seal element 126 has an excluder 166 and an annular recess 168, similar to the seal element of the first seal assembly 102 of FIGS. 1A, 6, 20, and 21. The free ends of the inner and outer sealing flanges point away from the retaining wall 118.

In the present embodiment, two sealing washers 172a, 172b are used in a stacked arrangement, or back-to-back arrangement, which can include two or more sealing washers. The two sealing washers shown can be placed in between the retaining wall 118 and the seal element 126. The two sealing washers can be both standard sealing washers, both with a memory lip of the same type or different type, or the two can be a mixed combination with one having a memory lip and one being a standard sealing washer. As shown, the first sealing washer 172a has a memory lip that points in the direction away from the cavity 134 and the second sealing washer 172b located between the first sealing washer and the seal element can be a standard sealing washer.

Optionally a third sealing washer may be placed between the locking ring 146 and a retraining disc 190 (FIG. 1A) and spaced from the seal element 126. The third sealing washer may be a standard sealing washer or one with a memory lip, which can be an extended memory lip as shown in FIGS. 11A-11D or a shortened memory lip as shown in FIGS. 12A-12D. Service grease may be included in the cavity 134.

With reference now to FIG. 23, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assembly of FIGS. 1A, 6, and 20-22. The seal element 126 has an excluder 166 and an annular recess 168, similar to the seal element of the first seal assembly 102 of FIGS. 1A, 6, and 20-22. The free ends of the inner and outer sealing flanges point away from the retaining wall 118.

In the present embodiment, two sealing washers 172a, 172b are used in a stacked arrangement, or back-to-back arrangement similar to that shown in FIG. 22. Two additional stacked sealing washers 172c, 172d may be included between the locking ring 146 and the retaining disc 190. The two additional sealing washers 172c, 172d can be both standard sealing washers, both with a memory lip of the same type or different type, or the two can be a mixed combination with one having a memory lip and one being a standard sealing washer. As shown, the third sealing washer 172c has a memory lip that points in the direction of the cavity 134 and the fourth sealing washer 172d located between the third sealing washer and retaining disc 190 can be a standard sealing washer. Service grease may be included in the cavity 134.

With reference now to FIG. 24, a seal system 100 is shown in accordance with still further aspects of the invention. The seal system 100 of the present embodiment comprises a seal assembly 102 mounted directly in a gland of a housing 110. Alternatively, the housing can be a cylinder or can 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assemblies of FIGS. 1A, 6, and 20-22. The seal element 126 has an excluder 166 and an annular recess 168, similar to the seal element of the first seal assembly 102 of FIGS. 1A, 6, and 20-22. The free ends of the inner and outer sealing flanges point in the direction of the retaining wall 118, opposite to that of the seal elements of FIGS. 22 and 23.

In the present embodiment, two sealing washers 172a, 172b are used in a stacked arrangement, or back-to-back arrangement similar to that shown in FIGS. 22 and 23, except the two sealing washers are located between the retaining wall 118 and the locking ring 146, which is located closer to the retaining wall than the sealing ring is to the retaining wall. At least one additional sealing washer 172c is provided between the retaining disc 190 and the seal element 126. The third sealing washer 172c can include a memory lip pointing away from the seal element 126. However, the third sealing washer 172c can be a standard washer.

If the third sealing washer 172c has a memory lip, then a fourth sealing washer 172d may be included. In the embodiment shown, the third and fourth sealing washers are in a stacked arrangement with both being located between the seal element 126 and the retaining disc 190. Service grease may be included in the cavity 134. Optionally, only a single washer is used where stacked washers are shown.

With reference now to FIG. 25, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assemblies of FIG. 1A, 6, and particularly of FIG. 24. However, in the present embodiment, only a single sealing washer 172a is positioned between the retaining wall 118 and the locking ring 146 and a single sealing washer 172b is positioned between the seal element 126 and the retaining disc 190. Both sealing washers can have a memory lip that faces away from one another or face away from the cavity. Optionally, the memory lips can face one another. The memory lip of both washers can be an extended type or a shortened type, as previously discussed. Service grease may be included in the cavity 134.

With reference now to FIG. 26, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein. The seal element 126 has an excluder 166 and an annular recess 168, similar to the seal element of the first seal assembly 102 of FIGS. 1A, 6, and 20. The free ends of the inner and outer sealing flanges point away from the retaining wall 118.

In the present embodiment, a wedge sealing washer 278 is located between the retaining wall 118 and the seal element 126. The wedge sealing washer 172 has a body 174 with an outside perimeter 266 defining an outside diameter and an inside perimeter 268 defining a central opening 180 with an inside diameter. The body 174 has a first surface 280 in contact with the outer surface 264 of the central channel section of the seal element 126 and an opposing second surface 282 spaced from the central channel section and in contact with the retaining wall 118. In an example, the first surface 280 is generally orthogonal to the lengthwise axis of the shaft 108 and the second surface 282 is angled to the lengthwise axis of the shaft to form a wedge shape body 174 having a thickness that is larger at the base, or at the inside perimeter, than at the tip at the outside perimeter 266. The tapered angle of the second surface 282 can vary to alter the thickness at the base of the wedge sealing washer 278, or at the inside perimeter 268.

To form a line contact between the surface of the retaining wall 118 and the second surface 282 of the wedge sealing washer 278, the retaining wall 118 has a support surface 288 that is angled relative to the cylindrical body portion a 106a of the cylinder 106, such as being angled relative to the lengthwise dimension of exterior surface. The support surface 288 preferably contacts the second surface 282 along a line contact, when viewing along the lengthwise cross-section. Thus, the support surface 288 can have approximately the same tapered angle as the second surface 282 of the wedge sealing washer 278.

Optionally a sealing washer 172 may be placed between the locking ring 146 and the retaining disc 190. The sealing washer 172 may be a standard sealing washer or one with a memory lip, which can be an extended memory lip as shown in FIGS. 11A-11D or a shortened memory lip as shown in FIGS. 12A-12D. Service grease may be included in the cavity 134. The memory lip 176 can point in the direction of the cavity 134 as shown, where service grease may be included, or can point away from the cavity. In other examples, there can be a stacked washer arrangement with two or more washers located where the second sealing washer 172 is shown, similar to that shown in FIGS. 21-24.

With reference now to FIG. 27, a seal system 100 is shown in accordance with still further aspects of the invention. The seal system 100 of the present embodiment comprises a seal assembly 102 mounted directly in a gland of a housing 110. Alternatively, the housing can be a cylinder or cartridge 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein. The seal element 126 has an excluder 166 and an annular recess 168, similar to the seal element of the first seal assembly 102 of FIGS. 1A, 6, and 20. The free ends of the inner and outer sealing flanges point away from the retaining wall 118.

The present seal assembly 102 most closely resembles the seal assembly of FIG. 26 and has a similar wedge sealing washer 278. However, in the present embodiment, a cut-out 290 is provided between the first surface 280 and the inside perimeter 268. The cut-out 290 on the wedge sealing washer 278 embodies a straight cut 292 between the two surfaces 268, 280 to form a triangular shaped cut-out 290 at the lower portion of the wedge sealing washer 278. The cut-out, when incorporated, reduces the length of contact between the inside perimeter 268 and the shaft 108. Service grease may be included in the cavity 134. A second washer 172 is shown placed against the locking ring 146. In another example, there can be a stacked washer arrangement with two or more washers located where the second sealing washer 172 is shown, similar to that shown in FIGS. 21-24.

With reference now to FIG. 28, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein. The seal element 126 has an excluder 166 and an annular recess 168, similar to the seal element of the first seal assembly 102 of FIGS. 1A, 6, and 20. The free ends of the inner and outer sealing flanges point away from the retaining wall 118.

In the present embodiment, the retaining wall 118 has a body 296 that is generally wedge shaped along a side cross-section. The retaining wall 118 has a support surface 288 that is generally orthogonal to the axis of the shaft 108 and is configured to the contact the outer surface 264 of the center channel section, similar to other retaining walls discussed elsewhere herein. However, in the present embodiment, the outer surface or exposed surface 298 of the retaining wall is angled to the axis of the shaft 108 to define a body 300 that is generally wedge shape. The lower end of the retaining wall 118 near the central opening is provided with a stepped perimeter 302 for receiving a correspondingly shaped stepped sealing washer 304 that when combined, form a generally cylindrical through bore 306 having a line contact with the shaft 108, which is preferably in an interference fit with the shaft.

In an example, the stepped sealing washer 304 has a generally L-shape along a side cross-section. The longer length of the L-shape is oriented to contact the shaft while the short length of the L-shape is oriented to contact the seal element 126. The stepped sealing washer 304 may be assembled to the retaining wall 118 prior to assembling the various components into the cylinder 106 via the assembly end of the cylinder.

A second sealing washer 172 may be placed between the locking ring 146 and the retaining disc 190, similar to other seal assemblies discussed elsewhere herein. The second sealing washer 172 may be a standard sealing washer or one with a memory lip, which can be an extended memory lip as shown in FIGS. 11A-11D or a shortened memory lip as shown in FIGS. 12A-12D. Service grease may be included in the cavity. The memory lip 176 can point in the direction of the cavity 134, where service grease may be included. In other examples, there can be a stacked washer arrangement with two or more washers located where the second sealing washer is shown, similar to that shown in FIGS. 21-24.

With reference now to FIG. 29, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, such as the seal assembly of FIG. 26.

The seal element 126 has an excluder 166 and an annular recess 168, similar to the seal element of the first seal assembly 102 of FIGS. 1A, 6, and 20. The free ends of the inner and outer sealing flanges point away from the retaining wall 118. In the present embodiment, an inner retaining disc 294 is incorporated to secure the wedge sealing washer 278 against the support surface 288 of retaining wall 118. The inner retaining disc 294 has an outer perimeter that is fitted against the inside of the cylinder 106, in an interference fit, and an inner perimeter that is spaced from the shaft outer diameter by a gap.

Figure 30:
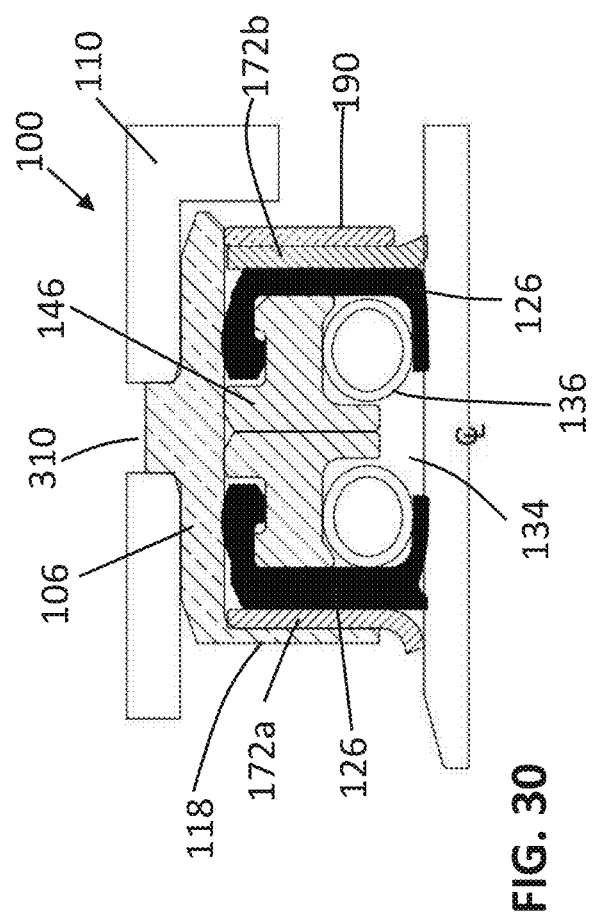
FIG. 30 is a cross-sectional side view of another seal assembly having a seal element, a locking ring, and an energizer.

With reference now to FIG. 30, a seal system 100 is shown in accordance with still further aspects of the invention. The seal system 100 of the present embodiment comprises at least one seal assembly 102 mounted inside a cylinder 106 as a pre-packaged seal system and then the seal system mounted in a gland of a housing 110, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal system 100 comprises two seal assemblies 102, 104 that are mounted with their respective free ends facing one another. The present seal system 100 is similar to that of FIG. 1A with a few exceptions. In the present embodiment, the outer contour of the cylinder 106 has been modified to fit a different housing 110 configuration. As shown, a projection 310 on the exterior of the cylinder 106 is configured to fit between a gap in the housing 110. Two shoulders are formed adjacent the projection 310. In other examples, the exterior can be shaped, such as machined, with different exterior contour features to fit with different housing configurations. Optionally, the cylinder 106 can have a split line.

The present cylinder 106 has a body with a retaining wall 118 and an insertion end 120 for mounting the sealing assemblies and washers, similar to that of FIG. 1A. The present seal system 100 also incorporates a plurality of sealing washers 172, including a first sealing washer 172a located between the retaining wall 118 and the seal element 126 of the first seal assembly 102 and a second sealing washer 172b located between the seal element 126 of the second seal assembly 104 and the retaining disc 190. As shown, the first seal element 126 is provided with an excluder 166. Either or both sealing washers 172a, 172b can include a memory lip, which can be of the extended type or the shortened type, as previously discussed, or a combination of each. In a less preferred embodiment, the sealing washers are of a standard type, without a memory lip. Service grease may be included in the cavity 134. Optionally, where a single sealing washer is shown, a stacked washer arrangement may be incorporated.

Figure 31:
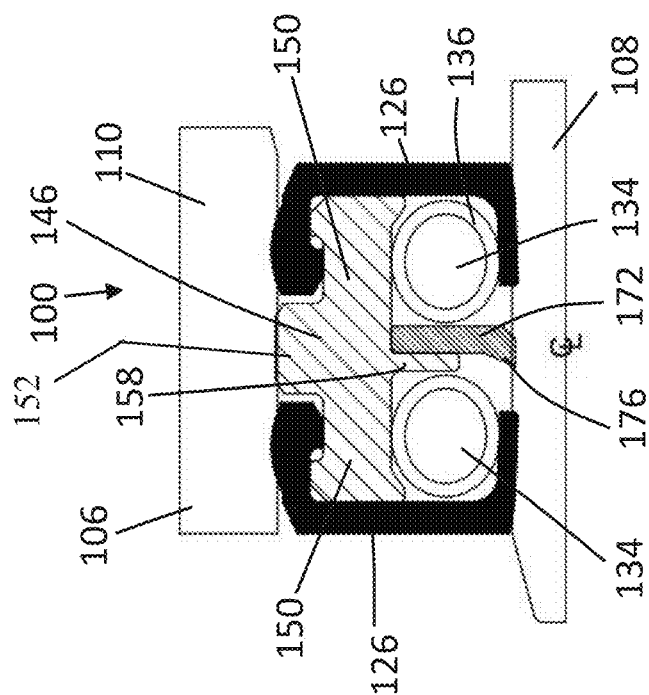
FIG. 31 is a cross-sectional side view of another seal assembly having a seal element, a locking ring, and an energizer.

With reference now to FIG. 31, a seal system 100 is shown in accordance with still further aspects of the invention. The seal system 100 of the present embodiment comprises a seal assembly mounted inside a cylinder 106 as a pre-packaged seal system and then the seal system mounted in the gland of a housing 110, which can be a pump, a valve, a compressor, a bearing box, etc. Thus, it is inherent and expressly contemplated that the cylinder, can or cartridge 106 may be extended to include a bearing assembly, as shown in FIGS. 7 and 8. In the present seal system 100, two seal assemblies 102, 104 are mounted with their respective free ends facing one another, but the locking ring 146 is a combination locking ring 146a, similar to that shown in FIG. 4. That is, the combination locking ring 146a has a single locking flange 152 for locking against the interior of the cylinder or housing 106 or 110 but has two different decks 150 with each comprising a notch for mechanically engaging the respective outside flange 130 of the respective seal element.

In the present embodiment, a sealing washer 172 is fitted against the single inner flange extension 158 of the combination locking ring 146a to separate the two spring cavities 134, 134. The sealing washer 172 has an overall shape that is similar to the sealing washer of FIGS. 12A-12D, which has a shortened memory lip 176. However, the outer perimeter defining the outer diameter of the present sealing washer 172 is relatively smaller. In other words, the ratio of the OD to ID of the present sealing washer is smaller than the ratio of OD to ID of the sealing washer of FIGS. 12A-12D and shown elsewhere. In other examples, the sealing washer has an extended sealing lip or is a standard sealing washer.

In an example, the sealing washer 172 is placed in the cavity 134 of the second seal assembly 104 and in contact with the inner flange extension 158 of the locking ring. The sealing washer can have inner and outer diameters that are in interference fit with the shaft and the combination locking ring, respectively. In an example, the canted coil spring 136 of the second seal assembly 104 is positioned to hold the sealing washer 172 against the inner flange extension 158.

With reference now to FIG. 32, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to the seal assemblies 102 of FIGS. 10 and 14 and elsewhere.

In the present embodiment, a sealing washer 172 is shown located in the spring cavity 134. As shown, a standard sealing washer 172 having an outer perimeter defining an outer diameter and an inner perimeter defining an inner diameter is located in the spring cavity 134, and in contact with the inner flange extension 158 of the locking ring 146, between the inner flange extension and the energizer 136, which is preferably a canted coil spring. In an example, the sealing washer 172 is in an interference fit with the shaft and the lower surface of the deck 150 of the locking ring.

With reference now to FIG. 33, a seal system 100 is shown in accordance with still further aspects of the invention is shown, which is similar to the seal system of FIG. 32. However, in the present embodiment, the sealing washer 172 comprises a memory lip 176. As shown, the memory lip is a shortened memory lip and extends away from the spring cavity 134.

To provide clearance for the memory lip 176, the inside perimeter of the inner flange extension 158 is spaced from the shaft OD by a gap 314. The gap 314 allows the memory lip 176 to extend thereinto, as shown.

With reference now to FIG. 34, a seal system 100 is shown in accordance with still further aspects of the invention. The seal system 100 of the present embodiment comprises a seal assembly 102 mounted directly in a gland of a housing 110. Alternatively, the housing can be a cylinder 106 and the seal assembly 102 is mounted to the cylinder as a pre-packaged seal system before being mounted inside the gland of a housing, which can be a pump, a valve, a compressor, a bearing box, etc. Thus, it is inherent and expressly contemplated that the cylinder, can or cartridge 106 may be extended to include a bearing assembly, as shown in FIGS. 7 and 8. The present seal assembly 102 comprises a seal element 126, a locking ring 146, and an energizer 136, which can be a canted coil spring, located in a spring cavity 134, similar to seal assemblies discussed elsewhere herein, including that of FIG. 28. The seal element 126 has an excluder 166 and an annular recess 168, similar to the seal element of FIGS. 1A, 6, 20, and 28. The free ends of the inner and outer sealing flanges point away from the retaining wall 118.

In the present embodiment, the retaining wall 118 has a body 298 that is generally wedge shaped along a side cross-section. The retaining wall 118 has a support surface 288 that is generally orthogonal to the axis of the shaft 108 that supports a length section of an L-shape sealing washer 304, which is similar to the L-shaped stepped washer of FIG. 28. The length section of the sealing washer 304 then contacts the outer surface 264 of the center channel section of the seal element 126.

The lower end of the retaining wall 118 near the central opening is provided with an inside perimeter 302. In an example, the shorter length 312 of the L-shaped sealing washer 304 is positioned at the inside perimeter 302 and contacts the shaft to seal against the shaft. The stepped sealing washer 304 may be assembled to the retaining wall 118 prior to assembling the various components into the cylinder 106 via the assembly end of the cylinder.

A second sealing washer 172 may be placed between the locking ring 146 and the retaining disc 190, similar to other seal assemblies discussed elsewhere herein. The second sealing washer 172 may be a standard sealing washer or one with a memory lip, which can be an extended memory lip as shown in FIGS. 11A-11D or a shortened memory lip as shown in FIGS. 12A-12D. Service grease may be included in the cavity. The memory lip 176 can point in the direction of the cavity 134, where service grease may be included. In other examples, there can be a stacked washer arrangement with two or more washers located where the second sealing washer is shown, similar to that shown in FIGS. 21-24.

With reference now to FIG. 35, a seal system 100 is shown in accordance with still further aspects of the invention. The seal system 100 of the present embodiment comprises at least one seal assembly 102 mounted inside a cylinder 106 as a pre-packaged seal system and then the seal system mounted in a gland of a housing 110, which can be a pump, a valve, a compressor, a bearing box, etc. Thus, it is inherent and expressly contemplated that the cylinder, can or cartridge 106 may be extended to include a bearing assembly, as shown in FIGS. 7 and 8.

The present seal system 100 comprises two seal assemblies 102, 104, similar to FIG. 30, that are mounted with their respective free ends facing one another, with the free ends understood as the free ends of the inside and outside sealing flanges. However, both seal elements 126 of the first and second seal assemblies of the present embodiment can include an excluder 166. The present seal system 100 is also similar to that of FIG. 3 in that the cylinder 106 has an interior surface defining a bore and has a split that defines a first cylinder section 106a and a second cylinder section 106b. The split cylinder has a stepped split line 192 wherein one of the two cylinder sections has an opening 194 with an inside diameter for receiving a projection 196 of the other cylinder to assemble the two cylinder sections together. In an example, the opening with the inside diameter and the projection with an outside diameter are sized with an interference fit, to prevent unwanted separation. Although the second cylinder section 106b is shown with the opening and the first cylinder section 106a is shown with a projection, the two can reverse.

In the present embodiment, the outer contour of the cylinder 106 has been modified to fit a different housing 110 configuration. Further, while an exemplary outer contour is shown for the present cylinder 106, this cylinder and the various other cylinders discussed herein may have outer contours that can be sized and shaped to fit with different operating environments that call for the seal assembly or combination seal and bearing assembly of the present disclosure. As shown, a shoulder 320 on the exterior of the second cylinder section 106b is configured to receive a corresponding shoulder of the housing 110, which can be any number of equipment types, such as a pump, a valve, a bearing box, etc. Thus, the exterior can be shaped, such as machined, with different exterior contour features to fit with different housing configurations. Alternatively, the cylinder 106 can be a single solid cylinder without a split line or can include a stepped bore with different bore inside diameters.

The present cylinder 106 has a body with two retaining walls 118, one on each of the two cylinder sections. The various seal components, such as washers, seal elements, springs, etc., may be mounted inside the bore by separating the two cylinder sections at the split line 192. The present seal system 100 also incorporates a plurality of sealing washers 172, including a first sealing washer 172a located between the retaining wall 118 of the first cylinder section 106a and the seal element 126 of the first seal assembly 102 and a second sealing washer 172b located between the seal element 126 of the second seal assembly 104 and the retaining wall 118 of the second cylinder section 106b. The second retaining wall 118 of the second cylinder section 106b can have the same length as the first retaining wall of the first cylinder section or can be longer as shown but not contact the shaft 108.

Either or both sealing washers 172a, 172b can be a straight sealing washer or can include a memory lip, which can be of the extended type or the shortened type, as previously discussed, or some combination. As shown, the first sealing washer or gasket has a memory lip 176 while the second sealing washer can be a standard type without a memory lip. Service grease may be included in the cavity 134. Optionally, where a single sealing washer is shown, a stacked washer arrangement may be incorporated.

In an example, the first locking ring 146 of the first seal assembly 102 and the second locking ring 146 of the second seal assembly 104 are arranged along a parting line 322. In some examples, the parting line 322 is aligned with at least part of the cylinder split line 192. In an example, the two locking rings 146, 146 contact one another along the parting line 322. However, a small gap may be provided at the parting line to space the two locking rings from one another. In yet other examples, a gap filler, such as a non-sealing type gasket that is spaced from the shaft, may be placed between the two locking rings at the parting line 322. A cavity 134 that is common to both seal assemblies 102, 104 is located proximate the parting line 322, which does not include a sealing washer like that of other embodiments shown and described herein. In an example, service grease may be added to the cavity that is common to both seal assemblies. In still yet other examples, in the assembled configuration shown, one of the two locking rings can extend out of the open end of the respective cylinder section and extend into the bore section of the other cylinder section.

With reference now to FIG. 36, a seal system 100 is shown in accordance with still further aspects of the invention. The seal system 100 of the present embodiment comprises at least one seal assembly 102 mounted inside a cylinder 106 as a pre-packaged seal system and then the seal system mounted in a gland of a housing 110, which can be a pump, a valve, a compressor, a bearing box, etc. Thus, it is inherent and expressly contemplated that the cylinder, can or cartridge 106 may be extended to include a bearing assembly, as shown in FIGS. 7 and 8.

The present seal system 100 comprises two seal assemblies 102, 104, similar to FIG. 30, that are mounted with their respective free ends facing one another, with the free ends understood as the free ends of the inside and outside sealing flanges. The outer contour of the cylinder 106 has been modified to fit a different housing 110 configuration. Further, while an exemplary outer contour is shown for the present cylinder 106, this cylinder and the various other cylinders discussed herein may have outer contours that can be sized and shaped to fit with different operating environments that call for the seal assembly or combination seal and bearing assembly of the present disclosure. As shown, a shoulder 320 on the exterior of the cylinder 106 is configured to receive a corresponding shoulder of the housing 110, which can be any number of equipment types, such as a pump, a valve, a bearing box, etc. Thus, the exterior can be shaped, such as machined, with different exterior contour features to fit with different housing configurations. Alternatively, the cylinder 106 can include a split line.

The present cylinder 106 has a body with a retaining wall 118 at one end and an insertion end or open assembly end 120 for mounting various seal components, such as washers, seal elements, springs, etc. A retaining disc 190 is used to secure the open end of the cylinder after the installation.

In the present embodiment, the cylinder 106 has a stepped bore of at least two different inside diameters, similar to the cylinder 106 of FIG. 2. The stepped bore decreases the length that the locking flange 152 of the second locking ring 146 has to travel from the open end to mount the second seal element. Also, because of the stepped bore, the two decks of the two locking rings have different thicknesses with the second deck of the second locking ring being thicker than the first deck of the first locking ring to press the outside sealing flange of the second seal element against the larger bore diameter section of the bore.

The present seal system 100 also incorporates a plurality of sealing washers 172, including a first sealing washer 172a located between the retaining wall 118 and the first seal element 126 of the first seal assembly 102, a second sealing washer 172b in contact with the second sealing element of the second seal assembly 104, and a third sealing washer 172c located between the second sealing washer 172b and the retaining disc 190. The retaining disc 190, because it forms a pressed fit with the bore, can be used to apply a compressive force to compress the two sealing washers 172b, 172c against the second sealing element. Service grease may be included in the cavity 134. Optionally, where a single sealing washer is shown, a stacked washer arrangement may be incorporated.

One or more of the three sealing washers of the present embodiment can include a memory lip, which can be an extended memory lip or a shortened memory lip. For example, the first sealing washer 172a can have a memory lip that points away from the second seal assembly. As shown, all three sealing washers 172a, 172b, 172c can be a straight sealing washer without any sealing lip. Service grease may be included in the cavity 134. Optionally, where a single sealing washer is shown, a stacked washer arrangement may be incorporated.

In an example, the first locking ring 146 of the first seal assembly 102 and the second locking ring 146 of the second seal assembly 104 can be arranged along a parting line 322 as discussed above with reference to the seal system of FIG.

35. Service grease may be added to the cavity 134 that is common to both seal assemblies 102, 104.

Figure 37:
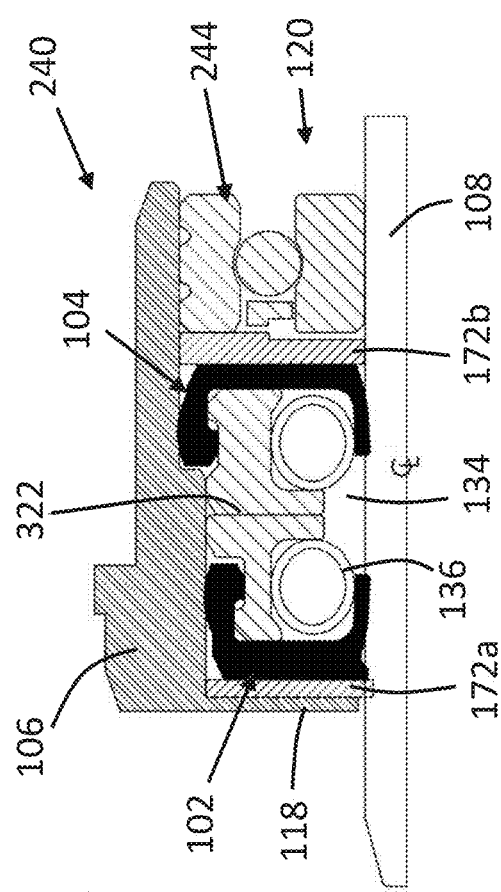
FIG. 37 is a cross-sectional side view of another seal and bearing system in a pre-packaged assembly in accordance with aspects of the invention.

With reference now to FIG. 37, a seal bearing system 240 in accordance with further aspects of the invention is shown. The present seal bearing system 240 shares many aspects as the seal and bearing system of FIG. 7. For example, the present seal bearing system 240 comprises a cylinder 106 with a retaining wall 118 and an open end or insertion end 120 for mounting the various seal bearing components, similar to the cylinder of FIG. 7. Exteriorly, the cylinder may be tailored and shaped with shoulders, flanges, etc. for mating with the particular equipment housing 110, which can be any number of devices, such as a pump, a mixer, a valve, a blower, etc. having a shaft 108 movable within the housing 110. In an alternative embodiment, the cylinder 106 may be a split cylinder, similar to the cylinder of FIG. 8.

Internally, the cylinder 106 has an interior surface defining a stepped bore with a first bore section 116a and a second bore section 116b. A first seal assembly 102, a second seal assembly, and two washers 172a, 172b are located at two ends of the bore. The first and second washers 172a, 172b can be of a standard type with a straight inside opening without a memory lip. Optionally, the first sealing washer 172a can have a memory lip pointing away from the second seal assembly. The two seal assemblies 102, 104 share a cavity 134 that is common to both of them. Service grease may be included in the cavity 134.

A retaining disc 190 may be placed in abutting contact with the second sealing washer 172b. The retaining disc can have an interference fit with the cylinder 106 and incorporated to retain the various seal components and washers inside the bore 116. In the example shown, no retaining disc is incorporated at the open end of the cylinder.

Like the seal bearing system 240 of FIG. 7, a bearing assembly 244 is provided adjacent the second sealing washer 172b. The interference fit between the outer ring of the bearing assembly and the bore of the cylinder 106 retains the various seal components, including the second sealing washer 172b inside the bore. The same or different service grease as that used for the common cavity 134 may be used with the bearing assembly 244 to provide lubrication for the rolling elements 252.

In an example, the first locking ring 146 of the first seal assembly 102 and the second locking ring 146 of the second seal assembly 104 can be arranged along a parting line 322 as discussed above with reference to the seal system of FIG. 35 and elsewhere. If the cylinder 106 has a split line, then the parting line 322 can align with at least part of the split line.

Figure 38:
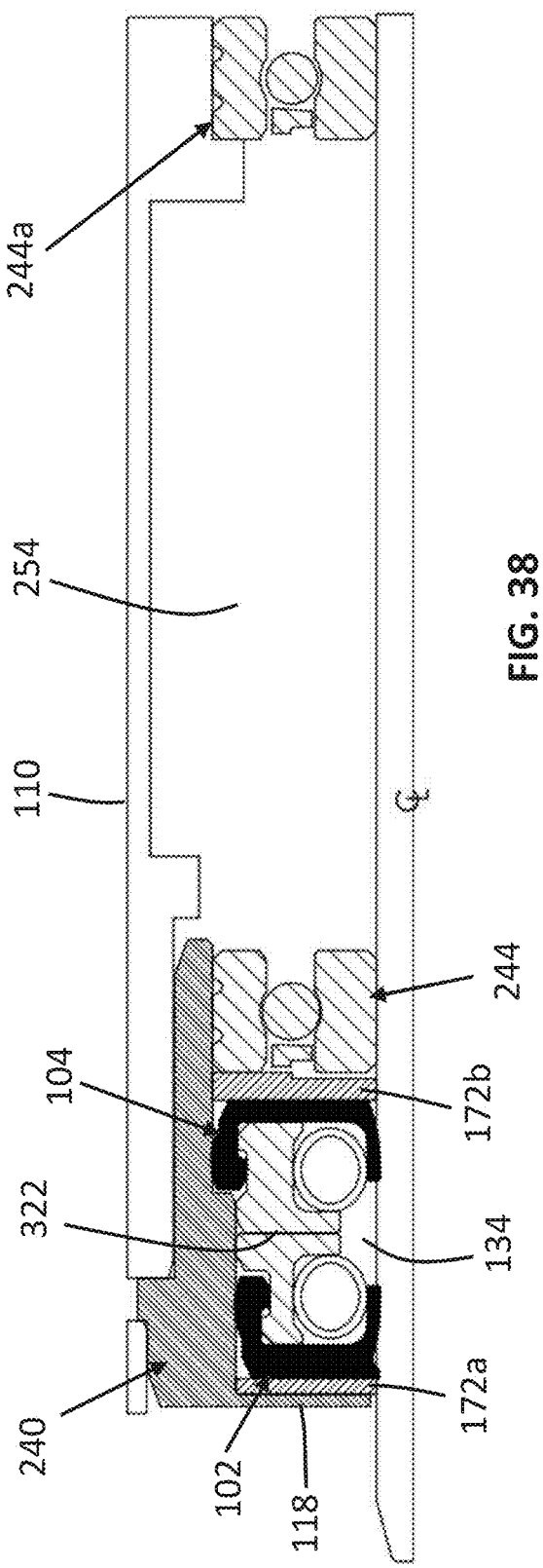
FIG. 38 is a cross-sectional side view of the seal and bearing system of FIG. 38 assembled to a housing and spaced from a second bearing assembly.

FIG. 38 is a cross-sectional side view of the pre-packaged seal and bearing system 240 of FIG. 37 mounted to a housing 110 having an additional bearing assembly 244a. The cylinder 106 of the seal and bearing system 240 is engaged to or installed within a housing 110, which can have more than one housing section 110a. For example, the pre-packaged seal and bearing system 240 can first be mounted onto the shaft 108 and then the combination mounted to the housing 110.

In the example shown, a second bearing assembly 244a is mounted to the housing 110 and shaft 108 and spaced from the first bearing assembly 244 of the pre-packaged seal and bearing system 240. This configuration shows how the pre-packaged seal and bearing system 240 may be used in a device in which a gap between the first and second bearing assemblies 244, 244a, called a device chamber 254, can be used to house any number of device components, such as a rotor of a motor, a stator of a motor, an oil sump, valve packing materials, fan blades, etc. Having the bearing assemblies 244, 244a located on either end of the device chamber 254 provides support and stability when the shaft rotates. The pre-packaged seal and bearing system 240 provide a single sealing solution with multiple components that can be adapted for multiple applications. For example, the seal assemblies 102, 104 can be orientated with different configurations, either facing one another, both facing the high pressure region, etc., for different applications. The pre-packaged seal and bearing system 240 can also be modified to have different gaskets or washers for added sealing points, such as by utilizing one or more gaskets with memory lips that serve as sealing lips. The cylinder 106 can also have a straight bore, a stepped bore, and can include a split line to facilitate assembly.

Still further, service grease may be included in the cavity 134 that is common to both seal assemblies 102, 104 to occupy or displace the space in the cavity so that external fluid is less prone to enter into the same space. The service grease can be selected to be compatible with the particular application. For example, if the housing 110 is part of a medical implantable device, the service grease must be biocompatible.

In yet another example, the pre-packaged seal and bearing assembly is a pre-packaged seal system 100, such as the seal system of FIG. 1A, 2, 3, or 36, without a bearing assembly. The bearing assembly can instead be mounted outside of or external to the cylinder 106.

Figure 39:
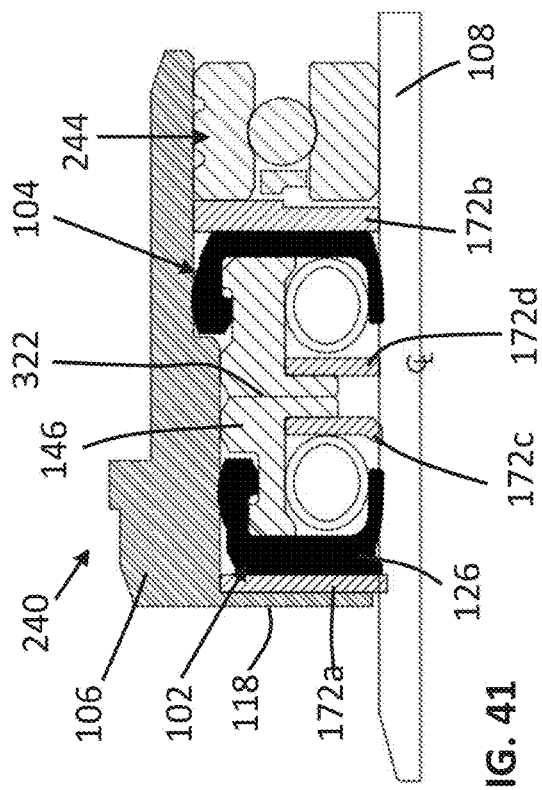
FIG. 39 is a cross-sectional side view of another seal assembly having two seal assemblies each with a seal element, a locking ring, and an energizer.

With reference now to FIG. 39, a seal system 100 is shown comprising two seal assemblies 102, 104, similar to FIGS. 30 and 35, that are mounted with their respective free ends facing one another, with the free ends understood as the free ends of the inside and outside sealing flanges. As shown, the first seal element 126 of the first seal assembly 102 can incorporate an excluder 166. Optionally, the second seal element of the second seal assembly can also include an excluder. The seal system 100 of the present embodiment has a cylinder 106 and is configured as a pre-packaged seal system that can then be mounted in a gland of a housing 110, which can be a pump, a valve, a compressor, a bearing box, etc. Thus, the exterior of the cylinder 106 can be tailored to fit the environment that the pre-packaged seal system is configured to operate in, including lengthening the bore for accommodating a bearing assembly.

In the present embodiment, the interior surface of the cylinder housing defines a straight bore fore accommodating a first seal assembly 102 and a second seal assembly, which can instead have a stepped bore and/or a cylinder with a split line, as shown and described elsewhere. The present cylinder 106 has a body with a retaining wall 118 at one end of the bore and a retaining disc 190 at the opposite end for closing the open assembly end following assembly of the various seal components, including a first sealing washer 172a adjacent the retaining wall 118 and a second sealing washer 172b adjacent the retaining disc 190.

Either or both sealing washers 172a, 172b can be a straight sealing washer or can include a memory lip, which can be of the extended type or the shortened type, as previously discussed, or some combination. As shown, the first and second sealing washers 172a, 172b both have a memory lip 176, which can point away from one another. In the example shown, the first sealing washer 172a can have an extended memory lip 176 while the second sealing washer can have a shortened memory lip. Optionally, the second sealing washer 172b can be a straight or standard sealing washer, without a memory lip. Still further optionally, where a single sealing washer is shown, a stacked washer arrangement may be incorporated with two or more washers stacked together.

The first locking ring 146 of the first seal assembly 102 and the second locking ring 146 of the second seal assembly 104 are arranged along a parting line 322, as previously discussed with reference to FIG. 35 and elsewhere. Compared to other locking rings discussed elsewhere herein, each locking ring 146 has a deck 150 and whereby the deck 150 has been lengthened from between the first end 328, where the deck projects into the sealing element, and the second end 330, where the deck terminates at the parting line 322. The lengthened deck 150 increases the space of the spring cavity and spaces the gap between the inner flange extension 158 and the energizer 136, which can be a canted coil spring.

As shown, a third sealing flange 172c is provided between the inner flange extension 158 and the energizer 136 of the first seal assembly 102. In the present embodiment, the third sealing washer 172c is fitted against the inner flange extension 158 of the first locking ring 146. While the third washer 172c is shown spaced from the energizer 136 of the first seal assembly, the energizer can be arranged to contact the third sealing washer.

The third sealing washer 172c has an overall shape that is similar to the sealing washer of FIGS. 12A-12D, which has a shortened memory lip 176. The memory lip 176 of the third sealing washer can point away from the second seal assembly 104 and point in the same direction as the memory lip of the first sealing washer 172a. In the present embodiment, the outer perimeter with the outer diameter of the third sealing washer 172c is relatively smaller than sealing washers that are located adjacent seal elements. In other words, the ratio of the OD to ID of the third sealing washer 172c is smaller than the ratio of OD to ID of the sealing washer of FIGS. 12A-12D and shown elsewhere. The third sealing washer 172c can abut both the deck and the inner flange extension 158 as well as seal against the shaft 108 to create a first spring cavity 134a that is isolated from the second spring cavity 134b, as further discussed below. In other examples, the sealing washer has an extended sealing lip or is a standard sealing washer.

In a similar manner, a fourth sealing flange 172d is located against the inner flange extension 158 of the second locking ring 146, which has a deck that has been lengthened to accommodate the fourth sealing flange. As shown, the fourth sealing flange 172d is in conduct with the deck, the inner flange extension, and the energizer 136 of the second seal assembly 104, as well as sealing against the shaft, to form a second spring cavity 134b that is isolated from the first spring cavity 134a. The fourth sealing washer 172d can have inner and outer diameters that are in interference fit with the shaft and the locking ring, respectively. In an example, the canted coil spring 136 of the second seal assembly 104 is positioned to hold the sealing washer 172d against the inner flange extension 158. The fourth sealing washer can be a straight or standard sealing washer without a memory lip. Optionally, the fourth sealing washer can include a memory lip.

As shown, the third and fourth sealing washers 172c, 172d create a third cavity 134c, which is located between the first spring cavity 134a and the second spring cavity 134b. In an example, the service grease may be added to the first and second spring cavities 134a, 134b. Optionally, service grease may also be added to the third cavity 134c.

Figure 40:
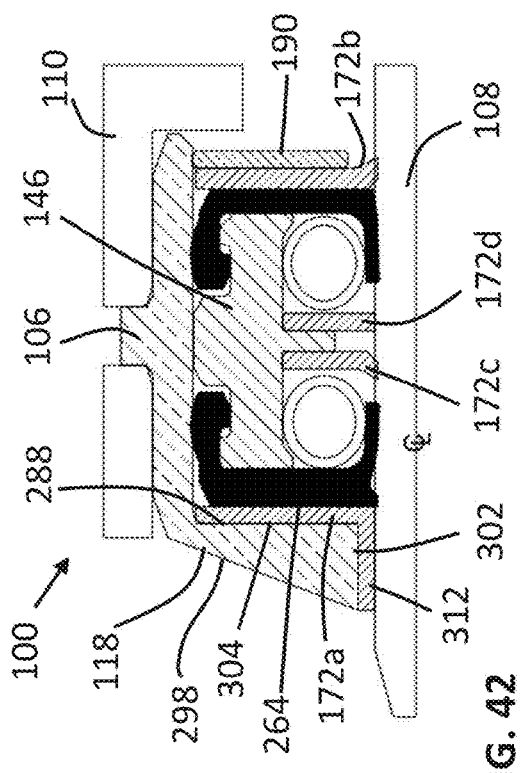
FIG. 40 is a cross-sectional side view of another seal assembly having two seal assemblies each with a seal element and an energizer but both sharing a single locking ring.

With reference now to FIG. 40, a seal system 100 is shown comprising two seal assemblies 102, 104 that are mounted with their respective free ends facing one another. As shown, the first seal element 126 of the first seal assembly 102 can incorporate an excluder 166. Optionally, the second seal element of the second seal assembly can also include an excluder. The seal system 100 of the present embodiment has a cylinder 106 and is configured as a pre-packaged seal system that can then be mounted in a gland of a housing 110, which can be a pump, a valve, a compressor, a bearing box, etc. Thus, the exterior of the cylinder 106 can be tailored to fit the environment that the pre-packaged seal system is configured to operate in, including lengthening the bore for accommodating a bearing assembly.

The present seal system 100 is similar to the seal system of other embodiments shown and described herein, including the seal system of FIG. 30. For example, the present seal system has a third sealing flange 172c and a fourth sealing flange 172d located adjacent the first canted coil spring and the second canted coil spring, respectively, like that of FIG. 30. However, in the present embodiment, the locking ring 146 is a combination locking ring 146a. That is, the combination locking ring 146a has a single locking flange 152 for locking against the interior of the cylinder or housing but has two different decks 150 with each comprising a notch for mechanically engaging the respective outside flange 130 of the respective seal element. The two decks 150 are located to either side of the locking flange 152. The combination locking ring 146a also has a single inner flange extension 158. The locking flange 152 and the inner flange extension 158 align generally along the same axial position and the two decks are located on either side of this aligned structure. The length of the single inner flange extension 158 can be selected to adjust the spring cavity opening 160 of both the first and second seal assemblies as desired, to restrict the two energizers 136 from escaping out through the respective spring cavity opening during use.

As the combination locking ring 146a has only a single inner flange extension 158, both the third sealing flange 172c and the fourth sealing flange 172d contact the same inner flange extension 158. The third sealing washer 172c can abut both the deck and the inner flange extension 158 as well as seal against the shaft 108 to create a first spring cavity 134a that is isolated from the second spring cavity 134b, as previously discussed with reference to FIG. 39. A third cavity 134c is located between the first and second spring cavities. Service grease may be included in the first and second spring cavities, the third cavity, or all three cavities.

Figure 41:
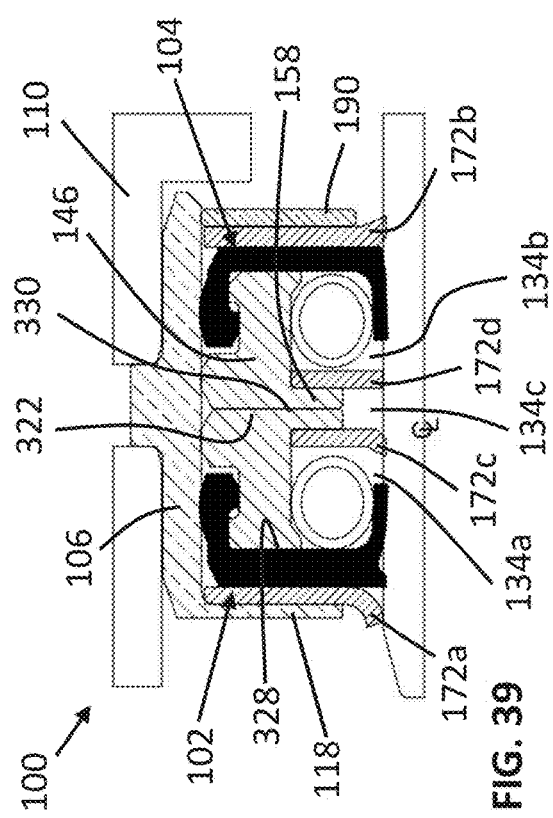
FIG. 41 is a cross-sectional side view of another seal and bearing system in a pre-packaged assembly in accordance with aspects of the invention.

With reference now to FIG. 41, a seal bearing system 240 in accordance with further aspects of the invention is shown. The present seal bearing system 240 shares many aspects as the seal and bearing system of FIGS. 7, 37, and 39. For example, the present seal bearing system 240 comprises a cylinder 106 with a retaining wall 118 and an open end or insertion end 120 for mounting the various seal bearing components, similar to the cylinders of FIGS. 7 and 37. Exteriorly, the cylinder may be tailored and shaped with shoulders, flanges, etc. for mating with the particular equipment housing 110, which can be any number of devices, such as a pump, a mixer, a valve, a blower, etc. having a shaft 108 movable within the housing 110. In an alternative embodiment, the cylinder 106 may be a split cylinder, similar to the cylinder of FIGS. 8 and 35.

Compared to the seal system of FIG. 39, the retaining disc 190 has been omitted at the open assembly end of the cylinder 106, although one may be included. In its place, a bearing assembly 244 is provided adjacent the second sealing washer 172b. The interference fit between the outer ring of the bearing assembly and the bore of the cylinder 106 retains the various seal components, including the second sealing washer 172b inside the bore. The same or different service grease as that used for the common cavity 134 may be used with the bearing assembly 244 to provide lubrication for the rolling elements 252.

In an example, the first locking ring 146 of the first seal assembly 102 and the second locking ring 146 of the second seal assembly 104 can be arranged along a parting line 322 as discussed above with reference to the seal system of FIG. 35 and elsewhere. If the cylinder 106 has a split line, then the parting line 322 can align with at least part of the split line.

Figure 42:
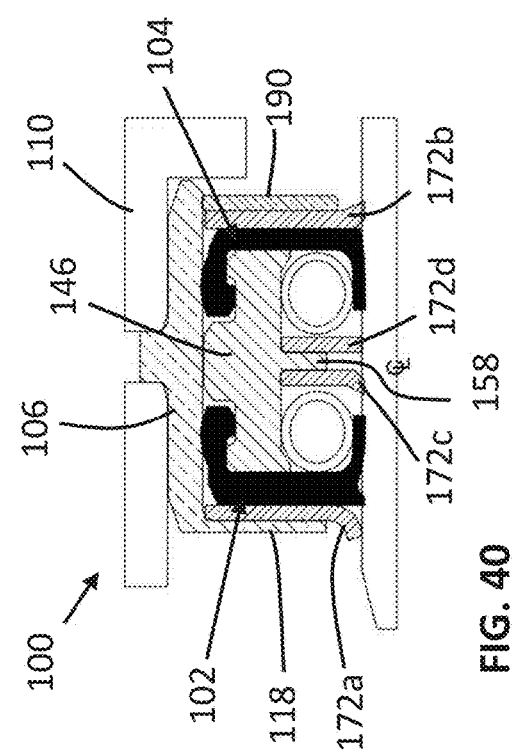
FIG. 42 is a cross-sectional side view of another seal assembly having two seal assemblies each with a seal element and an energizer but both sharing a single locking ring.

With reference now to FIG. 42, a seal system 100 is shown comprising two seal assemblies 102, 104 that are mounted with their respective free ends facing one another. As shown, the first seal element 126 of the first seal assembly 102 can incorporate an excluder 166. Optionally, the second seal element of the second seal assembly can also include an excluder. The seal system 100 of the present embodiment has a cylinder 106 and is configured as a pre-packaged seal system that can then be mounted in a gland of a housing 110, which can be a pump, a valve, a compressor, a bearing box, etc. Thus, the exterior of the cylinder 106 can be tailored to fit the environment that the pre-packaged seal system is configured to operate in, including lengthening the bore for accommodating a bearing assembly. If used with a bearing assembly, the retaining disc can be omitted.

The present seal system 100 is similar to the seal system of other embodiments shown and described herein, including the seal system of FIGS. 34 and 40. For example, the present seal system has a second sealing washer 172b at the open assembly end, and a third sealing flange 172c and a fourth sealing flange 172d located adjacent the first canted coil spring and the second canted coil spring, respectively, like that of FIG. 40.

Also, in the present embodiment, the locking ring 146 is a combination locking ring 146a. That is, the combination locking ring 146a has a single locking flange 152 for locking against the interior of the cylinder or housing but has two different decks 150 with each comprising a notch for mechanically engaging the respective outside flange 130 of the respective seal element. The two decks 150 are located to either side of the locking flange 152. The combination locking ring 146a also has a single inner flange extension 158. The locking flange 152 and the inner flange extension 158 align generally along the same axial position and the two decks are located on either side of this aligned structure. The length of the single inner flange extension 158 can be selected to adjust the spring cavity opening 160 of both the first and second seal assemblies as desired, to restrict the two energizers 136 from escaping out through the respective spring cavity opening during use. A retaining disc 190 is located at the open assembly end of the bore to retain the second sealing flange 172b within the bore.

As the combination locking ring 146a has only a single inner flange extension 158, both the third sealing flange 172c and the fourth sealing flange 172d contact the same inner flange extension 158. The third sealing washer 172c can abut both the deck and the inner flange extension 158 as well as seal against the shaft 108 to create a first spring cavity 134a that is isolated from the second spring cavity 134b, as previously discussed with reference to FIG. 39. A third cavity 134c is located between the first and second spring cavities. Service grease may be included in the first and second spring cavities, the third cavity, or all three cavities.

In the present embodiment, the retaining wall 118, the retaining wall 118 has a body 298 that is generally wedge shaped along a side cross-section, similar to the seal system of FIG. 34. The retaining wall 118 has a support surface 288 that is generally orthogonal to the axis of the shaft 108 that supports a length section of an L-shape sealing washer 304, which can be considered the first sealing washer, which is also similar to the L-shaped stepped washer of FIG. 28. The length section of the sealing washer 304 then contacts the outer surface 264 of the center channel section of the seal element 126.

The lower end of the retaining wall 118 near the central opening is provided with an inside perimeter 302. In an example, the shorter length 312 of the L-shaped sealing washer 304 is positioned at the inside perimeter 302 and contacts the shaft to seal against the shaft. The stepped sealing washer 304 may be assembled to the retaining wall 118 prior to assembling the various components into the cylinder 106 via the assembly end of the cylinder.

A still further aspect of the invention is a method of using seal assemblies, seal systems, pre-packaged seal systems, and pre-packaged seal and bearing assemblies as shown and described.

A still further aspect of the invention is a method of manufacturing or making seal assemblies, seal systems, pre-packaged seal systems, and pre-packaged seal and bearing assemblies as shown and described.

The various seal assemblies, gaskets or washers, pre-packaged seal systems, and pre-packaged seal and bearing systems can be interchangeable unless the components are mechanically or operationally conflicting. For example, the cylinder of FIG. 7 may be replaced with the split cylinder of FIG. 8, and the washers of FIG. 7 may be replaced with the washers with memory lips of FIG. 1A. As additional examples, the single sealing washer with memory lip of FIG. 28 may be modified to be a stacked washer in which two back-to-back washers may be used, such as shown in FIG. 23. Or where only a single sealing washer is shown, a stacked washer assembly with two or more sealing washer may be used. In yet another example, where a seal element is shown with an integrated excluder, a different seal element with an excluder may be used. Thus, the various embodiments described herein are intended to be interchangeable where they are compatible to do so.

As another example, various cylinders or cans have outer contours that can be sized and shaped to fit different operating environments that call for the seal assembly or combination seal and bearing assembly of the present disclosure. As such, various steps, shoulders, and split lines may be incorporated to adapt to the environment for which the particular cylinder or can is used. For example, a single shoulder may be used on the exterior of the cylinder for one application while multiple shoulders or steps may be used for the same cylinder in another application.

Exemplary claims that are considered within the scope of the invention are detailed below. Note that while some dependent claims refer back to a particular independent claim, the list is exemplary only and that the dependent claims may be claimed in different combinations, such as on other dependent claims and other independent claims.

Although limited embodiments of seal assemblies, gaskets, pre-packaged seal systems, and pre-packaged seal and bearing systems and their components have been specifically described and illustrated herein, many modifications and variations will be apparent to those skilled in the art. Accordingly, it is to be understood that the seal assemblies, gaskets, pre-packaged seal systems, and pre-packaged seal and bearing systems and their components constructed according to principles of the disclosed device, system, and method may be embodied other than as specifically described herein. The disclosure is also defined in the following exemplary claims.

Example Embodiments

The following are numbered example embodiments of the apparatuses, devices, systems, and methods related to a seal system for sealing against a shaft. Examples 1-194 or any other examples disclosed herein may be combined in whole or in part. Elements of the examples disclosed herein are not limiting.

Example 1. A seal system comprising: a cylinder having a body, an interior surface defining a bore, a retaining end having a retaining wall at one end of the bore, and an insertion end at an opposite end of the bore; a first seal assembly comprising a seal element, a locking ring, and an energizer; wherein the seal element comprising a spring cavity formed by an inside flange, an outside flange, and a center channel section and wherein part of the spring cavity is shaped by the locking ring; a second seal assembly comprising a seal element, a locking ring, and an energizer; wherein the seal element comprising a spring cavity formed by an inside flange, an outside flange, and a center channel section and wherein part of the spring cavity is shaped by the locking ring; at least one washer comprising an outside perimeter, an inside perimeter defining an opening, and a memory lip having a curved portion at the opening; and wherein the first seal assembly, the second seal assembly, and the at least one washer are located in the bore of the cylinder prior to mounting on a shaft and wherein the at least one washer is located between the first seal assembly and the second seal assembly.

Example 2. The seal system, device, apparatus, and method of any of Examples 1-194 or any other embodiment described herein, wherein the bore has a first portion with a first inside diameter and a second portion with a second inside diameter, and wherein the second inside diameter is larger than the first inside diameter.

Example 3. The seal system, device, apparatus, and method of any of Examples 1-194 or any other embodiment described herein, wherein the cylinder has a first cylinder section attached to a second cylinder section along a split line.

Example 4. The seal system, device, apparatus, and method of any of Examples 1-194 or any other embodiment described herein, further comprising a bearing assembly comprising an outer ring, an inner ring, a cage retaining a plurality of rolling elements; and wherein the outer ring is engaged to the bore of the cylinder in an interference fit.

Example 5. The seal system, device, apparatus, and method of any of Examples 1-194 or any other embodiment described herein, wherein the bore has a first portion with a first inside diameter and a second portion with a second inside diameter, and wherein the second inside diameter is larger than the first inside diameter.

Example 6. The seal system, device, apparatus, and method of any of Examples 1-194 or any other embodiment described herein, wherein the cylinder has a first cylinder section attached to a second cylinder section along a split line.

Example 7. The seal system, device, apparatus, and method of any of Examples 1-194 or any other embodiment described herein, wherein the bearing assembly is a first bearing assembly and further comprising a second bearing assembly spaced from the first bearing assembly and the second bearing assembly being secured to a housing and the housing being in contact with the cylinder.

Example 8. The seal system, device, apparatus, and method of any of Examples 1-194 or any other embodiment described herein, further comprising a second washer, wherein the second washer is in a back-to-back arrangement with the at least one washer.

Example 9. A seal system comprising: a locking ring comprising a locking flange and an inner flange extension aligned with one another along an axial position, a first deck having a notch on a first side of the inner flange and a second deck having a notch on a second side of the inner flange; a first seal element having an inside flange and an outside flange mechanically engaged to the notch of the first deck and having a first energizer biasing against the inside flange of the first seal element and an inner surface of the first deck; and a second seal element having an inside flange and an outside flange mechanically engaged to the notch of the second deck and having a second energizer biasing against the inside flange second seal element and an inner surface of the second deck.

Example 10. The seal system, device, apparatus, and method of any of Examples 1-194 or any other embodiment described herein, further comprising a washer in contact with the first seal element or the second seal element.

Example 11. A seal system comprising a cylinder having a bore, a first seal assembly having a first energizer biasing a first inside flange of a first seal element, a second seal assembly having a second energizer biasing a second inside flange of a second seal element, and at least two washers made from a non-metallic material positioned within the bore in which at least one memory lip is incorporated with one of the two washers.

Example 12. The seal system, device, apparatus, and method of any of Examples 1-194 or any other embodiment described herein, further comprising a bearing located within the bore, the bearing comprising a plurality of rolling elements.

Example 13. The seal system, device, apparatus, and method of any of Examples 1-194 or any other embodiment described herein, further comprising service grease located in a first spring cavity of the first seal assembly, service grease located in a second spring cavity of the second seal assembly, or service grease in both the first and second spring cavities.

Example 14. The seal system, device, apparatus, and method of any of Examples 1-194 or any other embodiment described herein, wherein the at least two washers comprise a first washer and a second washer, wherein the first washer is located between the first seal element and the second seal element.

Example 15. The seal system, device, apparatus, and method of any of Examples 1-194 or any other embodiment described herein, further comprising a third washer.

Example 16. The seal system, device, apparatus, and method of any of Examples 1-194 or any other embodiment described herein, wherein the second washer is in contact with the first seal element and the third washer is in contact with the second seal element.

Example 17. A method of assembling a seal system comprising: placing a first seal assembly into a bore of a cylinder, wherein the first seal assembly comprises a first energizer biasing a first inside flange of a first seal element; placing a second seal assembly having a second energizer biasing a second inside flange of a second seal element into the bore of the cylinder; and placing at least two washers made from a non-metallic material inside the bore of the cylinder, at least one memory lip is incorporated with one of the two washers.

Example 18. The method of assembling the seal system, device, and apparatus of any of Examples 1-194 or any other embodiment described herein, further comprising adding service grease in a first spring cavity of the first seal assembly, adding service grease in a second spring cavity of the second seal assembly, or adding service grease in both the first and second spring cavities.

Example 19. The method of assembling the seal system, device, and apparatus of any of Examples 1-194 or any other embodiment described herein, wherein the first seal assembly comprises a first seal element mechanically coupled to a first locking ring.

Example 20. The method of assembling the seal system, device, and apparatus of any of Examples 1-194 or any other embodiment described herein, further comprising installing a first seal element of the first seal assembly and a second seal element of the second seal assembly to face one another.

Example 21. The method of assembling the seal system, device, and apparatus of any of Examples 1-194 or any other embodiment described herein, wherein at least one of the two washers is placed between the first seal element and the second seal element.

Example 22. A seal system comprising: a housing cylinder having a body, an interior surface defining a bore, a retaining end having a retaining wall at one end of the bore, and an insertion end at an opposite end of the bore; a seal assembly located in the bore of the housing cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a washer in contact with the seal element and the retaining wall, the washer comprising an outside perimeter and an inside perimeter defining an opening; a shaft having a length and an outside diameter; wherein the shaft projects through the opening of the washer and the inside diameter of the seal element; and wherein the opening of the washer and the inside diameter of the seal element are smaller than the outside diameter of the shaft to form respective interference fit with the shaft.

Example 23. The seal system, device, apparatus, and method of any of Examples 1-194 or any other embodiment described herein, wherein the washer is a first washer and further comprising a second washer spaced from the first washer, the second washer comprising an outside perimeter and an inside perimeter defining an opening and wherein the shaft projects through the opening of the second washer.

Example 24. The seal system, device, apparatus, and method of any of Examples 1-194 or any other embodiment described herein, further comprising a retaining disc having a surface pressed against the second washer.

Example 25. The seal system, device, apparatus, and method of any of Examples 1-194 or any other embodiment described herein, wherein the flange section of the locking comprises an end projection pressing against the interior surface of the housing cylinder.

Example 26. The seal system, device, apparatus, and method of any of Examples 1-194 or any other embodiment described herein, wherein the retaining disc and the flange section are singularly formed.

Example 27. The seal system, device, apparatus, and method of any of Examples 1-194 or any other embodiment described herein, wherein the second washer comprises a memory lip having a curved portion at the opening.

Example 28. The seal system, device, apparatus, and method of any of Examples 1-194 or any other embodiment described herein, further comprising grease disposed in the spring cavity.

Example 29. The seal system, device, apparatus, and method of any of Examples 1-194 or any other embodiment described herein, wherein the energizer is a canted coil spring comprising a plurality of interconnected coils that bias the inside flange away from the outside flange.

Example 30. The seal system, device, apparatus, and method of any of Examples 1-194 or any other embodiment described herein, wherein the seal element and the locking ring are mechanically engaged at the outside flange.

Example 31. The seal system, device, apparatus, and method of any of Examples 1-194 or any other embodiment described herein, wherein the first washer is made from an elastomeric material or a thermoplastic material.

Example 32. The seal system, device, apparatus, and method of any of Examples 1-194 or any other embodiment described herein, wherein the shaft is part of a motor or a pump.

Example 33. A seal system comprising: a housing cylinder having a body, an interior surface defining a bore, a retaining end having a retaining wall at one end of the bore, and an insertion end at an opposite end of the bore; a seal assembly located in the bore of the housing cylinder, the seal assembly comprising a seal element, a locking ring having a flange section, and an energizer; wherein the seal element comprising a spring cavity formed by an inside flange, an outside flange, and a center channel section, and wherein the inside flange defining an inside diameter; a washer in contact with the seal element and the retaining wall, the washer comprising an outside perimeter and an inside perimeter defining an opening; a shaft having a length and an outside diameter, the shaft projecting through the opening and the inside diameter; and a retaining disc spaced from the washer for retaining the washer and the seal element within the bore of the housing cylinder.

Example 34. The seal system, device, apparatus, and method of any of Examples 1-194 or any other embodiment described herein, wherein the opening of the washer and the inside diameter of the seal element are smaller than the outside diameter of the shaft to form respective interference fit with the shaft.

Example 35. The seal system, device, apparatus, and method of any of Examples 1-194 or any other embodiment described herein, wherein the retaining disc and the flange section of the locking ring are unitarily formed.

Example 36. The seal system, device, apparatus, and method of any of Examples 1-194 or any other embodiment described herein, wherein the washer is a first washer and further comprising a second washer spaced from the first washer, the second washer comprising an outside perimeter and an inside perimeter defining an opening and wherein the shaft projects through the opening of the second washer.

Example 37. The seal system, device, apparatus, and method of any of Examples 1-194 or any other embodiment described herein, wherein the retaining disc comprises a surface pressed against the second washer.

Example 38. The seal system, device, apparatus, and method of any of Examples 1-194 or any other embodiment described herein, wherein the second washer comprises a memory lip having a curved portion at the opening.

Example 39. The seal system, device, apparatus, and method of any of Examples 1-194 or any other embodiment described herein, further comprising grease disposed in the spring cavity.

Example 40. The seal system, device, apparatus, and method of any of Examples 1-194 or any other embodiment described herein, wherein the energizer is a canted coil spring comprising a plurality of interconnected coils that bias the inside flange away from the outside flange.

Example 41. The seal system, device, apparatus, and method of any of Examples 1-194 or any other embodiment described herein, wherein the seal element and the locking ring are mechanically engaged at the outside flange.

Example 42. The seal system, device, apparatus, and method of any of Examples 1-194 or any other embodiment described herein, wherein the first washer is made from an elastomeric material or a thermoplastic material.

Example 43. The seal system, device, apparatus, and method of any of Examples 1-194 or any other embodiment described herein, wherein the shaft is part of a motor or a pump.

Example 44. A seal system comprising: a housing cylinder having a body, an interior surface defining a bore, a retaining end having a retaining wall at one end of the bore, and an insertion end at an opposite end of the bore; a seal assembly located in the bore of the housing cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a washer spaced from the retaining wall, the washer comprising an outside perimeter and an inside perimeter defining an opening; a shaft having a length and an outside diameter, the shaft projecting through the opening and the inside diameter; a retaining disc for retaining the seal assembly and the washer within the bore of the housing cylinder; and grease disposed in the spring cavity.

Example 45. The seal system, device, apparatus, and method of any of Examples 1-194 or any other embodiment described herein, wherein the opening of the washer and the inside diameter of the seal element are smaller than the outside diameter of the shaft to form respective interference fit with the shaft.

Example 46. The seal system, device, apparatus, and method of any of Examples 1-194 or any other embodiment described herein, wherein the seal element and the locking ring are mechanically engaged at the outside flange.

Example 47. The seal system, device, apparatus, and method of any of Examples 1-194 or any other embodiment described herein, further comprising an excluder at an end of the center channel section, wherein the excluder is located adjacent an annular recess.

Example 48. The seal system, device, apparatus, and method of any of Examples 1-194 or any other embodiment described herein, wherein the excluder has a fin-like cross-section having an inside diameter with a dimension that is smaller than the outside diameter of the shaft.

Example 49. The seal system, device, apparatus, and method of any of Examples 1-194 or any other embodiment described herein, wherein the washer comprises a memory lip having a curved portion at the opening.

Example 50. The seal system, device, apparatus, and method of any of Examples 1-194 or any other embodiment described herein, wherein the energizer is a canted coil spring comprising a plurality of interconnected coils that bias the inside flange away from the outside flange.

Example 51. A seal system comprising: a housing cylinder having a body, an interior surface defining a bore, a retaining end having a retaining wall at one end of the bore, and an insertion end at an opposite end of the bore; a seal assembly located in the bore of the housing cylinder, the seal assembly comprising a seal element, a locking ring comprising a flange section, and a canted coil spring; wherein the seal element comprising a spring cavity formed by an inside flange, an outside flange, and a center channel section, and wherein the inside flange defining an inside diameter; a washer spaced from the retaining wall, the washer comprising an outside perimeter and an inside perimeter defining an opening; a shaft having a length and an outside diameter, the shaft projecting through the opening and the inside diameter; a retaining disc for retaining the seal assembly and the washer within the bore of the housing cylinder; grease disposed in the spring cavity; and an excluder at an end of the center channel section and located adjacent an annular recess, wherein the excluder has a fin-like cross-section having an inside diameter with a dimension that is smaller than the outside diameter of the shaft.

Example 52. A seal system comprising: a cylinder having a body, an interior surface defining a bore, a retaining end having a retaining wall at one end of the bore, and an insertion end at an opposite end of the bore; a seal assembly located in the bore of the cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a washer in contact with the seal element and the retaining wall, the washer comprising an outside perimeter and an inside perimeter defining an opening; a shaft having a length and an outside diameter; wherein the shaft projects through the opening of the washer and the inside diameter of the seal element; wherein the opening of the washer and the inside diameter of the seal element are smaller than the outside diameter of the shaft to form respective interference fit with the shaft; and wherein the center channel section has a first thickness section and a second thickness section, and wherein the second thickness section displaces the energizer away from an outer surface of the center channel section.

Example 53. The seal system, device, apparatus, and method of any of Examples 1-194 or any other embodiment described herein, wherein the energizer is a canted coil spring.

Example 54. The seal system, device, apparatus, and method of any of Examples 1-194 or any other embodiment described herein, further comprising a second sealing washer in contact with the locking ring, and wherein a retaining disc is fitted to the cylinder to retain the second sealing washer within a bore of the cylinder.

Example 55. The seal system, device, apparatus, and method of any of Examples 1-194 or any other embodiment described herein, wherein the seal element has an excluder and an annular recess at an end of the inside flange and an end of the center channel section.

Example 56. A sealing washer comprising an elastomeric body having an outer perimeter and an inner perimeter defining a central opening, the elastomeric body having a thickness defined by a first surface and an opposing second surface, and wherein a projection extends in a direction of the first surface and away from the second surface to define a pocket.

Example 57. The sealing washer, device, apparatus, system, and method of any of Examples 1-194 or any other embodiment described herein, wherein the projection defines a memory lip.

Example 58. The sealing washer, device, apparatus, system, and method of any of Examples 1-194 or any other embodiment described herein, wherein the central opening is formed by cutting or punching the elastomeric body at a central location of the elastomeric body.

Example 59. A seal system comprising: a cylinder having a body, an interior surface defining a bore, a retaining end having a retaining wall at one end of the bore, and an insertion end at an opposite end of the bore; a seal assembly located in the bore of the cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a washer in contact with the seal element and the retaining wall, the washer comprising an outside perimeter and an inside perimeter defining an opening; a shaft having a length and an outside diameter; wherein the shaft projects through the opening of the washer and the inside diameter of the seal element; wherein the opening of the washer and the inside diameter of the seal element are smaller than the outside diameter of the shaft to form respective interference fit with the shaft; and wherein a sealing lip projection extends from the inside flange to space the inside flange from the shaft.

Example 60. The seal system, device, apparatus, and method of any of Examples 1-194 or any other embodiment described herein, further comprising a recess formed on an inside surface of the center channel section.

Example 61. A seal system comprising: a cylinder having a body, an interior surface defining a bore, a retaining end having a retaining wall at one end of the bore, and an insertion end at an opposite end of the bore; a seal assembly located in the bore of the cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a shaft having a length and an outside diameter; wherein the shaft projects through the opening of inside diameter of the seal element; wherein the opening of the inside diameter of the seal element is smaller than the outside diameter of the shaft to form an interference fit with the shaft; and wherein a plurality of spaced apart rings are located at an opening of the locking ring.

Example 62. The seal system, device, apparatus, and method of any of Examples 1-194 or any other embodiment described herein, wherein the locking ring has a back section, and wherein the plurality of spaced apart rings are located at the back section.

Example 63. The seal system, device, apparatus, and method of any of Examples 1-194 or any other embodiment described herein, further comprising a washer in contact with the seal element and the retaining wall, the washer comprising an outside perimeter and an inside perimeter defining an opening.

Example 64. A seal system comprising: a cylinder having a body, an interior surface defining a bore, a retaining end having a retaining wall at one end of the bore, and an insertion end at an opposite end of the bore; a seal assembly located in the bore of the cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a first sealing washer located between the retaining wall and the seal assembly, the first sealing washer comprising an outside perimeter and an inside perimeter defining an opening; a second sealing washer located between a retaining disc and the seal assembly, the second sealing washer comprising an outside perimeter and an inside perimeter defining an opening; and a shaft having a length and an outside diameter, the shaft projecting through the opening of the first sealing washer, the opening of the second sealing washer, and an opening of the inside flange.

Example 65. The seal system, device, apparatus, and method of any of Examples 1-194 or any other embodiment described herein, further comprising grease disposed in the spring cavity.

Example 66. The seal system, device, apparatus, and method of any of Examples 1-194 or any other embodiment described herein, wherein the first sealing washer has a memory lip extending away from the spring cavity.

Example 67. The seal system, device, apparatus, and method of any of Examples 1-194 or any other embodiment described herein, wherein the second sealing washer has a memory lip extending towards the spring cavity.

Example 68. The seal system, device, apparatus, and method of any of Examples 1-194 or any other embodiment described herein, wherein the first sealing washer is in contact with the retaining wall and the seal element.

Example 69. The seal system, device, apparatus, and method of any of Examples 1-194 or any other embodiment described herein, wherein the second sealing washer is in contact with the locking ring and the retaining disc.

Example 70. The seal system, device, apparatus, and method of any of Examples 1-194 or any other embodiment described herein, wherein the retaining disc is fitted in an interference fit to the bore of the cylinder.

Example 71. The seal system, device, apparatus, and method of any of Examples 1-194 or any other embodiment described herein, wherein the seal element has an excluder and an annular recess.

Example 72. The seal system, device, apparatus, and method of any of Examples 1-194 or any other embodiment described herein, further comprising a third washer in contact with the first washer or the second washer.

Example 73. The seal system, device, apparatus, and method of any of Examples 1-194 or any other embodiment described herein, wherein the inside flange has a free end, and the outside flange has a free end, and wherein the two free ends point at the retaining wall.

Example 74. The seal system, device, apparatus, and method of any of Examples 1-194 or any other embodiment described herein, wherein the inside flange has a free end, and the outside flange has a free end, and wherein the two free ends point at the retaining disc.

Example 75. A seal system comprising: a cylinder having a body, an interior surface defining a bore, a retaining end having a retaining wall at one end of the bore, and an insertion end at an opposite end of the bore; a seal assembly located in the bore of the cylinder, the seal assembly comprising a seal element, a locking ring comprising a flange section, and an energizer; wherein the seal element comprising a spring cavity formed by an inside flange, an outside flange, and a center channel section, and wherein the inside flange defining an inside diameter; a wedge sealing washer located between the retaining wall and the seal assembly, the wedge sealing washer having a surface that is orthogonal to an axis of a shaft and a tapered surface that is angled to the axis of the shaft when mounted onto the shaft, the wedge sealing washer comprising an outside perimeter and an inside perimeter defining an opening; and a sealing washer located between a retaining disc and the seal assembly, the second sealing washer comprising an outside perimeter and an inside perimeter defining an opening.

Example 76. The seal system, device, apparatus, and method of any of Examples 1-194 or any other embodiment described herein, further comprising a shaft having a length and an outside diameter, the shaft projecting through the opening of the wedge sealing washer, the opening of the sealing washer, and an opening of the inside flange.

Example 77. The seal system, device, apparatus, and method of any of Examples 1-194 or any other embodiment described herein, wherein the retaining wall extends from a cylindrical section of the cylinder and comprises a surface that is angled to an axis of the shaft when mounted onto the shaft.

Example 78. The seal system, device, apparatus, and method of any of Examples 1-194 or any other embodiment described herein, further comprising a cut-out on the wedge sealing washer.

Example 79. The seal system, device, apparatus, and method of any of Examples 1-194 or any other embodiment described herein, wherein the wedge sealing washer is located adjacent an inner retaining disc and the inner retaining disc is in contact with the seal element.

Example 80. The seal system, device, apparatus, and method of any of Examples 1-194 or any other embodiment described herein, wherein the sealing washer has a memory lip and wherein the memory lip points towards the energizer.

Example 81. A seal system comprising: a cylinder having a body, an interior surface defining a bore, a retaining end having a retaining wall at one end of the bore, and an insertion end at an opposite end of the bore; a first seal assembly located in the bore adjacent the retaining wall, the first seal assembly comprising a seal element, a locking ring, and an energizer; wherein the seal element comprising a spring cavity formed by an inside flange, an outside flange, and a center channel section and wherein part of the spring cavity is shaped by the locking ring; a second seal assembly located in the bore adjacent the insertion end and spaced from the retaining wall, the second seal comprising a seal element, a locking ring, and an energizer; wherein the seal element comprising a spring cavity formed by an inside flange, an outside flange, and a center channel section and wherein part of the spring cavity is shaped by the locking ring; a first sealing washer comprising an outside perimeter, an inside perimeter defining an opening, and a memory lip having a curved portion at the opening located between the retaining wall and the first seal assembly; and a second sealing washer comprising an outside perimeter, an inside perimeter defining an opening, and a memory lip having a curved portion at the opening located between the retaining disc and the second seal assembly.

Example 82. The seal system, device, apparatus, and method of any of Examples 1-194 or any other embodiment described herein, wherein the locking ring of the first seal assembly contacts the locking ring of the second seal assembly.

Example 83. The seal system, device, apparatus, and method of any of Examples 1-194 or any other embodiment described herein, wherein the energizer of the first seal assembly is a first canted coil spring and the energizer of the second seal assembly is a second canted coil spring.

Example 84. The seal system, device, apparatus, and method of any of Examples 1-194 or any other embodiment described herein, wherein the memory lip of the first sealing washer and the memory lip of the second sealing washer are different.

Example 85. A seal system comprising: a combination locking ring comprising a body having a single locking flange, a first deck, and a second deck, the first and second decks extending from the single locking flange, and wherein an inner flange extension extends from the body and defining a central opening located between two ends of the body; a first seal element coupled to the first deck and together defining a first spring cavity having a first canted coil spring located therein, a second seal element coupled to the second deck and together defining a second spring cavity having a second canted coil spring located therein; a sealing washer in contact with the inner flange extension.

Example 86. The seal system, device, apparatus, and method of any of Examples 1-194 or any other embodiment described herein, wherein the sealing washer is located in the first spring cavity.

Example 87. The seal system, device, apparatus, and method of any of Examples 1-194 or any other embodiment described herein, wherein the sealing washer is located in the second spring cavity.

Example 88. A seal system comprising: a cylinder having a body, an interior surface defining a bore, a first retaining end having a first retaining wall at a first end of the bore; a first seal assembly located in the bore adjacent the first retaining wall, the first seal assembly comprising a first seal element, a first locking ring, and a first energizer; wherein the first seal element comprising a spring cavity formed by an inside flange, an outside flange, and a center channel section and wherein part of the spring cavity is shaped by the first locking ring; a second seal assembly located in the bore and spaced further from the first retaining wall than the first seal assembly, the second seal assembly comprising a second seal element, a second locking ring, and an second energizer; wherein the second seal element comprising a spring cavity formed by an inside flange, an outside flange, and a center channel section and wherein part of the spring cavity is shaped by the second locking ring; a first sealing washer comprising an outside perimeter and an inside perimeter defining an opening located between the first retaining wall and the first seal assembly; and wherein the first locking ring and the second locking ring are located adjacent one another without any intervening structure therebetween.

Example 89. The seal system, device, apparatus, and method of any of Examples 1-194 or any other embodiment described herein, further comprising a second retaining wall located at a second end of the bore.

Example 90. The seal system, device, apparatus, and method of any of Examples 1-194 or any other embodiment described herein, wherein the cylinder with the body has a split line that separates the cylinder into a first cylinder section and a second cylinder section.

Example 91. The seal system, device, apparatus, and method of any of Examples 1-194 or any other embodiment described herein, wherein a parting line between the first locking ring and the second locking ring is aligned with the split line.

Example 92. The seal system, device, apparatus, and method of any of Examples 1-194 or any other embodiment described herein, wherein the first cylinder section has a projection, or an opening and the second cylinder section has the other one of the projection or the opening, and wherein the projection projects into the opening.

Example 93. The seal system, device, apparatus, and method of any of Examples 1-194 or any other embodiment described herein, further comprising a second sealing washer comprising an outside perimeter and an inside perimeter defining an opening located between the second sealing element and the second retaining wall.

Example 94. The seal system, device, apparatus, and method of any of Examples 1-194 or any other embodiment described herein, wherein the first sealing washer has a memory lip having a curved portion at the opening of the inside perimeter.

Example 95. The seal system, device, apparatus, and method of any of Examples 1-194 or any other embodiment described herein, wherein both the outside perimeter of the first sealing washer and the outside perimeter of the second sealing washer contact the interior surface of the cylinder.

Example 96. The seal system, device, apparatus, and method of any of Examples 1-194 or any other embodiment described herein, wherein the bore has a generally constant inside diameter from the first end to a second opposite end.

Example 97. The seal system, device, apparatus, and method of any of Examples 1-194 or any other embodiment described herein, wherein the energizer is located in a cavity defined in part by a locking ring and the inside flange, the energizer biases against both the inside flange and the locking ring.

Example 98. The seal system, device, apparatus, and method of any of Examples 1-194 or any other embodiment described herein, wherein a cavity is defined by the seal element only, and the energizer biases against both the inside flange and the outside flange of the seal element to bias the two away from one another.

Example 99. The seal system, device, apparatus, and method of any of Examples 1-194 or any other embodiment described herein, wherein the energizer is a canted coil spring comprising a plurality of interconnected coils that generally cant in a same direction, Example 98. The seal system, device, apparatus, and method of any of Examples 1-194 or any other embodiment described herein, wherein the locking ring comprises a deck and wherein the canted coil spring biases against the deck and the inside flange.

Example 100. The seal system, device, apparatus, and method of any of Examples 1-194 or any other embodiment described herein, wherein the first seal element has an excluder and an annular recess at an end of the inside flange and an end of the center channel section and the second seal element has an excluder and an annular recess at an end of the inside flange and an end of the center channel section.

Example 101. The seal system, device, apparatus, and method of any of Examples 1-194 or any other embodiment described herein, wherein the first seal element has a free end, and the second seal element has a free end, and wherein the two free ends point at one another.

Example 102. The seal system, device, apparatus, and method of any of Examples 1-194 or any other embodiment described herein, wherein the first locking ring and the second lock ring each have an inner flange extension to define two inner flange extensions.

Example 103. The seal system, device, apparatus, and method of any of Examples 1-194 or any other embodiment described herein, wherein the two inner flange extensions are of substantially equal lengths.

Example 104. The seal system, device, apparatus, and method of any of Examples 1-194 or any other embodiment described herein, wherein the first locking ring compresses the outside flange of the first sealing element against the interior surface of the bore.

Example 105. The seal system, device, apparatus, and method of any of Examples 1-194 or any other embodiment described herein, wherein the cylinder has an exterior surface with at least one shoulder for abutting against a gland housing of a device or assembly.

Example 106. The seal system, device, apparatus, and method of any of Examples 1-194 or any other embodiment described herein, further comprising a bearing assembly located within the bore of the cylinder.

Example 107. The seal system, device, apparatus, and method of any of Examples 1-194 or any other embodiment described herein, wherein the second sealing washer has a memory lip having a curved portion at an opening of an inside perimeter.

Example 108. The seal system, device, apparatus, and method of any of Examples 1-194 or any other embodiment described herein, wherein the second locking ring compresses the outside flange of the second sealing element against the interior surface of the bore.

Example 109. The seal system, device, apparatus, and method of any of Examples 1-194 or any other embodiment described herein, wherein the second locking ring compresses the outside flange of the second sealing element against the interior surface of the bore.

Example 110. The seal system, device, apparatus, and method of any of Examples 1-194 or any other embodiment described herein, wherein the cylinder has an exterior surface with at least one shoulder located between two ends of the cylinder for abutting against a gland housing of a device or assembly.

Example 111. The seal system, device, apparatus, and method of any of Examples 1-194 or any other embodiment described herein, wherein the first sealing washer has a memory lip having a curved portion at an inside opening of an inside perimeter, and wherein the second sealing washer has a memory lip having a curved portion at an opening of an inside perimeter.

Example 112. The seal system, device, apparatus, and method of any of Examples 1-194 or any other embodiment described herein, wherein the memory lip of the first sealing washer is an extended memory lip, and the memory lip of the second sealing washer is a shortened memory lip.

Example 113. The seal system, device, apparatus, and method of any of Examples 1-194 or any other embodiment described herein, wherein the bore has at least two different inside diameters, including a first inside diameter and a second inside diameter.

Example 114. The seal system, device, apparatus, and method of any of Examples 1-194 or any other embodiment described herein, wherein the second locking ring presses the outside flange of the second sealing element against the second inside diameter of the bore.

Example 115. The seal system, device, apparatus, and method of any of Examples 1-194 or any other embodiment described herein, wherein the first locking ring presses the outside flange of the first sealing element against the first inside diameter of the bore.

Example 116. The seal system, device, apparatus, and method of any of Examples 1-194 or any other embodiment described herein, further comprising a second sealing washer in contact with the second sealing element and a third sealing washer in contact with the second sealing washer.

Example 117. The seal system, device, apparatus, and method of any of Examples 1-194 or any other embodiment described herein, wherein the sealing washer has an outside perimeter and an opening with an inside perimeter, and wherein the outside perimeter contacts the bore, and the inside perimeter contacts the shaft.

Example 118. The seal system, device, apparatus, and method of any of Examples 1-194 or any other embodiment described herein, wherein at least one of the first sealing washer, the second sealing washer, and the third sealing washer is of a standard sealing washer type without a memory lip.

Example 119. The seal system, device, apparatus, and method of any of Examples 1-194 or any other embodiment described herein, further comprising a retaining disc having an outer perimeter fitted against the bore of the cylinder and an inside perimeter spaced from the shaft.

Example 120. The seal system, device, apparatus, and method of any of Examples 1-194 or any other embodiment described herein, wherein the retaining disc contacts the third sealing washer.

Example 121. The seal system, device, apparatus, and method of any of Examples 1-194 or any other embodiment described herein, further comprising a bearing assembly located inside the bore of the cylinder.

Example 122. The seal system, device, apparatus, and method of any of Examples 1-194 or any other embodiment described herein, wherein both the second sealing washer and the third sealing washer contact the second inside diameter of the bore.

Example 123. The seal system, device, apparatus, and method of any of Examples 1-194 or any other embodiment described herein, wherein a second sealing washer is in contact with the second sealing element and in contact with the second inside diameter of the bore.

Example 124. The seal system, device, apparatus, and method of any of Examples 1-194 or any other embodiment described herein, wherein the first sealing washer has a thickness defined between a first surface and a second surface and the second sealing washer has a thickness between a first surface and a second surface, and wherein the thickness of the second sealing washer is greater than the thickness of the first sealing washer.

Example 125. The seal system, device, apparatus, and method of any of Examples 1-194 or any other embodiment described herein, further comprising a bearing assembly located in the bore.

Example 126. The seal system, device, apparatus, and method of any of Examples 1-194 or any other embodiment described herein, wherein the bearing assembly contacts the second sealing washer.

Example 127. The seal system, device, apparatus, and method of any of Examples 1-194 or any other embodiment described herein, wherein the bearing assembly is a ball bearing assembly.

Example 128. The seal system, device, apparatus, and method of any of Examples 1-194 or any other embodiment described herein, wherein the second sealing washer has a first thickness and a second thickness, which is greater than the first thickness.

Example 129. The seal system, device, apparatus, and method of any of Examples 1-194 or any other embodiment described herein, wherein the bearing assembly contacts the second thickness but not the first thickness.

Example 130. The seal system, device, apparatus, and method of any of Examples 1-194 or any other embodiment described herein, further comprising an equipment housing fitted to the cylinder.

Example 131. The seal system, device, apparatus, and method of any of Examples 1-194 or any other embodiment described herein, wherein the bearing assembly is a first bearing assembly and further comprising a second bearing assembly spaced from the first bearing assembly.

Example 132. The seal system, device, apparatus, and method of any of Examples 1-194 or any other embodiment described herein, wherein the second bearing assembly is located in the equipment housing.

Example 133. The seal system, device, apparatus, and method of any of Examples 1-194 or any other embodiment described herein, wherein a space between the first bearing assembly and the second bearing assembly defines a device chamber.

Example 134. The seal system, device, apparatus, and method of any of Examples 1-194 or any other embodiment described herein, wherein an outer race of the first bearing assembly has a larger diameter than a diameter of an outer race of the second bearing assembly.

Example 135. The seal system, device, apparatus, and method of any of Examples 1-194 or any other embodiment described herein, wherein an outer race of the first bearing assembly has a diameter, and an outer race of the second bearing assembly has a diameter, and wherein the two diameters are substantially equal.

Example 136. The seal system, device, apparatus, and method of any of Examples 1-194 or any other embodiment described herein, wherein the equipment housing is pushed against a shoulder on the cylinder.

Example 137. The seal system, device, apparatus, and method of any of Examples 1-194 or any other embodiment described herein, further comprising a second sealing washer comprising an outside perimeter and an inside perimeter defining an opening in contact with the second sealing element.

Example 138. The seal system, device, apparatus, and method of any of Examples 1-194 or any other embodiment described herein, wherein the second sealing washer is located between the second sealing element and a retaining disc.

Example 139. The seal system, device, apparatus, and method of any of Examples 1-194 or any other embodiment described herein, wherein the retaining disc forms an interference fit with the bore of the cylinder.

Example 140. The seal system, device, apparatus, and method of any of Examples 1-194 or any other embodiment described herein, wherein the first locking ring has a deck and a first inner flange extension, and wherein a third sealing washer is located between the first inner flange extension and the first energizer, the third sealing washer having an opening and an inside perimeter.

Example 141. The seal system, device, apparatus, and method of any of Examples 1-194 or any other embodiment described herein, wherein the second locking ring has a deck and a second inner flange extension, and wherein a fourth sealing washer is located between the second inner flange extension and the second energizer, the fourth sealing washer having an opening and an inside perimeter.

Example 142. The seal system, device, apparatus, and method of any of Examples 1-194 or any other embodiment described herein, wherein the first sealing washer has an outside diameter, and the third sealing washer has an outside diameter, and wherein the outside diameter of the first sealing washer is larger than the outside diameter of the third sealing washer.

Example 143. The seal system, device, apparatus, and method of any of Examples 1-194 or any other embodiment described herein, wherein the second sealing washer has an outside diameter, and the fourth sealing washer has an outside diameter, and wherein the outside diameter of the second sealing washer is larger than the outside diameter of the fourth sealing washer.

Example 144. The seal system, device, apparatus, and method of any of Examples 1-194 or any other embodiment described herein, wherein the first sealing washer has a memory lip having a curved portion at the opening.

Example 145. The seal system, device, apparatus, and method of any of Examples 1-194 or any other embodiment described herein, wherein at least one of the third sealing washer and the fourth sealing washer has a memory lip having a curved portion.

Example 146. The seal system, device, apparatus, and method of any of Examples 1-194 or any other embodiment described herein, wherein the second sealing washer has a memory lip having a curved portion at the opening.

Example 147. The seal system, device, apparatus, and method of any of Examples 1-194 or any other embodiment described herein, wherein the memory lip of the first sealing washer and the memory lip of the second sealing washer point away from one another.

Example 148. The seal system, device, apparatus, and method of any of Examples 1-194 or any other embodiment described herein, wherein a free end of the inside sealing flange of the first sealing washer and a free end of the inside sealing flange of the second sealing washer point at one another.

Example 149. The seal system, device, apparatus, and method of any of Examples 1-194 or any other embodiment described herein, wherein the fourth sealing flange is a straight sealing flange without a memory lip.

Example 150. The seal system, device, apparatus, and method of any of Examples 1-194 or any other embodiment described herein, wherein the second sealing flange has a first thickness section and a second thickness section, which is less than the first thickness section.

Example 151. The seal system, device, apparatus, and method of any of Examples 1-194 or any other embodiment described herein, further comprising a bearing assembly located within the bore.

Example 152. The seal system, device, apparatus, and method of any of Examples 1-194 or any other embodiment described herein, wherein the bearing assembly contacts the first thickness section.

Example 153. The seal system, device, apparatus, and method of any of Examples 1-194 or any other embodiment described herein, wherein the bearing assembly is a ball bearing assembly.

Example 154. The seal system, device, apparatus, and method of any of Examples 1-194 or any other embodiment described herein, wherein the first locking ring has a deck and a first inner flange extension, and wherein a third sealing washer is located between the first inner flange extension and the first energizer, the third sealing washer having an opening and an inside perimeter.

Example 155. The seal system, device, apparatus, and method of any of Examples 1-194 or any other embodiment described herein, wherein the second locking ring has a deck and a second inner flange extension, and wherein a fourth sealing washer is located between the second inner flange extension and the second energizer, the fourth sealing washer having an opening and an inside perimeter.

Example 156. The seal system, device, apparatus, and method of any of Examples 1-194 or any other embodiment described herein, wherein the first sealing washer has an outside diameter, and the third sealing washer has an outside diameter, and wherein the outside diameter of the first sealing washer is larger than the outside diameter of the third sealing washer.

Example 157. The seal system, device, apparatus, and method of any of Examples 1-194 or any other embodiment described herein, wherein the second sealing washer has an outside diameter, and the fourth sealing washer has an outside diameter, and wherein the outside diameter of the second sealing washer is larger than the outside diameter of the fourth sealing washer.

Example 158. The seal system, device, apparatus, and method of any of Examples 1-194 or any other embodiment described herein, wherein the third sealing washer has a memory lip having a curved portion at the opening.

Example 159. The seal system, device, apparatus, and method of any of Examples 1-194 or any other embodiment described herein, wherein the fourth sealing washer has a memory lip having a curved portion.

Example 160. The seal system, device, apparatus, and method of any of Examples 1-194 or any other embodiment described herein, wherein the memory lip of the third sealing washer and the memory of the fourth sealing washer point away from one another.

Example 161. The seal system, device, apparatus, and method of any of Examples 1-194 or any other embodiment described herein, wherein at least one of the first seal element and the second seal element has an excluder at an end of the center channel section, wherein the excluder is located adjacent an annular recess.

Example 162. A seal system comprising: a cylinder having a body, an interior surface defining a bore, a retaining end having a first retaining wall at a first end of the bore and a receiving end at a second end of the bore; a combination locking ring located in the bore of the cylinder, the combination locking ring comprising a body having a single locking flange in contact with the interior surface of the bore, a first deck, and a second deck; wherein the first and second decks extending from the single locking flange, and wherein an inner flange extension extends from the body and defining a central opening located between two ends of the body; a first seal element having a center channel section located between an inside flange and an outside flange coupled to the first deck and together defining a first spring cavity having a first canted coil spring located therein, a second seal element having a center channel section located between an inside flange and an outside flange coupled to the second deck and together defining a second spring cavity having a second canted coil spring located therein; a first sealing washer comprising an outside perimeter and an inside perimeter defining an opening located between the retaining wall and the first seal assembly; and a second sealing washer comprising an outside perimeter and an inside perimeter defining an opening in contact with the second seal element.

Example 163. The seal system, device, apparatus, and method of any of Examples 1-194 or any other embodiment described herein, further comprising a third sealing washer having an outside perimeter and an inside perimeter defining an opening located between the inner flange extension and the first canted coil spring.

Example 164. The seal system, device, apparatus, and method of any of Examples 1-194 or any other embodiment described herein, further comprising a fourth sealing washer having an outside perimeter and an inside perimeter defining an opening located between the inner flange extension and the second canted coil spring.

Example 165. The seal system, device, apparatus, and method of any of Examples 1-194 or any other embodiment described herein, further comprising a retaining disc having an outside perimeter fitted against the interior surface of the cylinder.

Example 166. The seal system, device, apparatus, and method of any of Examples 1-194 or any other embodiment described herein, wherein at least one of the first sealing washer, the second sealing washer, the third sealing washer, and the fourth sealing washer has a memory lip at the opening.

Example 167. The seal system, device, apparatus, and method of any of Examples 1-194 or any other embodiment described herein, wherein each of the first sealing washer, the second sealing washer, and the third sealing washer has a memory lip.

Example 168. The seal system, device, apparatus, and method of any of Examples 1-194 or any other embodiment described herein, wherein the memory lip of the first sealing washer and the memory lip of the second sealing washer point away from one another.

Example 169. The seal system, device, apparatus, and method of any of Examples 1-194 or any other embodiment described herein, wherein the memory lip of the third sealing washer points at the first sealing element.

Example 170. The seal system, device, apparatus, and method of any of Examples 1-194 or any other embodiment described herein, wherein the fourth sealing washer is a standard sealing washer type without a memory lip.

Example 171. The seal system, device, apparatus, and method of any of Examples 1-194 or any other embodiment described herein, wherein the retaining wall has a body that is generally wedge shaped along a cross-section.

Example 172. The seal system, device, apparatus, and method of any of Examples 1-194 or any other embodiment described herein, wherein the first sealing washer has an L-shape along a cross-section.

Example 173. The seal system, device, apparatus, and method of any of Examples 1-194 or any other embodiment described herein, wherein the retaining wall has a support surface that is generally orthogonal to a lengthwise axis of the cylinder.

Example 174. The seal system, device, apparatus, and method of any of Examples 1-194 or any other embodiment described herein, wherein the first sealing washer is in contact with the support surface.

Example 175. The seal system, device, apparatus, and method of any of Examples 1-194 or any other embodiment described herein, wherein the retaining wall has an inside perimeter, and wherein part of the first sealing washer is in contact with the inside perimeter of the retaining wall.

Example 176. The seal system, device, apparatus, and method of any of Examples 1-194 or any other embodiment described herein, further comprising a third sealing washer having an outside perimeter and an inside perimeter defining an opening located between the inner flange extension and the first canted coil spring.

Example 177. The seal system, device, apparatus, and method of any of Examples 1-194 or any other embodiment described herein, further comprising a fourth sealing washer having an outside perimeter and an inside perimeter defining an opening located between the inner flange extension and the second canted coil spring.

Example 178. The seal system, device, apparatus, and method of any of Examples 1-194 or any other embodiment described herein, further comprising a retaining disc having an outside perimeter fitted against the interior surface of the cylinder.

Example 179. The seal system, device, apparatus, and method of any of Examples 1-194 or any other embodiment described herein, wherein at least one of the second sealing washer, the third sealing washer, and the fourth sealing washer has a memory lip at the opening.

Example 180. The seal system, device, apparatus, and method of any of Examples 1-194 or any other embodiment described herein, wherein each of the second sealing washer and the third sealing washer has a memory lip.

Example 181. The seal system, device, apparatus, and method of any of Examples 1-194 or any other embodiment described herein, wherein the memory lip of the second sealing washer and the memory lip of the third sealing washer point away from one another.

Example 182. The seal system, device, apparatus, and method of any of Examples 1-194 or any other embodiment described herein, wherein the fourth sealing washer is a standard sealing washer type without a memory lip.

Example 183. The seal system, device, apparatus, and method of any of Examples 1-194 or any other embodiment described herein, further comprising an equipment housing in contact with a shoulder located on an exterior of the cylinder.

Example 184. The seal system, device, apparatus, and method of any of Examples 1-194 or any other embodiment described herein, wherein the canted coil spring, which comprises a plurality of interconnected coils that cant generally in the same direction, contacts both the deck of the locking ring and the inside flange of the seal element and biases against both surfaces.

Example 185. The seal system, device, apparatus, and method of any of Examples 1-194 or any other embodiment described herein, wherein the canted coil spring, which comprises a plurality of interconnected coils that cant generally in the same direction, contacts both the outside flange and the inside flange of the seal element and biases against both the inside flange and the outside flange.

Example 186. A method of practicing any of the seal system, apparatus, and device of Examples 1-194 or any other embodiment described herein include placing the seal system, apparatus, or device into a sealing compartment of an equipment housing, such as a pump housing, to seal a shaft of the pump.

Example 187. The seal system, device, apparatus, and method of any of Examples 1-194 or any other embodiment described herein, wherein the bore of the cylinder is a stepped bore, and wherein the two decks of the two locking rings have different thicknesses with the second deck of the second locking ring being thicker than the deck of the first locking ring to press the outside sealing flange of the second seal element against the larger bore diameter section of the bore.

Example 188. The seal system, device, apparatus, and method of any of Examples 1-194 or any other embodiment described herein, wherein the sealing washer can have an outside perimeter with an outer diameter that either presses against the bore of the cylinder, merely contacts the bore, or is spaced from the bore.

Example 189. The seal system, device, apparatus, and method of any of Examples 1-194 or any other embodiment described herein, wherein each of the sealing washers can have an outside perimeter with an outer diameter that either presses against the bore of the cylinder, merely contacts the bore, or is spaced from the bore while being sized and shaped to seal against a shaft at an inside perimeter.

Example 190. The seal system, device, apparatus, and method of any of Examples 1-194 or any other embodiment described herein, wherein the two stacked seal assemblies share a common open cavity, and wherein service grease is located in the common open cavity.

Example 191. The seal system, device, apparatus, and method of any of Examples 1-194 or any other embodiment described herein, wherein a first seal assembly comprising a first seal element with free ends and a second seal assembly comprising a second seal element with free ends are mounted inside a bore of a cylinder, and wherein the free ends of the first and second seal elements point at one another, point away from one another, or point in a same direction.

Example 192. The seal system, device, apparatus, and method of any of Examples 1-194 or any other embodiment described herein, wherein two locking rings are located adjacent to one another at a parting line.

Example 193. The seal system, device, apparatus, and method of any of Examples 1-194 or any other embodiment described herein, wherein no intervening structure is located between the two locking rings at the parting line.

Example 194. The seal system, device, apparatus, and method of any of Examples 1-194 or any other embodiment described herein, wherein a gap washer is located between the two locking rings at the parting line, and the gap washer is sized and shaped with a center opening that does not seal against a shaft.

What is claimed is:

1. A seal system comprising:
   a cylinder having a body, an interior surface defining a bore, a first retaining end having a first retaining wall at a first end of the bore;
   a first seal assembly located in the bore adjacent the first retaining wall, the first seal assembly comprising a first seal element, a first locking ring, and a first energizer; wherein the first seal element comprising a spring cavity formed by an inside flange, an outside flange, and a center channel section and wherein part of the spring cavity is shaped by the first locking ring;
   a second seal assembly located in the bore and spaced further from the first retaining wall than the first seal assembly, the second seal assembly comprising a second seal element, a second locking ring, and a second energizer; wherein the second seal element comprising a spring cavity formed by an inside flange, an outside flange, and a center channel section and wherein part of the spring cavity is shaped by the second locking ring;
   a first sealing washer comprising an outside perimeter and an inside perimeter defining an opening located between the first retaining wall and the first seal assembly; and
   wherein the first locking ring and the second locking ring are located adjacent one another without any intervening structure therebetween.

2. The seal system of claim 1, further comprising a second retaining wall located at a second end of the bore.

3. The seal system of claim 2, wherein the cylinder with the body has a split line that separates the cylinder into a first cylinder section and a second cylinder section.

4. The seal system of claim 3, wherein a parting line between the first locking ring and the second locking ring is aligned with the split line.

5. The seal system of claim 2, further comprising a second sealing washer comprising an outside perimeter and an inside perimeter defining an opening located between the second sealing element and the second retaining wall.

6. The seal system of claim 5, wherein both the outside perimeter of the first sealing washer and the outside perimeter of the second sealing washer contact the interior surface of the cylinder.

7. The seal system of claim 5, wherein the second sealing washer has a memory lip having a curved portion at an opening of an inside perimeter.

8. The seal system of claim 2, wherein the first sealing washer has a memory lip having a curved portion at the opening of the inside perimeter.

9. The seal system of claim 1, wherein the bore has a generally constant inside diameter from the first end to a second opposite end.

10. The seal system of claim 1, wherein the first seal element has an excluder and an annular recess at an end of the inside flange and an end of the center channel section and the second seal element has an excluder and an annular recess at an end of the inside flange and an end of the center channel section.

11. The seal system of claim 1, wherein the first seal element has a free end and the second seal element has a free end, and wherein the two free ends point at one another.

12. The seal system of claim 1, wherein the first locking ring and the second lock ring each have an inner flange extension to define two inner flange extensions located along a parting line.

13. The seal system of claim 1, wherein the cylinder has an exterior surface with at least one shoulder for abutting against a gland housing of a device or assembly.

14. The seal system of claim 1, further comprising a bearing assembly located within the bore of the cylinder.

15. The seal system of claim 1, wherein the first sealing washer has a memory lip having a curved portion at an inside opening of an inside perimeter, and wherein the second sealing washer has a memory lip having a curved portion at an opening of an inside perimeter.

16. The seal system of claim 15, wherein the memory lip of the first sealing washer is an extended memory lip and the memory lip of the second sealing washer is a shortened memory lip.

17. The seal system of claim 1, wherein the bore has at least two different inside diameters, including a first inside diameter and a second inside diameter that is larger than the first inside diameter.

18. The seal system of claim 17, wherein the second locking ring presses the outside flange of the second sealing element against the second inside diameter of the bore.

19. The seal system of claim 18, further comprising a second sealing washer in contact with the second sealing element and a third sealing washer in contact with the second sealing washer.

20. The seal system of claim 19, wherein at least one of the first sealing washer, the second sealing washer, and the third sealing washer is of a standard sealing washer type without a memory lip.

21. The seal system of claim 20, further comprising a retaining disc having an outer perimeter fitted against the bore of the cylinder and an inside perimeter spaced from the shaft.

22. The seal system of claim 20, further comprising a bearing assembly located inside the bore of the cylinder.

23. The seal system of claim 18, wherein a second sealing washer is in contact with the second sealing element and in contact with the second inside diameter of the bore.

24. The seal system of claim 23, wherein the first sealing washer has a thickness defined between a first surface and a second surface and the second sealing washer has a thickness between a first surface and a second surface, and wherein the thickness of the second sealing washer is greater than the thickness of the first sealing washer.

25. The seal system of claim 24, further comprising a bearing assembly located in the bore.

26. The seal system of claim 25, wherein the bearing assembly contacts the second sealing washer.

27. The seal system of claim 26, wherein the second sealing washer has a first thickness and a second thickness, which is greater than the first thickness.

28. The seal system of claim 27, wherein the bearing assembly contacts the second thickness but not the first thickness.

29. The seal system of claim 28, further comprising an equipment housing fitted to the cylinder.

30. The seal system of claim 29, wherein the bearing assembly is a first bearing assembly and further comprising a second bearing assembly spaced from the first bearing assembly.

31. The seal system of claim 1, further comprising a second sealing washer comprising an outside perimeter and an inside perimeter defining an opening, and wherein the second sealing washer is in contact with the second sealing element.

32. The seal system of claim 31, wherein the second sealing washer is located between the second sealing element and a retaining disc.

33. The seal system of claim 32, wherein the first locking ring has a deck and a first inner flange extension, and wherein a third sealing washer is located between the first inner flange extension and the first energizer, the third sealing washer having an opening and an inside perimeter.

34. The seal system of claim 33, wherein the second locking ring has a deck and a second inner flange extension, and wherein a fourth sealing washer is located between the second inner flange extension and the second energizer, the fourth sealing washer having an opening and an inside perimeter.

35. The seal system of claim 34, wherein the first sealing washer has an outside diameter, and the third sealing washer has an outside diameter, and wherein the outside diameter of the first sealing washer is larger than the outside diameter of the third sealing washer.

36. The seal system of claim 31, wherein the second sealing flange has a first thickness section and a second thickness section, which is less than the first thickness section.

37. The seal system of claim 36, further comprising a bearing assembly located within the bore and contacting the first thickness.

38. A seal system comprising:
a cylinder having a body with an interior surface defining a bore;
a combination locking ring located in the bore of the cylinder, the combination locking ring comprising a body with a first deck and a second deck; wherein an inner flange extension extends from the body and defining a central opening located between two ends of the body;
a first seal element having a center channel section located between an inside flange and an outside flange coupled to the first deck and together defining a first spring cavity having a first canted coil spring located therein, the first deck pressing the outside flange of the first seal element against the interior surface of the cylinder;
a second seal element having a center channel section located between an inside flange and an outside flange coupled to the second deck and together defining a second spring cavity having a second canted coil spring located therein, the second deck pressing the outside flange of the second seal element against the interior surface of the cylinder;
a first sealing washer comprising an outside perimeter and an inside perimeter defining an opening in contact with the first seal element; and
a second sealing washer comprising an outside perimeter and an inside perimeter defining an opening in contact with the second seal element.

39. The seal system of claim 38, wherein the cylinder comprises a locking flange extending outwardly away from the interior surface.

40. The seal system of claim 39, wherein the locking flange is aligned along an axial position on the body with the inner flange.

41. The seal system of claim 40, wherein inner flange has a radial length that is longer than a radial length of the locking flange.

42. The seal system of claim 38, wherein the body has a retaining end having a retaining wall at a first end of the bore and a receiving end at a second end of the bore.

43. The seal system of claim 39, wherein the first deck and the second deck extend away from one another at the locking flange.

44. The seal system of claim 38, further comprising a third sealing washer having an outside perimeter and an inside perimeter defining an opening located between the inner flange extension and the first canted coil spring.

45. The seal system of claim 44, further comprising a fourth sealing washer having an outside perimeter and an inside perimeter defining an opening located between the inner flange extension and the second canted coil spring.

46. The seal system of claim 42, further comprising a retaining disc having an outside perimeter fitted against the interior surface of the cylinder.

47. The seal system of claim 46, wherein at least one of the first sealing washer and the second sealing washer has a memory lip at the opening.

48. The seal assembly of claim 47, wherein each of the first sealing washer and the second sealing washer has a memory lip.

49. The seal assembly of claim 48, wherein the memory lip of the first sealing washer and the memory lip of the second sealing washer point away from one another.

50. The seal assembly of claim 42, wherein the retaining wall has a body that is generally wedge shaped along a cross-section.

51. The seal assembly of claim 50, wherein the first sealing washer has an L-shape along a cross-section.

52. The seal assembly of claim 51, wherein the retaining wall has an inside perimeter, and wherein part of the first sealing washer is in contact with the inside perimeter of the retaining wall.

53. The seal system of claim 38.

54. The seal system of claim 38, wherein the first seal element has an excluder and an annular recess at an end of the inside flange and an end of the center channel section.

55. The seal system of claim 54, wherein the second seal element has an excluder and an annular recess at an end of the inside flange and an end of the center channel section.

* * * * *